US012631739B2

(12) United States Patent　　　(10) Patent No.:　US 12,631,739 B2
Su　　　　　　　　　　　　　　　　　(45) Date of Patent:　　　May 19, 2026

(54) POSITIONING METHOD AND APPARATUS, DEVICE, AND STORAGE MEDIUM

(71) Applicant: Tencent Technology (Shenzhen) Company Limited, Shenzhen (CN)

(72) Inventor: Jinglan Su, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 79 days.

(21) Appl. No.: 18/612,968

(22) Filed: Mar. 21, 2024

(65) Prior Publication Data

US 2024/0280679 A1　　Aug. 22, 2024

Related U.S. Application Data

(63) Continuation of application No. PCT/CN2023/087235, filed on Apr. 10, 2023.

(30) Foreign Application Priority Data

Jun. 9, 2022　(CN) .......................... 202210653933.5

(51) Int. Cl.
　　*G01S 17/86*　　　(2020.01)
　　*G01S 13/06*　　　(2006.01)
　　　　　　(Continued)

(52) U.S. Cl.
　　CPC .............. *G01S 13/06* (2013.01); *G01S 13/89* (2013.01); *G01S 19/01* (2013.01); *G06T 7/70* (2017.01); *G06T 2207/10028* (2013.01)

(58) Field of Classification Search
　　CPC .......... G01S 17/86; G01S 17/06; G01S 19/45; G01S 19/46; G01S 19/48; G01S 19/39
　　See application file for complete search history.

(56) References Cited

U.S. PATENT DOCUMENTS 10,274,632　B1 *　4/2019　Olsson .................. G01S 19/00
2004/0150557　A1　8/2004　Ford et al.
　　　　　　(Continued)

FOREIGN PATENT DOCUMENTS

CN　　108732603　A　11/2018
CN　　111708043　A　9/2020
　　　　　　(Continued)

OTHER PUBLICATIONS

International Search Report and Written Opinion received for PCT Patent Application No. PCT/CN2023/087235, mailed on Jul. 12, 2023, 16 pages (6 pages of English Translation and 10 pages of Original Document).

(Continued)

*Primary Examiner* — Tan Q Nguyen
(74) *Attorney, Agent, or Firm* — ARENTFOX SCHIFF LLP

(57) ABSTRACT

In some examples, a method of positioning a mobile device includes obtaining point cloud data that is scanned by a radar that is positionally associated with the mobile device, determining a first positioning result of the mobile device according to the point cloud data, obtaining first observation data that is received by a first satellite positioning device that is positionally associated with the mobile device and determining a target positioning result for the mobile device based on the first observation data and the first positioning result. Apparatus and non-transitory computer-readable storage medium counterpart embodiments are also contemplated.

20 Claims, 12 Drawing Sheets

Obtain point cloud data scanned by a radar installed on a mobile device, and position the mobile device by using the point cloud data to obtain a first positioning result — 301

Obtain first observation data received by a satellite positioning device installed on the mobile device — 302

Obtain a target positioning result for the mobile device based on the first observation data and the first positioning result — 303

(51) Int. Cl.
    *G01S 13/89*            (2006.01)
    *G01S 19/01*            (2010.01)
    *G06T 7/70*             (2017.01)
    *G01S 19/48*            (2010.01)

(56)                References Cited

U.S. PATENT DOCUMENTS

| 2018/0299273 | A1* | 10/2018 | Cai | G05D 1/027 |
|---|---|---|---|---|
| 2021/0215832 | A1* | 7/2021 | Liu | G01S 19/45 |
| 2021/0239854 | A1* | 8/2021 | Tanaka | G01S 19/43 |
| 2023/0184956 | A1* | 6/2023 | Cole | G01S 19/071 |
| | | | | 342/352 |
| 2023/0314627 | A1* | 10/2023 | Angelo | G01S 19/20 |
| | | | | 342/357.22 |

FOREIGN PATENT DOCUMENTS

| CN | 114384569 A | 4/2022 |
|---|---|---|
| CN | 114442133 A | 5/2022 |
| CN | 114509774 A | 5/2022 |

OTHER PUBLICATIONS

Nobuaki Kubo, "Open Positioning Engine 'RTK Core' (3) GPS Radio Wave Phase Shift Calculation", Transistor Technology, vol. 55, Issue 1, 2018, pp. 106-112.
Office Action received for Japanese Application No. 2024-532222, mailed on Mar. 18, 2025, 9 pages (5 pages of original office action and 4 pages of English Translation).

* cited by examiner

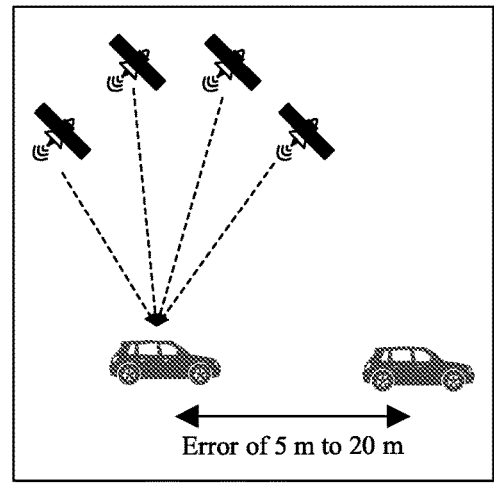
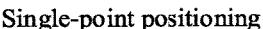
Error of 5 m to 20 m
Single-point positioning
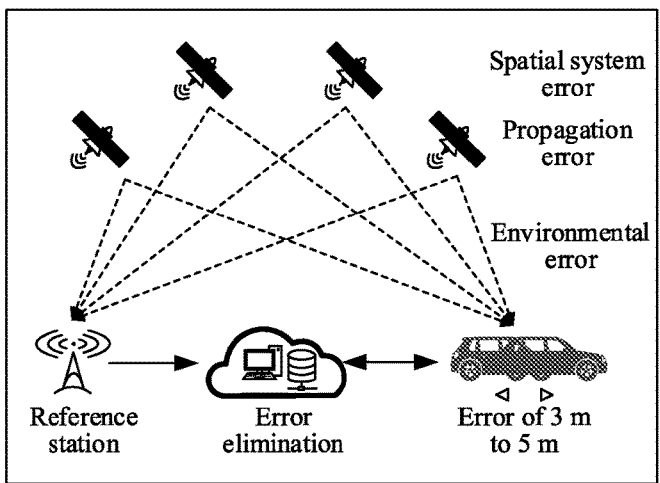
Spatial system error
Propagation error
Environmental error
Reference station      Error elimination      Error of 3 m to 5 m
RTK differential positioning
FIG. 1
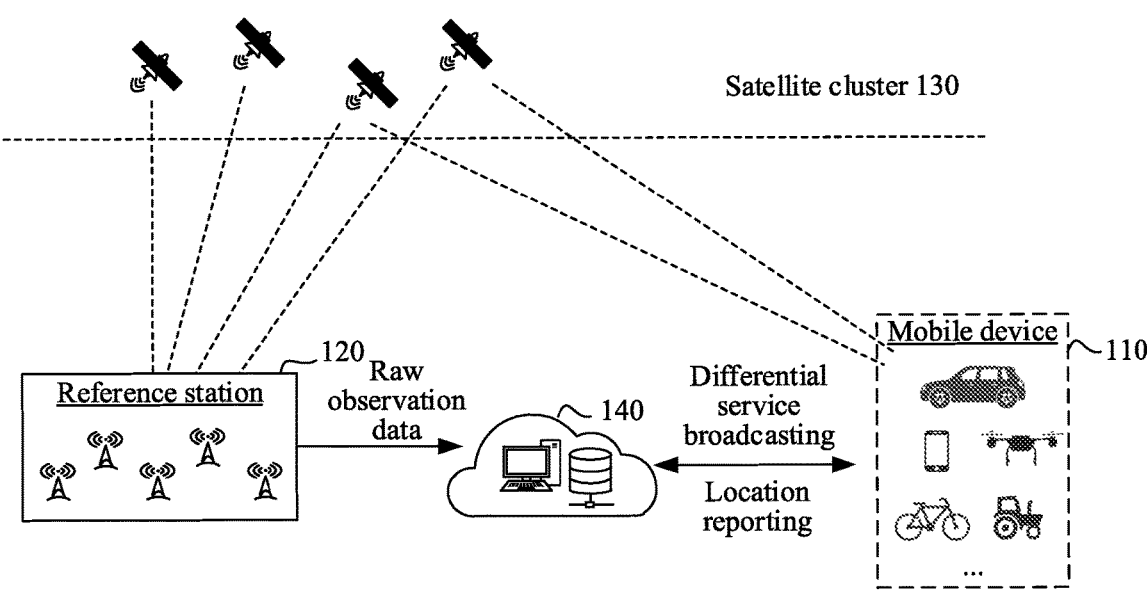
FIG. 2

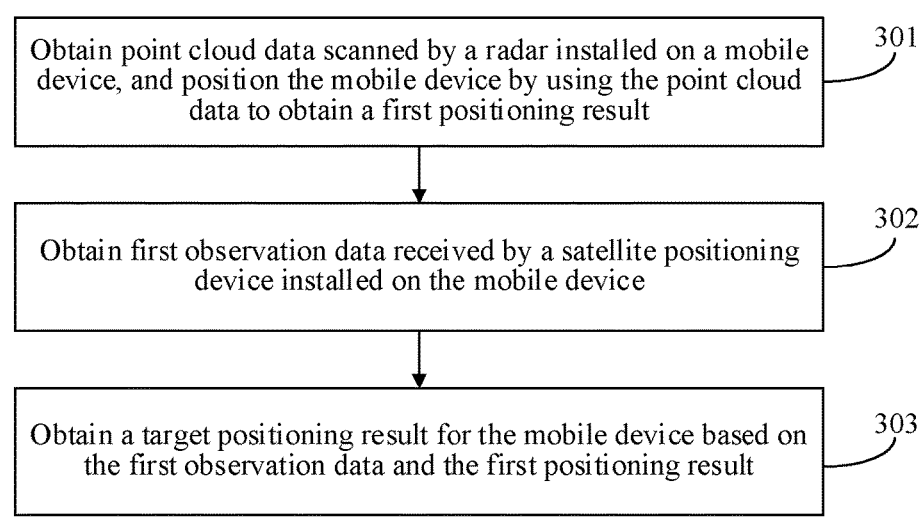

Obtain point cloud data scanned by a radar installed on a mobile device, and position the mobile device by using the point cloud data to obtain a first positioning result — 301

Obtain first observation data received by a satellite positioning device installed on the mobile device — 302

Obtain a target positioning result for the mobile device based on the first observation data and the first positioning result — 303

FIG. 3

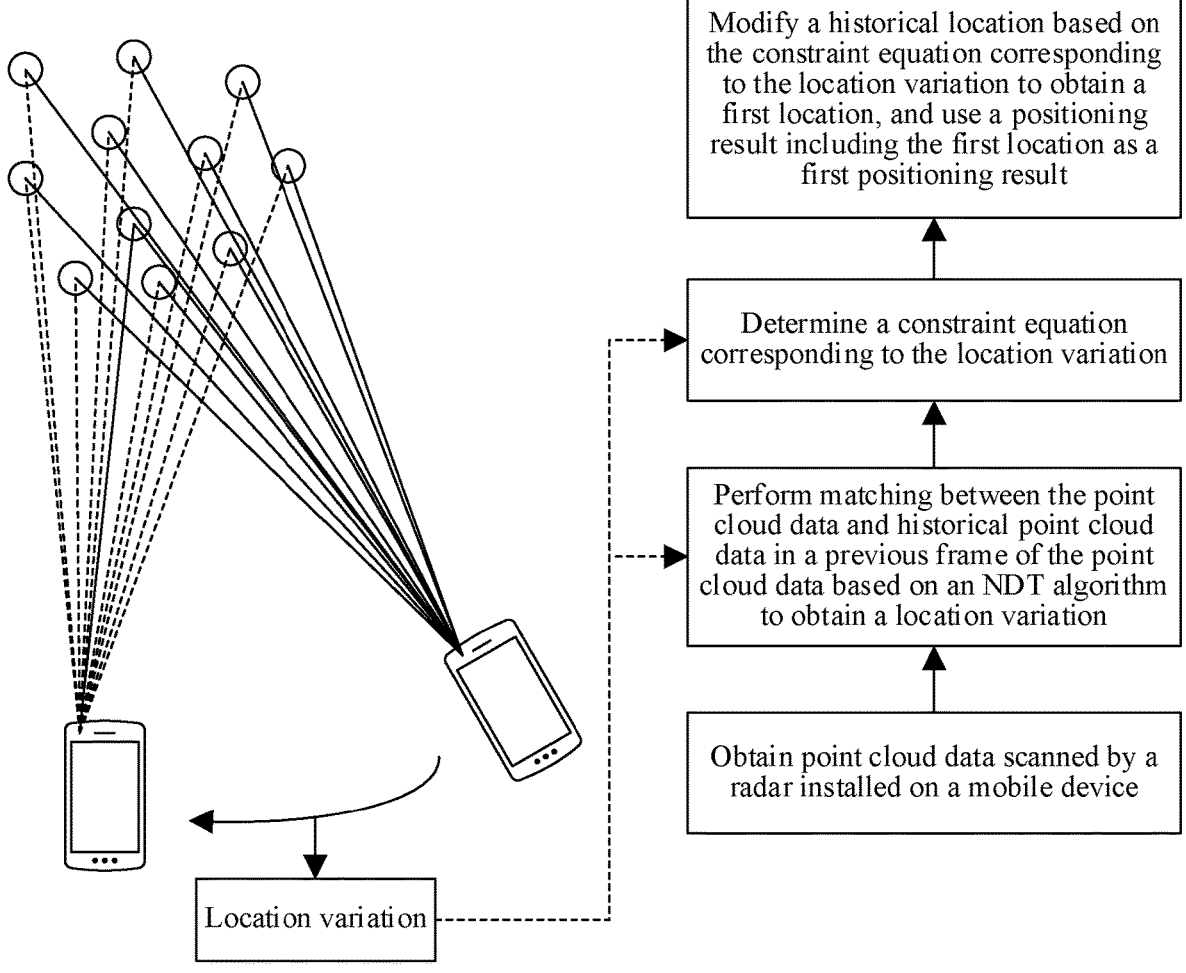

Modify a historical location based on the constraint equation corresponding to the location variation to obtain a first location, and use a positioning result including the first location as a first positioning result Determine a constraint equation corresponding to the location variation Perform matching between the point cloud data and historical point cloud data in a previous frame of the point cloud data based on an NDT algorithm to obtain a location variation Obtain point cloud data scanned by a radar installed on a mobile device Location variation

FIG. 4

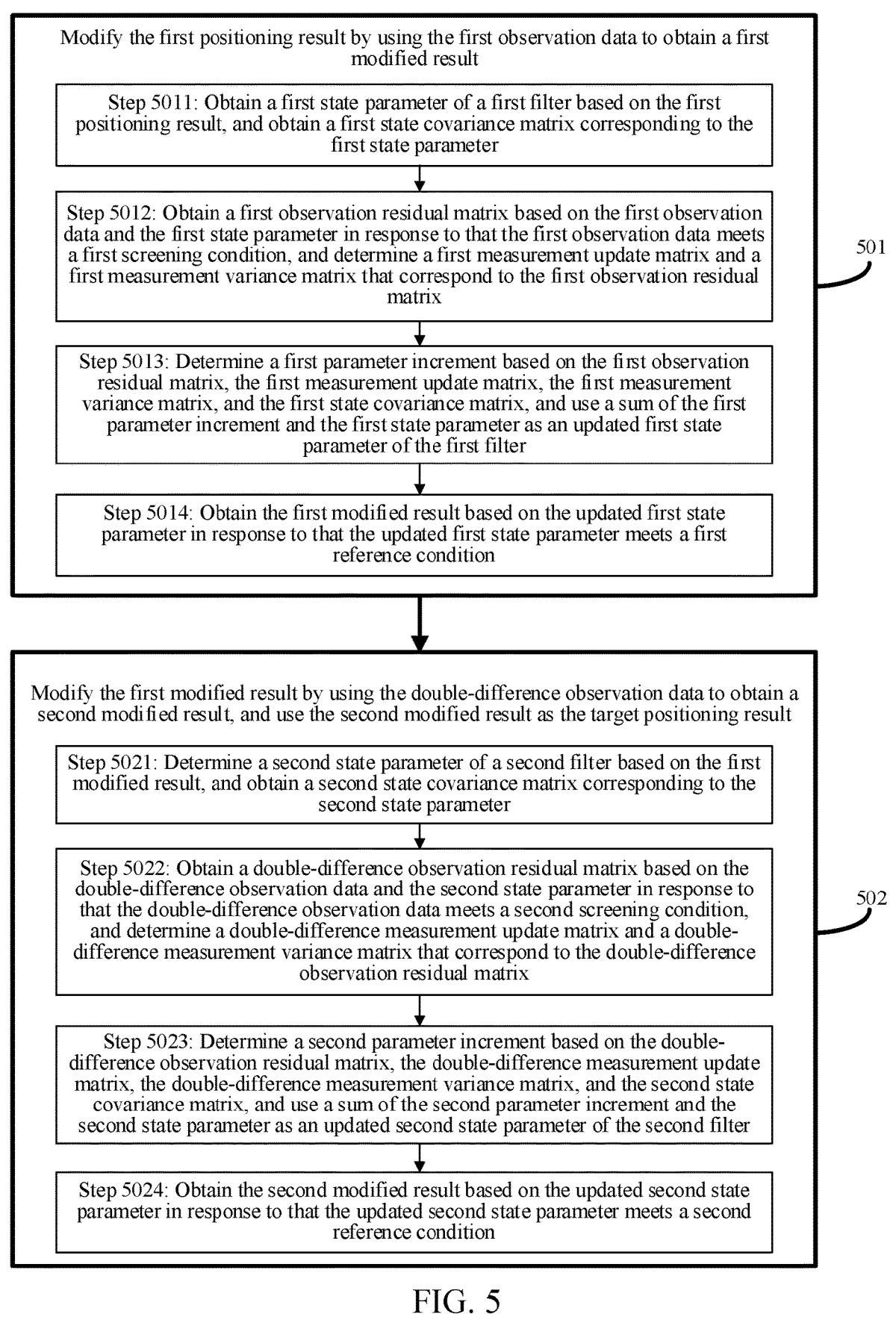

Modify the first positioning result by using the first observation data to obtain a first modified result Step 5011: Obtain a first state parameter of a first filter based on the first positioning result, and obtain a first state covariance matrix corresponding to the first state parameter Step 5012: Obtain a first observation residual matrix based on the first observation data and the first state parameter in response to that the first observation data meets a first screening condition, and determine a first measurement update matrix and a first measurement variance matrix that correspond to the first observation residual matrix

501

Step 5013: Determine a first parameter increment based on the first observation residual matrix, the first measurement update matrix, the first measurement variance matrix, and the first state covariance matrix, and use a sum of the first parameter increment and the first state parameter as an updated first state parameter of the first filter Step 5014: Obtain the first modified result based on the updated first state parameter in response to that the updated first state parameter meets a first reference condition Modify the first modified result by using the double-difference observation data to obtain a second modified result, and use the second modified result as the target positioning result Step 5021: Determine a second state parameter of a second filter based on the first modified result, and obtain a second state covariance matrix corresponding to the second state parameter Step 5022: Obtain a double-difference observation residual matrix based on the double-difference observation data and the second state parameter in response to that the double-difference observation data meets a second screening condition, and determine a double-difference measurement update matrix and a double-difference measurement variance matrix that correspond to the double-difference observation residual matrix

502

Step 5023: Determine a second parameter increment based on the double-difference observation residual matrix, the double-difference measurement update matrix, the double-difference measurement variance matrix, and the second state covariance matrix, and use a sum of the second parameter increment and the second state parameter as an updated second state parameter of the second filter Step 5024: Obtain the second modified result based on the updated second state parameter in response to that the updated second state parameter meets a second reference condition

FIG. 5

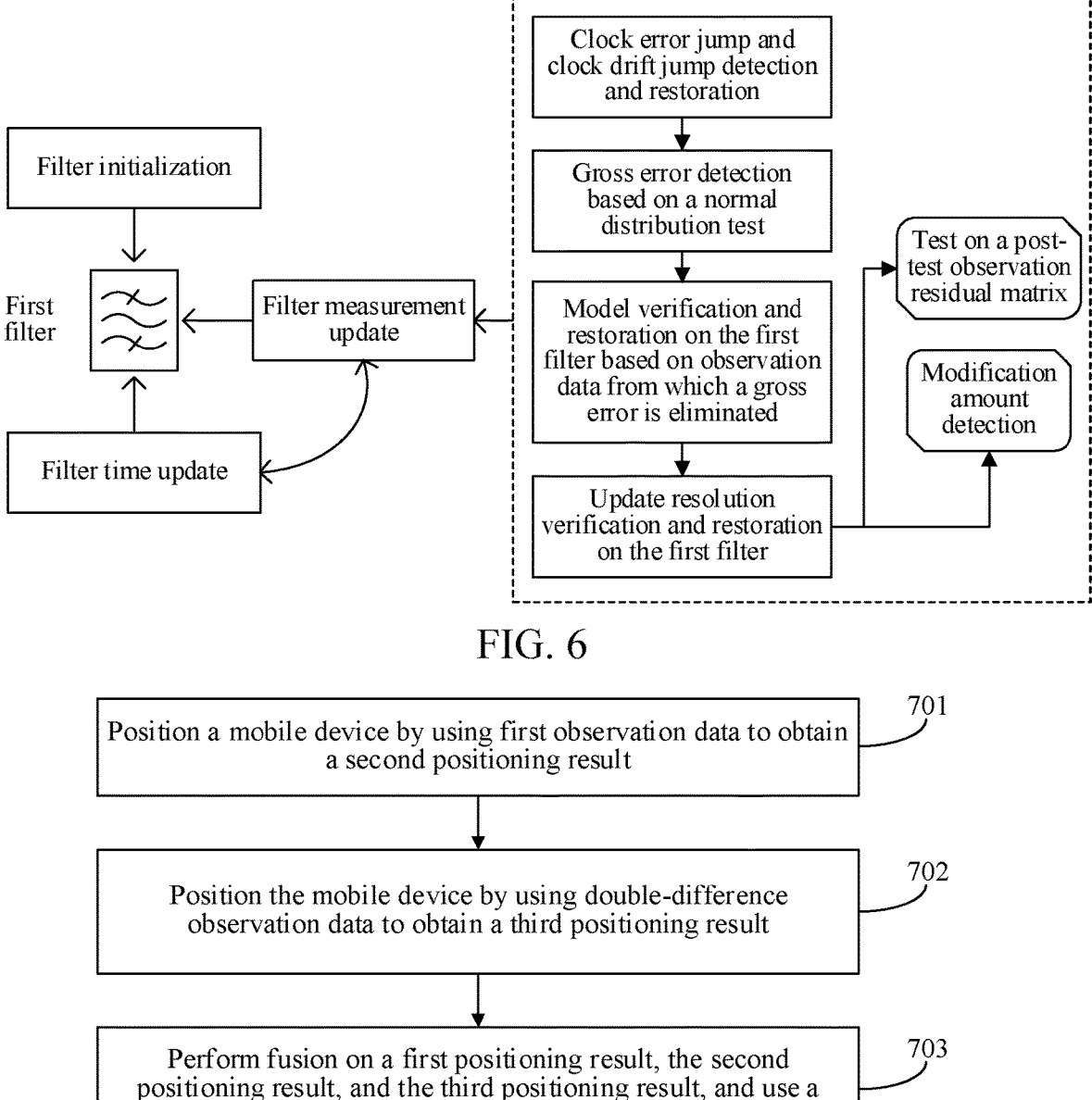

FIG. 6

Position a mobile device by using first observation data to obtain a second positioning result   701

Position the mobile device by using double-difference observation data to obtain a third positioning result   702

Perform fusion on a first positioning result, the second positioning result, and the third positioning result, and use a fusion result as a target positioning result   703

FIG. 7

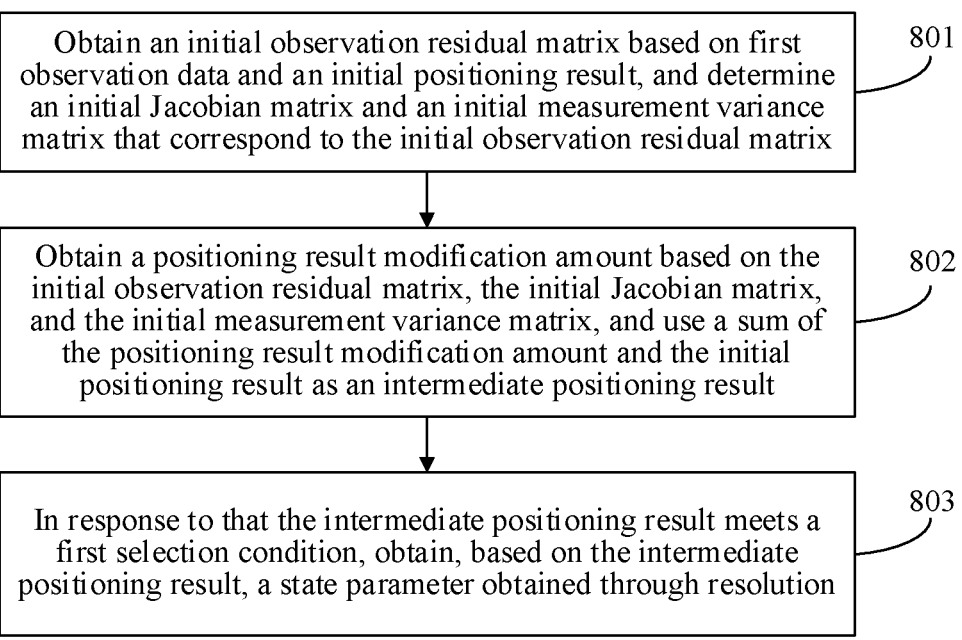

Obtain an initial observation residual matrix based on first observation data and an initial positioning result, and determine an initial Jacobian matrix and an initial measurement variance matrix that correspond to the initial observation residual matrix ⟶ 801

Obtain a positioning result modification amount based on the initial observation residual matrix, the initial Jacobian matrix, and the initial measurement variance matrix, and use a sum of the positioning result modification amount and the initial positioning result as an intermediate positioning result ⟶ 802

In response to that the intermediate positioning result meets a first selection condition, obtain, based on the intermediate positioning result, a state parameter obtained through resolution ⟶ 803

FIG. 8

Positioning apparatus

First obtaining unit — 1401

Positioning unit — 1402

Second obtaining unit — 1403

Third obtaining unit — 1404

Processor — 1501

Radar — 1515

Satellite positioning device — 1516

Memory — 1502

POSITIONING METHOD AND APPARATUS, DEVICE, AND STORAGE MEDIUM

RELATED APPLICATIONS

The present application is a continuation of International Application No. PCT/CN2023/087235, entitled "POSITIONING METHOD AND APPARATUS, DEVICE, AND STORAGE MEDIUM" and filed on Apr. 10, 2023, which claims priority to Chinese Patent Application No. 202210653933.5, entitled "POSITIONING METHOD AND APPARATUS, DEVICE, AND STORAGE MEDIUM" filed on Jun. 9, 2022. The entire disclosures of the prior applications are hereby incorporated by reference in their entirety.

FIELD OF THE TECHNOLOGY

Embodiments of this disclosure relate to the field of navigation technologies, including positioning.

BACKGROUND OF THE DISCLOSURE

With development of navigation technologies, mobile devices need to be positioned in an increasing number of application scenarios. For example, a terminal of a distribution target needs to be positioned in a distribution scenario, and an in-vehicle terminal needs to be positioned in a self-driving scenario.

In the related art, a positioning result for a mobile device is calculated in real time based on observation data received by a satellite positioning device installed on the mobile device.

SUMMARY

Embodiments of this disclosure provide a positioning method and apparatus, a device, and a storage medium, to improve positioning accuracy and positioning robustness. The technical solutions are as follows:

According to some aspects, embodiments of this disclosure provide a positioning method, the method can be performed by a computer device. In some examples, a method of positioning a mobile device includes obtaining point cloud data that is scanned by a radar that is positionally associated with the mobile device, determining a first positioning result of the mobile device according to the point cloud data, obtaining first observation data that is received by a first satellite positioning device that is positionally associated with the mobile device and determining a target positioning result for the mobile device based on the first observation data and the first positioning result. Apparatus and non-transitory computer-readable storage medium counterpart embodiments are also contemplated.

According to another aspect, a computer device is provided, the computer device including a processor (also referred to as processing circuitry) and a memory, the memory storing at least one computer program, and the at least one computer program being loaded and executed by the processor, so that the computer device implements the positioning method according to any one of the foregoing aspects.

According to another aspect, a non-volatile computer-readable storage medium (also referred to as non-transitory computer readable storage medium) is further provided, the non-volatile computer-readable storage medium storing at least one computer program, and the at least one computer program being loaded and executed by a processor, so that a computer implements the positioning method according to any one of the foregoing aspects.

According to another aspect, a computer program product is further provided, the computer program product including a computer program or computer instructions, and the computer program or the computer instructions being loaded and executed by a processor, so that a computer implements the positioning method according to any one of the foregoing aspects.

According to another aspect, a computer program is provided, the computer program including computer instructions, and the computer instructions being loaded and executed by a processor, so that a computer implements the positioning method according to any one of the foregoing aspects.

In the technical solutions provided in embodiments of this disclosure, the final target positioning result for the mobile device is obtained by comprehensively considering the point cloud data scanned by the radar installed on the mobile device and the first observation data received by the satellite positioning device. The point cloud data and the first observation data can complement each other. In this positioning manner, dependency on either of the point cloud data and the first observation data can be weakened. Even if quality of the point cloud data or the first observation data is poor, an accurate target positioning result can be obtained based on the other type of data. Therefore, positioning robustness is good, so that an actual positioning requirement can be met.

BRIEF DESCRIPTION OF THE DRAWINGS

FIG. 1 is a diagram of comparison between effect of single-point positioning and effect of RTK differential positioning.

FIG. 2 is a schematic diagram of an implementation environment of a positioning method according to an embodiment of this disclosure.

FIG. 3 is a flowchart of a positioning method according to an embodiment of this disclosure.

FIG. 4 is a schematic diagram of a process of positioning a mobile device by using point cloud data to obtain a first positioning result according to an embodiment of this disclosure.

FIG. 5 is a flowchart of an implementation process of obtaining a target positioning result on the basis of a first positioning result based on target data according to an embodiment of this disclosure.

FIG. 6 is a schematic diagram of a processing process related to a first filter according to an embodiment of this disclosure.

FIG. 7 is a flowchart of an implementation process of obtaining a target positioning result on the basis of a first positioning result based on target data according to an embodiment of this disclosure.

FIG. 8 is a schematic diagram of a process of resolving a state parameter of a mobile device based on first observation data according to an embodiment of this disclosure.

DESCRIPTION OF EMBODIMENTS

Figure 9:
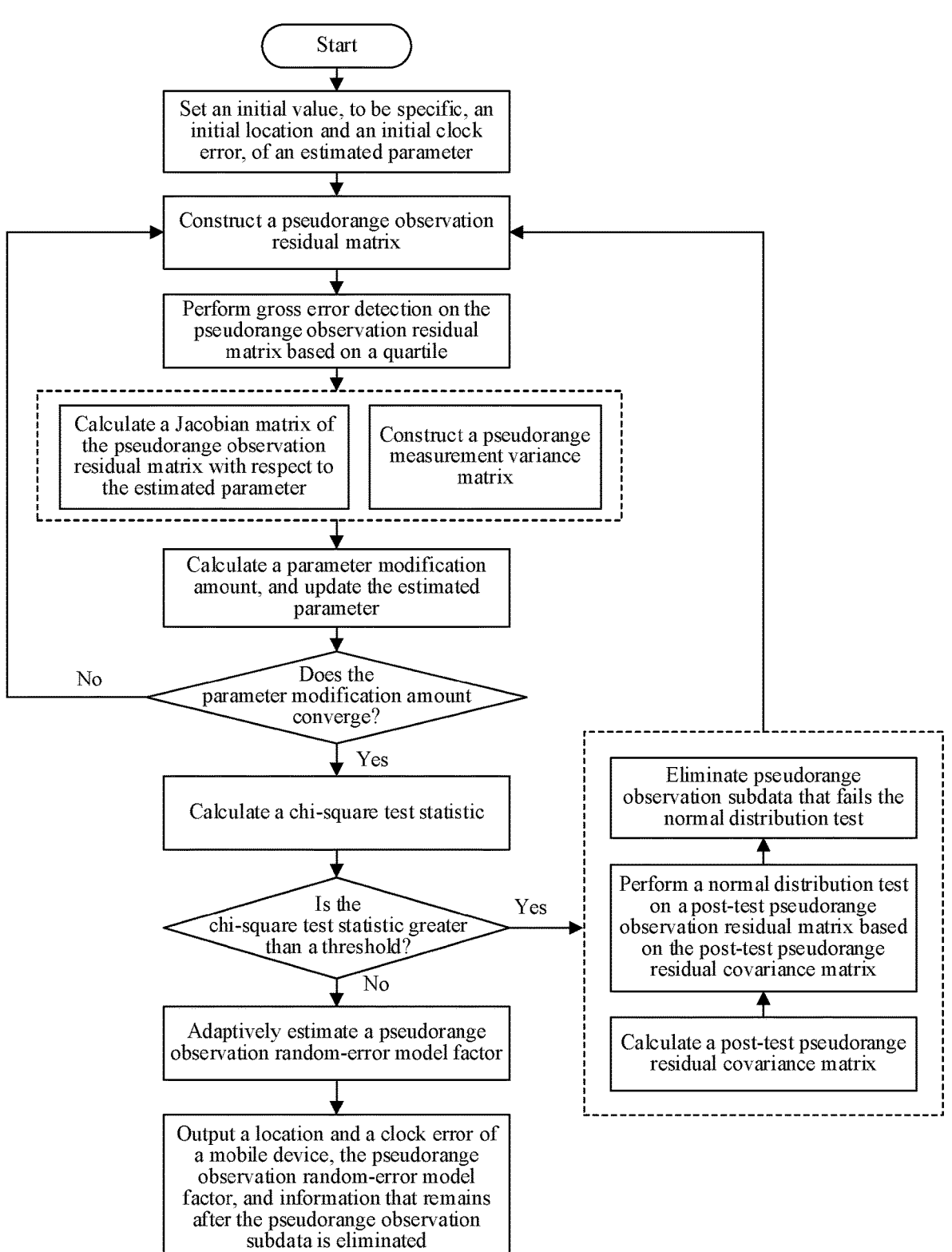
FIG. 9 is a schematic diagram of a process of estimating a location and a clock error of a mobile device by using a robust weighted least square method according to an embodiment of this disclosure.

To make the objectives, technical solutions, and advantages of this disclosure clearer, the following further describes implementations of this disclosure with reference to the accompanying drawings.

Some examples of terms included in embodiments of this disclosure are described in the following.

A global navigation satellite system (GNSS) is, for example, a space-based radio navigation and positioning system capable of providing a user with all-weather three-dimensional coordinates and speed and time information at any place on the Earth's surface or in terrestrial space. Common global navigation satellite systems include four navigation satellite systems: the global positioning system (GPS), the BeiDou navigation satellite system (BDS), the GLONASS system, and the Galileo navigation satellite system (GALILEO). The GPS is the earliest and most technologically comprehensive positioning system. In recent years, the BDS and the GLONASS have provided full services in some regions. Particularly, the BDS has been developing increasingly fast in the civil field. Global navigation satellite systems have been widely used in the fields of communication, positioning, consumer entertainment, surveying and mapping, vehicle management, vehicle navigation and information services, and the like.

A satellite positioning device (also referred to as a satellite signal receiver) includes, for example, an electronic device for receiving and processing a satellite signal and measuring a geometric distance (a pseudorange observation value) between a mobile device and a satellite and Doppler effect (a Doppler observation value) of the satellite signal. The satellite positioning device usually includes an antenna, a satellite signal receiving loop, a baseband signal processing module, and other modules. A mobile device integrated with the satellite positioning device calculates current location coordinates of the mobile device based on the pseudorange observation value and the Doppler observation value. The satellite positioning device is widely used in the fields of map navigation, surveying and mapping, location-based services, deep space exploration, and the like, for example, smartphone map navigation and high-definition geodetic surveying. Observation data outputted by the satellite positioning device includes a pseudorange, a pseudorange rate, and an accumulated delta range (ADR). The pseudorange measures a geometric distance between the satellite and the satellite positioning device. The pseudorange rate observation value measures Doppler effect caused by relative movement of the satellite positioning device and the satellite. The ADR measures a variation of the geometric distance between the satellite and the satellite positioning device.

Pseudorange an approximate distance between a ground receiver (for example, a satellite positioning device installed on a mobile device) and a satellite during satellite positioning. Assuming that a satellite clock and a receiver clock are strictly synchronized, propagation time of a signal may be obtained based on transmitting time of a satellite signal and receiving time of a signal received by the receiver, and then a satellite-ground distance may be obtained by multiplying the propagation time by a propagation speed. However, a clock error inevitably exists between the two clocks, and the signal is also affected by atmospheric refraction and other factors during propagation. Therefore, a distance directly measured by using this method is not equal to a real distance between the satellite and the ground receiver. In this case, the distance is referred to as a pseudorange. Pseudorange observation data in embodiments of this disclosure is observation data of a distance between a satellite and a mobile device.

A continuously operating reference station (CORS) system is, for example, a product resulting from multi-dimensional and in-depth integration of high technologies such as a satellite positioning technology, a computer network technology, and a digital communications technology. The CORS system includes five parts: a reference station network, a data processing center, a data transmission system, a positioning and navigation data broadcasting system, and a user application system. Each reference station is connected to a detection and analysis center through the data transmission system to form a private network.

Real-time kinematic (RTK) differential positioning technology may also be referred to as a carrier-phase differential positioning technology. The RTK differential positioning technology is, for example, a real-time kinematic positioning technology based on carrier phase observation values, and can provide a three-dimensional positioning result for an observation station in a specified coordinate system in real time and achieve centimeter-level accuracy. In an RTK positioning mode, a reference station transmits its observation values and coordinate information of an observation station to a rover station through a data link. The rover station receives data from the reference station through the data link, and captures observation data of a satellite for real-time processing. Compared with conventional single-point positioning, the RTK differential positioning can eliminate impact of an atmospheric delay error, a satellite clock error, and a terminal receiver clock error, and can further eliminate impact of a spatial system error, a propagation error, and an environmental error, thereby achieving higher positioning accuracy and stability than the conventional single-point positioning. For example, a diagram of comparison between effect of the single-point positioning and effect of the RTK differential positioning is shown in FIG. 1. A positioning error of the conventional single-point positioning is 5 m to 20 m, and a positioning error of the RTK differential positioning is 3 cm to 5 cm.

Lidar includes, for example, a distance sensor using infrared light as a laser source is also referred to as a lidar. The lidar operates based on a reflection principle similar to that of a radar. An obstacle within an effective range of laser light performs reflection due to blocking of a light source. In this way, three-dimensional (3D) obstacle distance information on a same plane to which a laser source belongs can be obtained, and matching and positioning or location and orientation resolution is performed based on the obtained information. Currently, an increasing number of mobile devices are equipped with lidars.

In an example of a quartile, all data is sorted in ascending order and divided into four equal parts. Each part includes 25% of the data, and a value at each division point is a quartile. Three quartiles exist. The first quartile is a commonly known quartile, referred to as a lower quartile. The second quartile is a median. The third quartile is referred to as an upper quartile. The three quartiles are respectively denoted as Q1, Q2 and Q3. The first quartile (Q1), also referred to as the lower quartile, is a number at a 25% place among all values in a sequence sorted in ascending order. The second quartile (Q2), also referred to as the median, is a number at a 50% place among all the values in the sequence sorted in ascending order. The third quartile (Q3), also referred to as the upper quartile, is a number at a 75% place among all the values in the sequence sorted in ascending order.

Pseudorange observation data indicates, for example, an approximate distance between a satellite signal receiver (for example, a satellite positioning device) and a satellite during satellite positioning.

Doppler observation data indicates, for example, a Doppler measurement or a Doppler count, measured by a satellite signal receiver, of a radio signal transmitted by a satellite.

Carrier phase observation data indicates, for example, a phase difference between a carrier signal or subcarrier signal transmitted by a satellite and a local oscillator signal of a satellite signal receiver.

Elevation includes, for example, an included angle between a horizontal plane and a directional line from a point at which a satellite signal receiver is located to a satellite.

in an example, clock error in this disclosure includes a satellite clock error and a mobile device clock error. The satellite clock error is a difference between a satellite clock and standard time. The mobile device clock error may also be referred to as a receiver clock error, to be specific, a difference between a receiver clock and standard time.

In an example, clock drift includes a clock error change rate. A clock drift in this disclosure includes a mobile device clock drift and a satellite clock drift. The mobile device clock drift is a receiver clock error change rate. The satellite clock drift is a satellite clock error change rate.

Epoch is, for example, a starting moment of a period and an event or a reference date of a measurement system. To compare observation results at different moments, observation moments corresponding to observation data need to be specified. These moments are referred to as observation epochs.

In the related art, a positioning result for a mobile device is calculated in real time based on observation data received by a satellite positioning device installed on the mobile device. Positioning accuracy in this positioning manner is limited by quality of the observation data. In a case that the quality of the observation data is poor, inaccurate positioning and poor positioning robustness are likely to occur, making it difficult to meet an actual positioning requirement. Therefore, a positioning method for improving positioning accuracy and positioning robustness urgently needs to be provided.

FIG. 2 is a schematic diagram of an implementation environment of a positioning method according to an embodiment of this disclosure. As shown in FIG. 2, the implementation environment may include a mobile device 110, a reference station 120, a satellite cluster 130, and a server 140.

The mobile device 110 is connected to the server 140 through a wireless network or a wired network. In some embodiments, the mobile device 110 may be a mobile phone, a computer, a smart voice interaction device, a smart home appliance, an in-vehicle terminal, an aircraft, or the like, but is not limited thereto. An application that supports a positioning service is installed and run on the mobile device 110. In some embodiments, a navigation application is run on the mobile device 110, and a user can implement a navigation function by using the navigation application. In some embodiments, a satellite positioning device is installed on the mobile device 110, and the mobile device 110 can communicate with the satellite cluster 130 through the satellite positioning device to obtain observation data. In some embodiments, a radar is installed on the mobile device 110, and the radar can scan point cloud data around the mobile device 110.

In some embodiments, the reference station 120 is a CORS system. The reference station 120 can communicate with the satellite cluster 130 to obtain parameters of satellites in the satellite cluster 130. Certainly, the reference station 120 can also communicate with the mobile device 110 or the server 140 to transmit a navigation ephemeris, raw observation data, and the like of the satellite cluster to the mobile device 110 or the server 140.

In some embodiments, the server 140 is an independent physical server, a server cluster or a distributed system that includes a plurality of physical servers, or a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. In some embodiments, the server 140 can communicate with the mobile device 110, and the server 140 provides a navigation-related operation service (for example, differential service broadcasting and location reporting). In some embodiments, the server 140 is also referred to as a high-precision positioning server platform.

The positioning method provided in embodiments of this disclosure is performed by a computer device. The computer device may be the mobile device 110 or the server 140. To be specific, the positioning method provided in embodiments of this disclosure may be performed by the mobile device 110, the server 140, or both the mobile device 110 and the server 140. This is not limited in embodiments of this disclosure.

It is to be understood that the mobile device 110, the reference station 120, the satellite cluster 130, and the server 140 are only examples, and other existing or possible future mobile devices, reference stations, satellite clusters, or servers applicable to this disclosure also fall within the protection scope of this disclosure and are incorporated herein by reference.

For example, the positioning method provided in embodiments of this disclosure may be applied to in-vehicle scenarios, the map field, and the transportation field.

Based on the implementation environment shown in FIG. 2, embodiments of this disclosure provide a positioning method. For example, the method is applied to the mobile device 110. As shown in FIG. 3, the positioning method provided in embodiments of this disclosure may include the following step 301 to step 303.

In step 301, point cloud data scanned by a radar installed on the mobile device is obtained, and the mobile device is positioned by using the point cloud data to obtain a first positioning result.

The radar is installed on the mobile device, and the radar can scan point cloud data around the mobile device. The mobile device can obtain the point cloud data scanned by the radar. The point cloud data obtained in embodiments of this disclosure is point cloud data scanned by the radar at a current positioning moment.

For example, the radar installed on the mobile device may be a lidar. The lidar detects an obstacle within an effective range by emitting laser light, and can scan, by emitting laser light, information about an obstacle on a same plane to which a laser source belongs. The information about the obstacle may be represented by point cloud data. For example, the point cloud data may be three-dimensional point cloud data or two-dimensional point cloud data. The point cloud data is a data set of points in a coordinate system. Data of each point may include location information, color information, reflection strength information, and the like.

The obtaining of the point cloud data is related to the radar, but not to a GNSS signal. Regardless of quality of the GNSS signal, the radar installed on the mobile device can scan the point cloud data, and then obtain the first positioning result for the mobile device based on the point cloud data. In this way, the first positioning result provides data support for obtaining a final target positioning result, to weaken dependency of the target positioning result on the quality of the GNSS signal. This can improve accuracy and robustness of the target positioning result.

In an exemplary embodiment, a process of positioning the mobile device by using the point cloud data to obtain the first positioning result includes: performing matching between the point cloud data and historical point cloud data in a previous frame of the point cloud data to obtain point cloud matching information; determining a location variation based on the point cloud matching information; and modifying a historical location of the mobile device based on the location variation to obtain a first location, and using a positioning result including the first location as the first positioning result.

For example, the historical point cloud data in the previous frame of the point cloud data may be point cloud data scanned at a previous scanning moment by the radar installed on the mobile device. A process of performing matching between the point cloud data and the historical point cloud data in the previous frame of the point cloud data may be implemented based on a normal distributions transform (NDT) algorithm. The NDT can determine optimal matching between two point clouds by using a standard optimization technology. A feature of a corresponding point is not used for calculation or matching during registration. Therefore, a matching speed is faster than that in other methods. The NDT registration algorithm has stable time consumption and is less dependent on an initial value. Therefore, correction can be well performed in a case that an error of the initial value is large.

The point cloud matching information is used for indicating a point cloud matching relationship between the point cloud data and the historical point cloud data in the previous frame of the point cloud data. A location variation can be determined based on the point cloud matching information. The location variation is used for indicating a change of a current location relative to a historical location. The historical location is a location in a historical positioning result.

The historical positioning result may be a positioning result at a positioning moment earlier than the current positioning moment.

After the location variation is determined, the historical location of the mobile device is modified based on the location variation to obtain the first location. The first location may be considered as the current location of the mobile device that is determined based on the point cloud data. For example, a manner of modifying the historical location of the mobile device based on the location variation to obtain the first location may be: using a sum of the location variation and the historical location as the first location.

For example, accuracy of the location variation determined based on the point cloud matching information may be poor. After the location variation is obtained, a modification equation corresponding to the location variation may be determined. The modification equation corresponding to the location variation may be used for indicating how to modify the historical location of the mobile device based on the location variation. For example, the location variation is substituted into a modification equation with an unknown location variation to obtain the modification equation corresponding to the location variation. The modification equation with an unknown location variation may be set based on experience. In some embodiments, the modification equation corresponding to the location variation may also be referred to as a constraint equation corresponding to the location variation.

After the modification equation corresponding to the location variation is determined, the historical location of the mobile device is modified based on the modification equation corresponding to the location variation, and a modified location is used as the first location. For example, the modification equation corresponding to the location variation may be an equation with a to-be-modified location as an independent variable and with a modified location as a dependent variable. An implementation of modifying the historical location of the mobile device based on the modification equation corresponding to the location variation to obtain the first location may be: substituting a value of the historical location as an independent variable into the modification equation corresponding to the location variation, and using a calculated value of a dependent variable as the first location.

For example, a manner of modifying the historical location of the mobile device based on the location variation to obtain the first location may alternatively be: using a sum of the location variation and the historical location of the mobile device as a reference location; and modifying the reference location through filtering by using a reference filter to obtain the first location. The reference filter may be any filter. For example, a type of the reference filter may include but is not limited to a Kalman filter (EF), an extended Kalman filter (EKF), an unscented Kalman filter, a robust Kalman filter, and the like. In a process of modifying the reference location through filtering by using the reference filter, a to-be-modified state parameter of the reference filter is determined based on the reference location, and a matrix (for example, a measurement update matrix or a measurement variance matrix) required for modification through filtering may be set based on a matching degree of the point cloud matching information.

After the first location is determined, the positioning result including the first location is used as the first positioning result for the mobile device. Types of parameters included in the first positioning result are not limited in embodiments of this disclosure, provided that the types of the parameters included in the first positioning result include a location type. For example, the types of the parameters included in the first positioning result may further include a speed type in addition to the location type. For example, in a case that the types of the parameters included in the first positioning result further include the speed type, a speed in the historical positioning result may be used as a speed in the first positioning result, or a speed specified based on experience may be used as a speed in the first positioning result. This is not limited in embodiments of this disclosure.

For example, a process of positioning the mobile device by using the point cloud data to obtain the first positioning result may be shown in FIG. 4. First, the point cloud data scanned by the radar installed on the mobile device is obtained. Then matching is performed between the point cloud data and the historical point cloud data in the previous frame of the point cloud data based on the NDT algorithm to obtain the location variation. The constraint equation corresponding to the location variation is determined. The historical location is modified based on the constraint equation corresponding to the location variation to obtain the first location, and the positioning result including the first location is used as the first positioning result.

In step 302, first observation data received by a satellite positioning device installed on the mobile device is obtained.

The satellite positioning device is installed on the mobile device, and the satellite positioning device can receive, in real time, observation data provided by a GNSS system. The mobile device can obtain the observation data received by the satellite positioning device. The first observation data obtained in embodiments of this disclosure is observation data received by the satellite positioning device at the current positioning moment. For example, the first observation data may include at least one of first pseudorange observation data, first Doppler observation data, and first carrier phase observation data.

For example, the first observation data is observation data of a first satellite, to be specific, observation data between the first satellite and the mobile device, and the first satellite is satellites from which signals are obtained at the current positioning moment for the mobile device. For example, a plurality of first satellites exist, to ensure accuracy of a positioning result obtained based on observation data. The first observation data includes observation subdata corresponding to the first satellite, and each first satellite has corresponding observation subdata. In a case that the first observation data includes the first pseudorange observation data, observation subdata corresponding to any first satellite includes pseudorange observation subdata corresponding to the first satellite. In a case that the first observation data includes the first Doppler observation data, observation subdata corresponding to any first satellite includes Doppler observation subdata corresponding to the first satellite. In a case that the first observation data includes the first carrier phase observation data, observation subdata corresponding to any first satellite includes carrier phase observation subdata corresponding to the first satellite.

For example, the mobile device may be connected to a CORS system based on the NTRIP protocol, and transmit an observation data obtaining request to the CORS system. Then the CORS system broadcasts the first observation data to the satellite positioning device installed on the mobile device, so that the satellite positioning device installed on the mobile device receives the first observation data. The NTRIP protocol stands for the Networked Transport of RTCM via Internet Protocol. RTCM is a protocol developed by the Radio Technical Commission for Maritime Services. In some embodiments, the observation data obtaining request transmitted by the mobile device to the CORS system may also be referred to as an observation data broadcast request.

For example, in addition to transmitting the observation data broadcast request to the CORS system, the mobile device may further transmit an ephemeris obtaining request to the CORS system. After receiving the ephemeris obtaining request, the CORS system may obtain a navigation ephemeris of the first satellite from a satellite ephemeris database, and transmit the navigation ephemeris of the first satellite to the mobile device, so that the mobile device obtains the navigation ephemeris of the first satellite. The navigation ephemeris of the first satellite may include a list of parameters for determining state information of the first satellite. For example, the CORS system may transmit the navigation ephemeris of the first satellite to the mobile device in a form of a binary stream.

For example, the mobile device may obtain the state information of the first satellite based on the first observation data and the navigation ephemeris of the first satellite. In a case that the first observation data includes only the first pseudorange observation data, the state information of the first satellite includes a satellite location and a satellite clock error; in a case that the first observation data includes only the first Doppler observation data, the state information of the first satellite includes a satellite speed (namely, a satellite operating speed) and a satellite clock drift; or in a case that the first observation data includes the first pseudorange observation data and the first Doppler observation data, the satellite state information includes a satellite location, a satellite clock error, a satellite speed, and a satellite clock drift.

For example, the number of first satellites may be N (N is a positive integer). One first satellite corresponds to one piece of pseudorange observation data, one piece of Doppler observation data, one satellite location, one satellite clock error, one satellite speed, and one satellite clock drift at one moment. Different first satellites may correspond to different satellite locations, satellite clock errors, satellite speeds, and satellite clock drifts. For example, in a case that the first observation data includes the first pseudorange observation data, a satellite location and a satellite clock error that correspond to each first satellite may be calculated based on the received first pseudorange observation data and the navigation ephemeris of the first satellite; or in a case that the first observation data includes the first Doppler observation data, a satellite speed and a satellite clock drift that correspond to each first satellite may be calculated based on the received first Doppler observation data and the navigation ephemeris of the first satellite.

For example, the location included in embodiments of this disclosure may be a location in an Earth-centered, Earth-fixed (ECEF) rectangular coordinate system. In the ECEF coordinate system, the center O of the Earth is an origin of coordinates, a Z-axis points to the North Pole of the Earth, an X-axis points to an intersection between the prime meridian and the equator of the Earth, and the X-axis, a Y-axis, and the Z-axis constitute a right-handed rectangular coordinate system.

For example, in the case of obtaining the first observation data, a signal-to-noise ratio of the first observation data and an elevation of the first satellite may be further obtained. The signal-to-noise ratio may also be referred to as a carrier-to-noise ratio, and is a standard measurement scale for indicating a relationship between a carrier and carrier noise. Observation subdata that is included in the first observation data and that corresponds to each first satellite corresponds to a respective signal-to-noise ratio. Different types of observation subdata corresponding to any first satellite may correspond to a same signal-to-noise ratio or different signal-to-noise ratios. For example, the elevation of the first satellite is an included angle between a horizontal plane of the mobile device and a directional line of a connection line between the satellite positioning device installed on the mobile device and the first satellite. For example, the signal-to-noise ratio of the first observation data and the elevation of the first satellite may be determined by the CORS system based on the first observation data and transmitted to the mobile device, or may be determined by the mobile device based on the first observation data. This is not limited in embodiments of this disclosure.

In step 303, a target positioning result for the mobile device is obtained based on the first observation data and the first positioning result.

The first observation data is observation data received by the satellite positioning device installed on the mobile device. The first positioning result is a positioning result obtained by using the point cloud data scanned by the radar installed on the mobile device. The target positioning result for the mobile device is obtained based on the first observation data and the first positioning result, so that dependency of a positioning process on either of the point cloud data and the first observation data can be weakened. Even if quality of the point cloud data or the first observation data is poor, accuracy of the target positioning result can be ensured additionally based on the other type of data. This reduces a probability of a positioning failure, and improves positioning robustness.

In an example implementation, an implementation process of obtaining the target positioning result for the mobile device based on the first observation data and the first positioning result includes the following step 3031 and step 3032.

Step 3031: Obtain target data based on the first observation data, the target data including at least one of the first observation data and double-difference observation data, and the double-difference observation data being calculated based on the first observation data and reference observation data received by a satellite positioning device installed on a reference station.

The target data is data required for obtaining the target positioning result on the basis of the first positioning result. The target data is satellite observation data. The satellite observation data and the point cloud data based on which the first positioning result is obtained can complement each other, to improve positioning accuracy. For example, the target data may include only the first observation data, only the double-difference observation data, or both the first observation data and the double-difference observation data. A specific case of the target data may be set based on experience or flexibly adjusted based on an actual application scenario. This is not limited in embodiments of this disclosure. For example, in a case that the target data includes the first observation data and the double-difference observation data, satellite observation data based on which the target positioning result is obtained is more comprehensive, so that accuracy of the target positioning result can be further improved.

In different cases of the target data, an implementation of obtaining the target data based on the first observation data varies. For example, in a case that the target data includes only the first observation data, an implementation of obtaining the target data based on the first observation data is as follows: using the first observation data as the target data. For example, in a case that the target data includes only the double-difference observation data, an implementation of obtaining the target data based on the first observation data is as follows: obtaining reference observation data; calculating the double-difference observation data based on the first observation data and the reference observation data; and using the double-difference observation data as the target data. For example, in a case that the target data includes the first observation data and the double-difference observation data, an implementation of obtaining the target data based on the first observation data is as follows: obtaining reference observation data; calculating the double-difference observation data based on the first observation data and the reference observation data; and using data including the first observation data and the double-difference observation data as the target data.

The reference observation data is observation data received by the satellite positioning device installed on the reference station. The reference station may be any base station equipped with a satellite positioning device. Observation data for the first satellite that is received by the satellite positioning device installed on the reference station is used as the reference observation data. The reference observation data includes reference observation subdata corresponding to the first satellite. For example, the reference observation subdata corresponding to the first satellite includes at least one of reference pseudorange observation subdata, reference Doppler observation subdata, and reference carrier phase observation subdata that correspond to the first satellite.

For example, the reference station is a base station with a fixed and known location, to provide data support for positioning the mobile device. For example, the reference observation data received by the satellite positioning device installed on the reference station may be obtained through communication with the CORS system or the reference station. This is not limited in embodiments of this disclosure.

After the reference observation data is obtained, the double-difference observation data is calculated based on the first observation data and the reference observation data. For example, the first observation data includes the first pseudorange observation subdata and the first carrier phase observation subdata that correspond to the first satellite, and the reference observation data includes the reference pseudorange observation subdata and the reference carrier phase observation subdata that correspond to the first satellite. The double-difference observation data includes pseudorange double-difference observation data and carrier phase double-difference observation data. In some embodiments, the double-difference observation data may alternatively be in other cases. Details are not described herein.

For example, the pseudorange double-difference observation data includes pseudorange double-difference observation values respectively corresponding to satellites included in the first satellite other than a reference satellite. A pseudorange double-difference observation value corresponding to any other satellite is a difference between a first pseudorange observation difference corresponding to the any other satellite and a second pseudorange observation difference corresponding to the any other satellite. The first pseudorange observation difference corresponding to the any other satellite is a difference between first pseudorange observation subdata corresponding to the reference satellite and first pseudorange observation subdata corresponding to the any other satellite. The second pseudorange observation difference corresponding to the any other satellite is a difference between reference pseudorange observation subdata corresponding to the reference satellite and reference pseudorange observation subdata corresponding to the any other satellite. The reference satellite is any one of the first satellite and may be selected based on experience.

For example, a first satellite 1 serves as the reference satellite. In this case, a pseudorange double-difference observation value corresponding to a first satellite 2 may be expressed as follows:

$$\rho_{rb}^{12} = \rho_r^1 - \rho_r^2 - (\rho_b^1 - \rho_b^2),$$

where $$\rho_r^1$$

represents first pseudorange observation subdata corresponding to the first satellite 1, $$\rho_r^2$$

represents first pseudorange observation subdata corresponding to the first satellite 2, $$\rho_b^1$$

represents reference pseudorange observation subdata corresponding to the first satellite 1, and $$\rho_b^2$$

represents reference pseudorange observation subdata corresponding to the first satellite 2.

For example, the carrier phase double-difference observation data includes carrier phase double-difference observation values respectively corresponding to satellites included in the first satellite other than a reference satellite. A carrier phase double-difference observation value corresponding to any other satellite is a difference between a first carrier phase observation difference corresponding to the any other satellite and a second carrier phase observation difference corresponding to the any other satellite. The first carrier phase observation difference corresponding to the any other satellite is a difference between first carrier phase observation subdata corresponding to the reference satellite and first carrier phase observation subdata corresponding to the any other satellite. The second carrier phase observation difference corresponding to the any other satellite is a difference between reference carrier phase observation subdata corresponding to the reference satellite and reference carrier phase observation subdata corresponding to the any other satellite.

For example, a first satellite 1 serves as the reference satellite. In this case, a carrier phase double-difference observation value corresponding to a first satellite 2 may be expressed as follows:

$$\varphi_{rb}^{12} = \varphi_r^1 - \varphi_r^2 - (\varphi_b^1 - \varphi_b^2),$$

where $$\varphi_r^1$$

represents first carrier phase observation subdata corresponding to the first satellite 1, $$\varphi_r^2$$

represents first carrier phase observation subdata corresponding to the first satellite 2, $$\varphi_b^1$$

represents reference carrier phase observation subdata corresponding to the first satellite 1, and $$\varphi_b^2$$

represents reference carrier phase observation subdata corresponding to the first satellite 2.

For example, the double-difference observation data is obtained based on the first observation data received by the satellite positioning device installed on the mobile device and the reference observation data received by the satellite positioning device installed on the reference station. The double-difference observation data can incorporate not only a difference between subdata of a same satellite that is received by the satellite positioning device installed on the mobile device and the satellite positioning device installed on the reference station, but also a difference between subdata of different satellites that is received by a same satellite positioning device (the satellite positioning device installed on the mobile device or the satellite positioning device installed on the reference station). The double-difference observation data is considered, so that specific errors (for example, an atmospheric delay error, a satellite clock error, and a mobile device clock error) can be eliminated, and positioning accuracy can be improved.

Step 3032: Obtain the target positioning result on the basis of the first positioning result based on the target data.

The target data may include only the first observation data, only the double-difference observation data, or both the first observation data and the double-difference observation data. In different cases of the target data, a specific implementation process of obtaining the target positioning result on the basis of the first positioning result based on the target data varies. The specific implementation process of obtaining the target positioning result on the basis of the first positioning result based on the target data is described in detail below. Details are not described herein.

For example, a process of obtaining the target positioning result on the basis of the first positioning result based on the target data is implemented based on a result obtaining manner corresponding to the target data. The result obtaining manner corresponding to the target data is used for indicating how to obtain the target positioning result on the basis of the first positioning result based on the target data.

The result obtaining manner corresponding to the target data may be set based on experience or flexibly adjusted based on an actual application scenario. This is not limited in embodiments of this disclosure. For example, the result obtaining manner corresponding to the target data varies in different cases. The result obtaining manner corresponding to the target data in any case may be any one of a plurality of candidate manners, and each candidate manner corresponds to a specific implementation process.

Step 3031 and step 3032 are an exemplary implementation of obtaining the target positioning result for the mobile device based on the first observation data and the first positioning result, but embodiments of this disclosure are not limited thereto. In some embodiments, the first observation data may be directly considered as data required for obtaining the target positioning result on the basis of the first positioning result. In this way, the target positioning result is directly obtained on the basis of the first positioning result based on the first observation data.

In the positioning method provided in embodiments of this disclosure, the final target positioning result for the mobile device is obtained by comprehensively considering the point cloud data scanned by the radar installed on the mobile device and the first observation data received by the satellite positioning device. The point cloud data and the first observation data can complement each other. In this positioning manner, dependency on either of the point cloud data and the first observation data can be weakened. Even if quality of the point cloud data or the first observation data is poor, an accurate target positioning result can be obtained based on the other type of data. Therefore, positioning robustness is good, so that an actual positioning requirement can be met.

In addition, the target data required for obtaining the target positioning result on the basis of the first positioning result is satellite observation data. The satellite observation data and the point cloud data based on which the first positioning result is obtained can complement each other, to improve positioning accuracy. In a case that the target data includes the first observation data and the double-difference observation data, satellite observation data based on which the target positioning result is obtained is more comprehensive, so that accuracy of the target positioning result can be further improved.

The double-difference observation data can incorporate not only a difference between subdata of a same satellite that is received by the satellite positioning device installed on the mobile device and the satellite positioning device installed on the reference station, but also a difference between subdata of different satellites that is received by a same satellite positioning device (the satellite positioning device installed on the mobile device or the satellite positioning device installed on the reference station). The double-difference observation data is considered, so that specific errors (for example, an atmospheric delay error, a satellite clock error, and a mobile device clock error) can be eliminated, and positioning accuracy can be improved.

Embodiments of this disclosure provide an implementation process of obtaining a target positioning result on the basis of a first positioning result based on target data. The implementation process is a specific implementation process in a case that the target data includes first observation data and double-difference observation data. For example, the method is applied to the mobile device 110. As shown in FIG. 5, the method provided in embodiments of this disclosure may include the following step 501 and step 502.

In step 501, the first positioning result is modified by using the first observation data to obtain a first modified result.

The first modified result is a result obtained by modifying the first positioning result by using the first observation data. For example, a type of a parameter included in the first modified result is the same as a type of a parameter included in the first positioning result. For example, a process of modifying the first positioning result by using the first observation data may be implemented by a first filter. The first filter is any filter. For example, a type of the first filter may include but is not limited to a Kalman filter, an extended Kalman filter, an unscented Kalman filter, a robust Kalman filter, and the like. This is not limited in embodiments of this disclosure.

In an example implementation, as shown in FIG. 5, an implementation process of modifying the first positioning result by using the first observation data to obtain the first modified result includes the following step 5011 to step 5014.

Step 5011: Obtain a first state parameter of a first filter based on the first positioning result, and obtain a first state covariance matrix corresponding to the first state parameter.

The first state parameter is a to-be-updated state parameter of the first filter. For example, a type of a parameter in the state parameter of the first filter includes a type of a parameter in a positioning result for the mobile device. For example, the type of the parameter in the positioning result for the mobile device includes a location and a speed. The state parameter may be expressed as follows: $z=[r_u \ v_u \ dtr \ d\dot{t}r]^T$, where $[ \ ]^T$ indicates to transpose a matrix, $r_u$ and $v_u$ represent a location and a speed of the mobile device respectively, dtr represents a clock error of the mobile device (namely, a receiver clock error), and $d\dot{t}r$ represents a clock drift of the mobile device (namely, a receiver clock drift). For example, $r_u$ and $v_u$ are a location and a speed in an ECEF coordinate system.

In an exemplary embodiment, a manner of obtaining the first state parameter of the first filter based on the first positioning result may be: using the first positioning result as the first state parameter. In an exemplary embodiment, a manner of obtaining the first state parameter of the first filter based on the first positioning result may alternatively be: using the first positioning result as an initial state parameter, and performing a time update on the initial state parameter to obtain the first state parameter.

The first state covariance matrix may be used for representing a correlation between first state parameters. The first state covariance matrix is a diagonal matrix and also a symmetric matrix. For example, the first state covariance matrix may be set based on experience in a case that the first positioning result is used as the first state parameter. For example, the first state covariance matrix is set as follows: $P=diag(100^2, 100^2, 100^2, 100^2)$, where diag represents a diagonal matrix. For example, in the case of using the first positioning result as the initial state parameter and performing the time update on the initial state parameter to obtain the first state parameter, a manner of obtaining the first state covariance matrix corresponding to the first state parameter may be: obtaining an initial state covariance matrix corresponding to the initial state parameter, performing a time update on the initial state covariance matrix, and using a covariance matrix obtained through the time update as the first state covariance matrix corresponding to the first state parameter.

An example in which the first state parameter is obtained through the time update on the initial state parameter and the first state covariance matrix is obtained through the time update on the initial covariance matrix is used for description.

During the time update on the initial state parameter, the initial state parameter may be updated one or more times. The initial state parameter of the first filter is denoted as x(0). The initial state covariance matrix of the first filter is denoted as P(0). x(0) may be considered as a state parameter of the first filter at a moment 0. P(0) may be considered as a state covariance matrix of the first filter at the moment 0. A next state parameter (at a moment 1) obtained through a time update on the first filter may be denoted as x(1), and a next state covariance matrix may be denoted as P(1). By analogy, a state parameter of the first filter at a moment t may be denoted as x(t), and a state covariance matrix at the moment t may be denoted as P(t). Assuming that a current moment is the moment t, x(t) is the first state parameter of the first filter, and P(t) is the first state covariance matrix of the first filter.

For example, a process of performing the time update on the initial state covariance matrix includes: Assuming that a state covariance matrix of the filter at a moment $t_k$ is $P(t_k)$, a state covariance matrix of the filter at a moment $t_{k+1}$ is calculated based on the following formula 1:

$$P(t_{k+1}) = F(t_k) \cdot P(t_k) \cdot F(t_k)^T + Q(t_k) \qquad \text{(Formula 1)}$$

$P(t_{k+1})$ represents the state covariance matrix of the first filter at the moment $t_{k+1}$. $F(t_k)$ represents a state transition matrix, and $F(t_k)$ may be calculated based on the following formula 2. $Q(t_k)$ represents a noise covariance matrix, and $Q(t_k)$ may be calculated based on the following formula 3. $F(t_k)^T$ represents a transposed matrix of the state transition matrix.

$$F(t_k) = \begin{bmatrix} I_3 & I_3 \cdot dt & 0 & 0 \\ 0 & I_3 & 0 & 0 \\ 0 & 0 & \tau_d - \tau_d \cdot e^{-\frac{dt}{\tau_d}} & 0 \\ 0 & 1 & 0 & e^{-\frac{dt}{\tau_d}} \end{bmatrix} \qquad \text{(Formula 2)}$$

dt represents a time difference between adjacent epochs. $I_3$ represents an identity matrix. $\tau_d$ represents time related to a Markov process and is usually an empirical value.

$$Q(t_k) = \begin{bmatrix} \dfrac{PSD_v \cdot dt^3}{3} & \dfrac{PSD_v \cdot dt^2}{2} & 0 & 0 \\ \dfrac{PSD_v \cdot dt^2}{2} & PSD_v \cdot dt^3 & 0 & 0 \\ 0 & 0 & PSD_{dtr} \cdot dt + \dfrac{PSD_{dtr} \cdot dt^3}{3} & \dfrac{PSD_{dtr} \cdot dt^2}{2} \\ 0 & 0 & \dfrac{PSD_{dtr} \cdot dt^2}{2} & PSD_{dtr} \cdot dt \end{bmatrix} \qquad \text{(Formula 3)}$$

dt represents a time difference between adjacent epochs. $PSD_v$ is speed system noise of the first filter, and $PSD_v$ may be calculated based on a variance value corresponding to a historical speed sequence and the time difference between adjacent epochs. $PSD_{dtr}$ is clock error system noise of the first filter, and $PSD_{dtr}$ may be calculated based on a variance value corresponding to a historical clock error sequence and the time difference between adjacent epochs. $PSD_{dtr}$ is clock drift system noise of the first filter, and $PSD_{dtr}$ may be calculated based on a variance value corresponding to a historical clock drift sequence and the time difference between adjacent epochs. For example, the historical speed sequence, the historical clock error sequence, and the historical clock drift sequence may be determined from a historical positioning result corresponding to the mobile device by using a time sliding window. For example, historical positioning result information corresponding to the mobile device may be a positioning result obtained in a process of resolving a state parameter of the mobile device based on the first observation data.

For example, a process of performing the time update on the initial state parameter includes: A state parameter of the first filter at the moment $t_{k+1}$ is calculated based on a formula 4:

$$x(t_{k+1}) = F(t_k) \cdot x(t_k) \qquad \text{(Formula 4)}$$

$x(t_{k+1})$ represents the state parameter of the first filter at the moment $t_{k+1}$. $x(t_k)$ represents a state parameter of the first filter at the moment $t_k$. $F(t_k)$ represents a state transition matrix.

A process of performing the time update on the initial state parameter of the first filter can be implemented based on the formula 4, and a process of performing the time update on the initial state covariance matrix of the first filter can be implemented based on the formula 1 to the formula 3. After the time updates are completed, a state parameter of the first filter is referred to as the first state parameter, and a state covariance matrix of the first filter is referred to as the first state covariance matrix.

Step 5012: Obtain a first observation residual matrix based on the first observation data and the first state parameter in response to that the first observation data meets a first screening condition, and determine a first measurement update matrix and a first measurement variance matrix that correspond to the first observation residual matrix.

The first observation data meeting the first screening condition indicates that the first observation data has high reliability and can be directly used for updating the first state parameter. In a process of updating the first state parameter by using the first observation data, the first observation residual matrix needs to be first obtained based on the first observation data and the first state parameter, and the first measurement update matrix and the first measurement variance matrix that correspond to the first observation residual matrix are determined. The first measurement variance matrix, the first measurement update matrix, and the first observation residual matrix are matrices that are required for updating the first state parameter of the first filter and that are determined based on the first observation data and the first state parameter.

For example, the first observation residual matrix is constructed based on the first observation data, the first state parameter, and state information of a satellite (namely, a first satellite) related to the first observation data. The first measurement update matrix is a Jacobian matrix of the first observation residual matrix with respect to the first state parameter. The first measurement variance matrix is constructed based on a signal-to-noise ratio of the first observation data and an elevation of the satellite related to the first observation data. A principle of obtaining the first observation residual matrix, the first measurement update matrix, and the first measurement variance matrix is the same as a principle of obtaining an initial observation residual matrix, an initial Jacobian matrix, and an initial measurement variance matrix in an embodiment shown in FIG. 8. Details are not described herein. For example, the first measurement variance matrix may alternatively be constructed based on the signal-to-noise ratio of the first observation data, the elevation of the satellite related to the first observation data, and an observation random-error model factor (for example, a pseudorange observation random-error model factor or a Doppler observation random-error model factor) resolved in the embodiment shown in FIG. 8.

For example, in a case that the first observation data includes first pseudorange observation data and first Doppler observation data, the first observation residual matrix includes a first pseudorange observation residual matrix and a first Doppler observation residual matrix, the first measurement update matrix includes a first pseudorange measurement update matrix and a first Doppler measurement update matrix, and the first measurement variance matrix includes a first pseudorange measurement variance matrix and a first Doppler measurement variance matrix. Certainly, the first observation data may alternatively be in other cases. A case of the first observation residual matrix, the first measurement update matrix, and the first measurement variance matrix varies with a case of the first observation data. For example, in a case that the first observation data includes only the first pseudorange observation data, the first observation residual matrix includes only the first pseudorange observation residual matrix, the first measurement update matrix includes only the first pseudorange measurement update matrix, and the first measurement variance matrix includes only the first pseudorange measurement variance matrix. In a case that the first observation data includes only the first Doppler observation data, the first observation residual matrix includes only the first Doppler observation residual matrix, the first measurement update matrix includes only the first Doppler measurement update matrix, and the first measurement variance matrix includes only the first Doppler measurement variance matrix.

In an exemplary embodiment, a process of determining whether the first observation data meets the first screening condition includes the following step a and step b.

Step a: Determine a model verification parameter value corresponding to the first filter based on the first observation data, the first state parameter, and the first state covariance matrix.

The model verification parameter value can be used for determining whether the first filter encounters a system failure. In an example implementation, an implementation process of determining the model verification parameter value corresponding to the first filter based on the first observation data, the first state parameter, and the first state covariance matrix includes: obtaining the first observation residual matrix based on the first observation data and the first state parameter; determining the first measurement update matrix and the first measurement variance matrix that correspond to the first observation residual matrix; and determining the model verification parameter value corresponding to the first filter based on the first observation residual matrix, the first measurement update matrix, the first measurement variance matrix, and the first state covariance matrix. A manner of obtaining the first observation residual matrix, the first measurement update matrix, the first measurement variance matrix, and the first state covariance matrix is described below. Details are not described herein.

For example, the first observation data includes at least one of the first pseudorange observation data and the first Doppler observation data. In a case that the first observation data includes the first pseudorange observation data, the first observation residual matrix includes the first pseudorange observation residual matrix, the first measurement update matrix includes the first pseudorange measurement update matrix, the first measurement variance matrix includes the first pseudorange measurement variance matrix, and the model verification parameter value corresponding to the first filter includes a pseudorange model verification parameter value. The pseudorange model verification parameter value is determined based on the first pseudorange measurement update matrix, the first pseudorange measurement variance matrix, the first state covariance matrix, and the first pseudorange observation residual matrix. For example, the pseudorange model verification parameter value is calculated based on a formula 5:

$$\beta_\rho = \tilde{V}^T \cdot \left( G_\rho^T P(t) G_\rho + W_{\rho t} \right)^{-1} \tilde{V} \qquad \text{(Formula 5)}$$

$\beta_\rho$ represents the pseudorange model verification parameter value. $P(t)$ represents the first state covariance matrix. $\tilde{V}$ represents the first pseudorange observation residual matrix. $\tilde{V}^T$ represents a transposed matrix of the first pseudorange observation residual matrix. $W_{\rho t}$ represents the first pseudorange measurement variance matrix. $G_\rho$ represents the first pseudorange measurement update matrix, which is a Jacobian matrix. The Jacobian matrix is a matrix including first-order partial derivatives arranged in a specific manner.

$$G_\rho^T$$

represents a transposed matrix of the first pseudorange measurement update matrix.

In a case that the first observation data includes the first Doppler observation data, the first observation residual matrix includes the first Doppler observation residual matrix, the first measurement update matrix includes the first Doppler measurement update matrix, the first measurement variance matrix includes the first Doppler measurement variance matrix, and the model verification parameter value corresponding to the first filter includes a Doppler model verification parameter value. The Doppler model verification parameter value is determined based on the first Doppler measurement update matrix, the first Doppler measurement variance matrix, the first state covariance matrix, and the first Doppler observation residual matrix. For example, the Doppler model verification parameter value is calculated based on a formula 6:

$$\beta_{\dot{p}} = \dot{\tilde{V}}^T \cdot \left( G_{\dot{p}}^T P(t) G_{\dot{p}} + W_{\dot{p}t} \right)^{-1} \dot{\tilde{V}} \qquad \text{(Formula 6)}$$

$B_{\dot{p}}$ represents the Doppler model verification parameter value. P(t)represents the first state covariance matrix. $\dot{\tilde{V}}$represents the first Doppler observation residual matrix. $\dot{\tilde{V}}^T$ represents a transposed matrix of the first Doppler observation residual matrix. $W_{\dot{p}t}$ represents the first Doppler measurement variance matrix. $G_{\dot{p}}$ represents the first Doppler measurement update matrix.

$$G_{\dot{p}}^T$$

represents a transposed matrix of the first Doppler measurement update matrix.

In an exemplary embodiment, a process of determining the model verification parameter value corresponding to the first filter based on the first observation data, the first state parameter, and the first state covariance matrix is performed in the case of determining that the first filter has no jump. In a case that the first filter has a jump, the jump of the first filter is restored, and then a subsequent operation is performed, to be specific, a process of determining the model verification parameter value corresponding to the first filter is performed.

For example, that the first filter has a jump may indicate that the first filter has at least one of a clock error jump and a clock drift jump. In this case, clock error detection and clock drift detection are performed before model verification is performed on the first filter. In the case of detecting that the first filter has a clock error jump and/or a clock drift jump, the clock error jump and/or the clock drift jump of the first filter are restored, to be specific, the first state parameter and the first state covariance matrix of the first filter are updated (also referred to as resetting the first filter). In the case of detecting that the first filter has no clock error jump or clock drift jump, the first state parameter and the first state covariance matrix of the first filter remain unchanged.

In an exemplary embodiment, in a case that the first pseudorange observation residual matrix meets an expression shown in the following formula 7, clock error jump detection may be performed on the first filter in a manner shown in the following formula 8:

$$\frac{mad(\tilde{V})}{med(\tilde{V})} < \theta_m, \quad \frac{std(\tilde{V})}{mean(\tilde{V})} < \theta_m \qquad \text{(Formula 7)}$$

$$\text{jump}_{clk} = \begin{cases} 0, & \dfrac{med(\tilde{V})}{\sqrt{P(t)_{j_{clk}j_{clk}}}} < \theta_{clk} \\[3mm] 1, & \dfrac{med(\tilde{V})}{\sqrt{P(t)_{j_{clk}j_{clk}}}} \geq \theta_{clk} \end{cases} \qquad \text{(Formula 8)}$$

mad ($\tilde{V}$) represents an absolute median deviation of the first pseudorange observation residual matrix $\tilde{V}$. med($\tilde{V}$) represents a median of the first pseudorange observation residual matrix $\tilde{V}$. std($\tilde{V}$) represents a standard deviation of the first pseudorange observation residual matrix $\tilde{V}$. mean ($\tilde{V}$) represents a mean of the first pseudorange observation residual matrix $\tilde{V}$. $\theta_m$ and $\theta_{clk}$ are clock error detection thresholds. $P(t)_{j_{clk}j_{clk}}$ represents an element in a $j_{clk}^{th}$ row and a $j_{clk}^{th}$ column of the first state covariance matrix. $\text{jump}_{clk}$ is a clock error jump value.

$$\frac{med(\tilde{V})}{\sqrt{P(t)_{j_{clk}j_{clk}}}}$$

represents a detected clock error value.

$\text{jump}_{clk}$ being 0 indicates that the first filter has no clock error jump. $\text{jump}_{clk}$ being 1 indicates that the first filter has a clock error jump. The clock error jump may be restored and the filter may be reset in a manner shown in the following formula 9, to be specific, the first state parameter and the first state covariance matrix of the first filter are reset:

$$\begin{cases} x(t)_{j_{clk}} = x(t)_{j_{clk}} + med(\dot{\tilde{V}}) \\ P(t)_{j_{clk}t} = P(t)_{tj_{clk}} = 0.0 \\ P(t)_{j_{clk}j_{clk}} = SQR(100.0) \end{cases} \qquad \text{(Formula 9)}$$

$j_{clk}$ represents a location of a clock error in the first state parameter x(t). x(t) $j_{clk}$ represents an element at a location $j_{clk}$ in the first state parameter. P(t) $j_{clk^t}$ represents an element in a $j_{clk}^{th}$ row and a $t^{th}$ column of the first state covariance matrix. $P(t)_{tj_{clk}}$ represents an element in a $t^{th}$ row and a $j_{clk}^{th}$ column of the first state covariance matrix. A value of t ranges from 1 to h, and h (an integer not less than 1) represents the number of columns of the first state covariance matrix. $\tilde{V}$ represents the first pseudorange observation residual matrix. $P(t)_{j_{clk}j_{clk}}$ represents an element in a $j_{clk}^{th}$ row and a $j_{clk}^{th}$ column of the first state covariance matrix. SQR(100.0) indicates to extract a root of 100.

Clock drift jump detection and restoration are performed by using the first Doppler observation residual matrix $\dot{\tilde{V}}$ in a process similar to the foregoing clock error jump detection and processing process. A principle of a clock drift jump detection method is the same as that of the clock error jump detection method. Details are not described herein again.

In the case of detecting a clock drift jump, the clock drift jump may be restored and the filter may be reset in a manner shown in the following formula 10, to be specific, the first state parameter and the first state covariance matrix of the first filter are reset:

$$\begin{cases} x(t)_{j_{dclk}} = x(t)_{j_{dclk}} + med(\tilde{V}) \\ P(t)_{j_{dclk}t} = P(t)_{tj_{dclk}} = 0.0 \\ P(t)_{j_{dclk}j_{dclk}} = SQR(100.0) \end{cases} \qquad \text{(Formula 10)}$$

$j_{dclk}$ represents a location of a clock drift in the first state parameter x(t). x(t) $j_{dclk}$ represents an element at a location $j_{dclk}$ in the first state parameter. P(t) $j_{dclk^t}$ represents an element in a $jd_{clk}^{th}$ row and a $t^{th}$ column of the first state covariance matrix. $P(t)_{tj_{dclk}}$ represents an element in a $t^{th}$ row and a $j_{dclk}^{th}$ column of the first state covariance matrix. $\dot{\tilde{V}}$represents the first Doppler observation residual matrix. For example, $\dot{\tilde{V}}$ is a Doppler observation residual matrix without a gross error.

med ($\dot{\tilde{V}}$) represents a median of the first Doppler observation residual matrix $\dot{\tilde{V}}$. $P(t)_{j_{dclk}j_{dclk}}$ represents an element in a $j_{dclk}{}^{th}$ row and a $j_{dclk}{}^{th}$ column of the first state covariance matrix. For meanings of other parameters, refer to the formula 9.

Step b: In response to that the model verification parameter value is less than a first threshold, obtain a test result for observation subdata in the first observation data, and in response to that test results for all observation subdata in the first observation data meet a retention condition, determine that the first observation data meets the first screening condition.

For example, in a case that the model verification parameter value includes the pseudorange model verification parameter value and the Doppler model verification parameter value, the first threshold includes a pseudorange model verification parameter threshold and a Doppler model verification parameter threshold. The model verification parameter value being less than the first threshold means that the pseudorange model verification parameter value is less than the pseudorange model verification parameter threshold and the Doppler model verification parameter value is less than the Doppler model verification parameter threshold. The pseudorange model verification parameter threshold and the Doppler model verification parameter threshold are set based on experience or flexibly adjusted based on an application scenario. This is not limited in embodiments of this disclosure. The pseudorange model verification parameter threshold and the Doppler model verification parameter threshold may be the same or different.

In an exemplary embodiment, the pseudorange model verification parameter value may not be less than the pseudorange model verification parameter threshold. In this case, the first filter needs to be reset. In an exemplary embodiment, the Doppler model verification parameter value may not be less than the Doppler model verification parameter threshold. In this case, the first filter also needs to be reset.

In an example implementation, a process of obtaining the test result for the observation subdata in the first observation data includes: normalizing the first observation residual matrix based on the first measurement update matrix, the first measurement variance matrix, and the first state covariance matrix to obtain a normalized residual matrix; testing the normalized residual matrix based on a second residual covariance matrix to obtain test results respectively corresponding to elements in the normalized residual matrix, the second residual covariance matrix being constructed based on the first measurement update matrix, the first measurement variance matrix, and the first state covariance matrix, and any element in the normalized residual matrix being associated with a piece of observation subdata in the first observation data; and using the test results respectively corresponding to the elements in the normalized residual matrix as test results for corresponding observation subdata in the first observation data. In this way, the test result for the observation subdata in the first observation data is obtained.

For example, the first observation data includes the first pseudorange observation data and the first Doppler observation data, the first pseudorange observation data includes one or more pieces of pseudorange observation subdata, and the first Doppler observation data includes one or more pieces of Doppler observation subdata. In this case, the normalized residual matrix includes a normalized pseudorange residual matrix and a normalized Doppler residual matrix. Any element in the normalized pseudorange residual matrix is associated with one piece of pseudorange observation subdata in the first pseudorange observation data. Any element in the normalized Doppler residual matrix is associated with one piece of Doppler observation subdata in the first Doppler observation data. In this case, test results respectively corresponding to elements in the normalized pseudorange residual matrix are used as test results for corresponding pseudorange observation subdata in the first pseudorange observation data, and test results respectively corresponding to elements in the normalized Doppler residual matrix are used as test results for corresponding Doppler observation subdata in the first Doppler observation data.

For example, the normalized pseudorange residual matrix and the normalized Doppler residual matrix may be calculated based on a formula 11 and a formula 12 respectively:

$$v_{\rho} = \left(G_{\rho}^{T}P(t)G_{\rho} + W_{\rho t}\right)^{-1}\tilde{V}(1) \qquad \text{(Formula 11)}$$

$$v_{\dot{\rho}} = \left(G_{\dot{\rho}}^{T}P(t)G_{\dot{\rho}} + W_{\dot{\rho} t}\right)^{-1}\dot{\tilde{V}} \qquad \text{(Formula 12)}$$

$v_{\rho}$ represents the normalized pseudorange residual matrix. $P(t)$ represents the first state covariance matrix. $\tilde{V}$ represents the first pseudorange observation residual matrix. $W_{\rho t}$ represents the first pseudorange measurement variance matrix. $G_{\rho}$ represents the first pseudorange measurement update matrix.

$$G_{\rho}^{T}$$

represents a transposed matrix of the first pseudorange measurement update matrix. $v_{\dot{\rho}}$ represents the normalized Doppler residual matrix. $\dot{\tilde{V}}$ represents the first Doppler observation residual matrix. $W_{\dot{\rho} t}$ represents the first Doppler measurement variance matrix.

$$G_{\dot{\rho}}^{T}$$

represents the first Doppler measurement update matrix. $G_{\dot{\rho}}{}^{T}$ represents a transposed matrix of the first Doppler measurement update matrix.

The second residual covariance matrix includes a second pseudorange residual covariance matrix and a second Doppler residual covariance matrix. A process of testing the normalized residual matrix based on the second residual covariance matrix to obtain the test results respectively corresponding to the elements in the normalized residual matrix includes: testing the normalized pseudorange residual matrix based on the second pseudorange residual covariance matrix to obtain the test results respectively corresponding to the elements in the normalized pseudorange residual matrix; and testing the normalized Doppler residual matrix based on the second Doppler residual covariance matrix to obtain the test results respectively corresponding to the elements in the normalized Doppler residual matrix.

For example, a test result corresponding to an $i^{th}$ element in the normalized pseudorange residual matrix (namely, a test result for an $i^{th}$ piece of pseudorange observation subdata in the first pseudorange observation data) is calculated based on a formula 13, and a test result corresponding to an $i^{th}$ element in the normalized Doppler residual matrix (namely, a test result for an $i^{th}$ piece of Doppler observation subdata in the first Doppler observation data) is calculated based on a formula 14:

$$\omega_{\rho,i} = \frac{|v_{\rho,i}|}{\sqrt{\left(G_\rho^T P(t) G_\rho + W_{\rho t}\right)_{ii}^{-1}}} \qquad \text{(Formula 13)}$$

$$\omega_{\dot\rho,i} = \frac{|v_{\dot\rho,i}|}{\sqrt{\left(G_{\dot\rho}^T P(t) G_{\dot\rho} + W_{\dot\rho t}\right)_{ii}^{-1}}} \qquad \text{(Formula 14)}$$

$v_{\rho,i}$ represents an $i^{th}$ element in the normalized pseudorange residual matrix $v_\rho$, where i is a positive integer less than or equal to the number of pieces of pseudorange observation subdata in the first pseudorange observation data. $\omega_{\rho,i}$ represents a test result corresponding to the $i^{th}$ element in the normalized pseudorange residual matrix $v_\rho$.

$$\left(G_\rho^T P(t) G_\rho + W_{\rho t}\right)^{-1}$$

represents the second pseudorange residual covariance matrix.

$$\left(G_\rho^T P(t) G_\rho + W_{\rho t}\right)_{ii}^{-1}$$

represents an element in an $i^{th}$ row and an $i^{th}$ column of the second pseudorange residual covariance matrix.

$v_{\dot\rho,i}$ represents an $i^{th}$ element in the normalized Doppler residual matrix $v_{\dot\rho}$, where i is a positive integer less than or equal to the number of pieces of Doppler observation subdata in the first Doppler observation data. $\omega_{\dot\rho,i}$ represents a test result corresponding to the $i^{th}$ element in the normalized Doppler residual matrix $$v_{\dot\rho} \cdot \left(G_{\dot\rho}^T P(t) G_{\dot\rho} + W_{\dot\rho t}\right)^{-1}$$

represents the second Doppler residual covariance matrix.

$$\left(G_{\dot\rho}^T P(t) G_{\dot\rho} + W_{\dot\rho t}\right)_{ii}^{-1}$$

represents an element in an $i^{th}$ row and an $i^{th}$ column of the second Doppler residual covariance matrix.

In an exemplary embodiment, a test result for any observation subdata in the first observation data meeting the retention condition means that the test result for the any observation subdata is not greater than a corresponding threshold. In a case that the any observation subdata is any pseudorange observation subdata, the test result for the any observation subdata meeting the retention condition means that a test result for the any pseudorange observation subdata is not greater than a first test threshold. In a case that the any observation subdata is any Doppler observation subdata, the test result for the any observation subdata meeting the retention condition means that a test result for the any Doppler subdata is not greater than a second test threshold. The first test threshold and the second test threshold are set based on experience or flexibly adjusted based on an application scenario. This is not limited in embodiments of this disclosure. The first test threshold and the second test threshold may be the same or different.

It is determined that the first observation data meets the first screening condition in a case that the test results for all the observation subdata in the first observation data meet the retention condition, to be specific, test results for all pseudorange observation subdata in the first pseudorange observation data are not greater than the first test threshold, and test results for all Doppler observation subdata in the first Doppler observation data are not greater than the second test result.

For example, in a case that none of the test results for the observation subdata in the first observation data meets the retention condition, it is determined that the first observation data does not meet the first screening condition. Observation subdata whose test result does not meet the retention condition is eliminated to obtain second observation data, and a subsequent operation is performed on the basis of the second observation data, to be specific, the first positioning result is modified on the basis of the second observation data. For example, the foregoing process of eliminating the observation subdata whose test result does not meet the retention condition may be considered as a process of performing gross error detection on the first observation data based on the first observation residual matrix and a normal distribution test, and eliminating a satellite data gross-error that leads to divergence of the first filter from the first observation data.

The foregoing manner of determining whether the first observation data meets the first screening condition is only an example for description, and embodiments of this disclosure are not limited thereto. For example, in response to that the model verification parameter value is less than the first threshold, it may be determined that the first observation data meets the first screening condition. Alternatively, a test result for observation subdata in the first observation data may be directly obtained, and in response to that the test results for all the observation subdata in the first observation data meet the retention condition, it is determined that the first observation data meets the first screening condition.

Step 5013: Determine a first parameter increment based on the first observation residual matrix, the first measurement update matrix, the first measurement variance matrix, and the first state covariance matrix, and use a sum of the first parameter increment and the first state parameter as an updated first state parameter of the first filter.

For example, the first parameter increment includes at least one of a first pseudorange state parameter increment and a first Doppler state parameter increment. In embodiments of this disclosure, an example in which the first parameter increment includes the first pseudorange parameter increment and the first Doppler parameter increment is used for description. In this case, the updated first state parameter includes an updated first pseudorange state parameter and an updated first Doppler state parameter.

For example, the updated first pseudorange state parameter is calculated based on the following formula 15:

$$z_1'(t) = z_1(t) + \underbrace{P(t) \cdot G_\rho'^T \left(G_\rho' \cdot P(t) \cdot G_\rho'^T + R_\rho(t)\right)^{-1} \cdot \tilde{V}'}_{K(t)} \qquad \text{(Formula 15)}$$

$z_1'(t)$ represents the updated first pseudorange state parameter. $z_1(t)$ represents the first pseudorange state parameter. P(t)represents the first state covariance matrix. G'$_\rho$ represents the first pseudorange measurement update matrix.

$$G_\rho'^T$$

represents a transposed matrix of the first pseudorange measurement update matrix. R$_\rho$(t) represents the first pseudorange measurement variance matrix. Ṽ' represents the first pseudorange observation residual matrix.

$$P(t) \cdot G_\rho'^T \left( G_\rho' \cdot P(t) \cdot G_\rho'^T + R_\rho(t) \right)^{-1} \cdot \tilde{V}'$$

represents the first pseudorange parameter increment. K(t) may represent a pseudorange filter gain.

For example, the updated first Doppler state parameter is calculated based on the following formula 16:

$$z_2'(t) = z_2(t) + \underbrace{P(t) \cdot G_{\dot\rho}'^T \left( G_{\dot\rho}' \cdot P(t) \cdot G_{\dot\rho}'^T + R_{\dot\rho}(t) \right)^{-1} \cdot \tilde{\dot V}'}_{K'(t)} \quad \text{(Formula 16)}$$

z$_2$'(t) represents the updated first Doppler state parameter. z$_2$(t)represents the first Doppler state parameter. P(t)represents the first state covariance matrix. G'$_{\dot\rho}$ represents the first Doppler measurement update matrix.

$$G_{\dot\rho}'^T$$

represents a transposed matrix of the first Doppler measurement update matrix. R$_{\dot\rho}$(t)represents the first Doppler measurement variance matrix. Ṽ' represents the first Doppler observation residual matrix.

$$P(t) \cdot G_{\dot\rho}'^T \left( G_{\dot\rho}' \cdot P(t) \cdot G_{\dot\rho}'^T + R_{\dot\rho}(t) \right)^{-1} \cdot \tilde{\dot V}'$$

represents the first Doppler parameter increment. K'(t) may represent a Doppler filter gain.

Step 5014: Obtain the first modified result based on the updated first state parameter in response to that the updated first state parameter meets a first reference condition.

A type of a parameter included in the updated first state parameter includes a type of a parameter that needs to be included in a positioning result for the mobile device. After the updated first state parameter is obtained, a parameter whose type is the type of the parameter that needs to be included in the positioning result for the mobile device is extracted from the updated first state parameter to constitute the first modified result.

For example, a process of determining that the updated first state parameter meets the first reference condition includes: determining a covariance increment based on the first measurement update matrix, the first measurement variance matrix, and the first state covariance matrix, and using a product of the covariance increment and the first state covariance matrix as an updated first state covariance matrix; performing modification amount detection on the first parameter increment based on the updated first state covariance matrix; testing the first observation residual matrix based on a first residual covariance matrix in response to that the modification amount detection succeeds, to obtain test results respectively corresponding to elements in the first observation residual matrix, the first residual covariance matrix being constructed based on the updated first state covariance matrix, the first measurement variance matrix, and the first measurement update matrix; and in response to that the test results respectively corresponding to the elements in the first observation residual matrix meet a test condition, determining that the updated first state parameter meets the first reference condition.

For example, the covariance increment may include at least one of a pseudorange covariance increment and a Doppler covariance increment. For example, in a case that the covariance increment includes the pseudorange covariance increment, the updated first state covariance matrix may be calculated based on a formula 17:

$$P'(t) = \left( I - K(t)G_\rho' \right) \cdot P(t) \quad \text{(Formula 17)}$$

P'(t) represents the updated first state covariance matrix. P(t)represents the first state covariance matrix. I represents an identity matrix. For meanings of other parameters, refer to the formula 15.

For example, in a case that the covariance increment includes the Doppler covariance increment, the updated first state covariance matrix may be calculated based on a formula 18:

$$P'(t) = \left( I - K'(t)G_{\dot\rho}' \right) \cdot P(t) \quad \text{(Formula 18)}$$

P'(t) represents the updated first state covariance matrix. P(t)represents the first state covariance matrix. I represents an identity matrix. For meanings of other parameters, refer to the formula 16.

For example, in a case that the first parameter increment is the first pseudorange parameter increment, a process of performing modification amount detection on the first parameter increment based on the updated first state covariance matrix includes: using a value of $$\frac{|dx_i|}{\sqrt{P_{ii}'^{(t)}}}$$

as a measurement indicator corresponding to an i$^{th}$ element in the first pseudorange parameter increment. In a case that none of measurement indicators corresponding to elements in the first pseudorange parameter increment is greater than a first indicator threshold, it is determined that the modification amount detection on the first pseudorange parameter increment succeeds. dx$_i$ represents the i$^{th}$ element in the first pseudorange parameter increment dx, and P'$^{(t)}_{ii}$ represents an element in an i$^{th}$ row and an i$^{th}$ column of the updated first state covariance matrix. It can be learned from the formula 15 that the first pseudorange parameter increment $$dx = P(t) \cdot G_\rho'^T \left( G_\rho' \cdot P(t) \cdot G_\rho'^T + R_\rho(t) \right)^{-1} \cdot \tilde{V}'.$$

29          30

For example, in a case that the first parameter increment is the Doppler parameter increment, a process of performing modification amount detection on the first parameter increment based on the updated first state covariance matrix includes: using a value of $$\frac{|d'x_i|}{\sqrt{P_{ii}^{\prime(t)}}}$$

as a measurement indicator corresponding to an $i^{th}$ element in the first Doppler parameter increment. In a case that none of measurement indicators corresponding to elements in the first Doppler parameter increment is greater than the second indicator threshold, it is determined that the modification amount detection on the first Doppler parameter increment succeeds. $d'x_i$ represents the $i^{th}$ element in the first Doppler parameter increment $d'x$, and $P'^{(t)}_{ii}$ represents an element in an $i^{th}$ row and an $i^{th}$ column of the updated first state covariance matrix. It can be learned from the formula 16 that the first Doppler parameter increment $$d'x = P(t) \cdot G_\rho'^T \left( G_\rho' \cdot P(t) \cdot G_\rho'^T + R_\rho(t) \right)^{-1} \cdot \dot{\tilde{v}}'.$$

For example, in a case that modification amount detection on the first pseudorange parameter increment and modification amount detection on the first Doppler parameter increment both succeed, it is considered that the modification amount detection succeeds. In a case that modification amount detection on the first pseudorange parameter increment and/or modification amount detection on the first Doppler parameter increment fail, it is considered that the modification amount detection fails. In this case, the first filter needs to be reset.

After it is determined that the modification amount detection succeeds, the first residual covariance matrix is constructed based on the updated first state covariance matrix, the first measurement variance matrix, and the first measurement update matrix, and the first observation residual matrix is tested based on the first residual covariance matrix to obtain the test results respectively corresponding to the elements in the first observation residual matrix.

For example, the first residual covariance matrix includes a first pseudorange residual covariance matrix and a first Doppler residual covariance matrix, and the first observation residual matrix includes the first pseudorange observation residual matrix and the first Doppler observation residual matrix. For example, the first observation residual matrix may be referred to as a post-test observation residual matrix.

For example, a test result for an $i^{th}$ element in the first pseudorange observation residual matrix is calculated based on a formula 19:

$$\mu_i = \frac{|\tilde{V}'_{p,i}|}{\sqrt{\left( R_\rho(t) \cdot \left( G_\rho' \cdot P'(t) \cdot G_\rho'^T + R_\rho(t) \right)^{-1} \cdot R_\rho(t) \right)_{ii}}} \quad \text{(Formula 19)}$$

$\mu_i$ represents the test result for the $i^{th}$ element in the first pseudorange observation residual matrix. $G'_\rho$ represents the first pseudorange measurement update matrix.

$$G_\rho'^T$$

represents a transposed matrix of the first pseudorange measurement update matrix. $R_\rho(t)$ represents the first pseudorange measurement variance matrix. $P'(t)$ represents the updated first state covariance matrix.

$$\tilde{V}'_{p,i}$$

represents the $i^{th}$ element in the first pseudorange observation residual matrix, where i is an integer less than or equal to the number of elements in the first pseudorange observation residual matrix.

$$R_\rho(t) \cdot \left( G_\rho' \cdot P'(t) \cdot G_\rho'^T + R_\rho(t) \right)^{-1} \cdot R_\rho(t)$$

represents the first pseudorange residual covariance matrix.

$$\left( R_\rho(t) \cdot \left( G_\rho' \cdot P'(t) \cdot G_\rho'^T + R_\rho(t) \right)^{-1} \cdot R_\rho(t) \right)_{ii}$$

represents an element in an $i^{th}$ row and an $i^{th}$ column of the first pseudorange residual covariance matrix.

For example, a test result for an $i^{th}$ element in the first Doppler observation residual matrix is calculated based on a formula 20:

$$\alpha_i = \frac{|\dot{\tilde{v}}'_{p,i}|}{\sqrt{\left( R_\rho(t) \cdot \left( G_\rho' P'(t) \cdot G_\rho'^T + R_\rho(t) \right)^{-1} \cdot R_\rho(t) \right)_{ii}}} \quad \text{(Formula 20)}$$

$\alpha_i$ represents the test result for the $i^{th}$ element in the first Doppler observation residual matrix.

$$G_\rho'^T$$

represents the first Doppler measurement update matrix. $G'_\rho{}^T$ represents a transposed matrix of the first Doppler measurement update matrix. $R_\rho(t)$ represents the first Doppler measurement variance matrix. $P'(t)$ represents the updated first state covariance matrix.

$$\dot{\tilde{v}}'_{p,i}$$

represents the $i^{th}$ element in the first Doppler observation residual matrix, where i is an integer less than or equal to the number of elements in the first Doppler observation residual matrix.

$$R_\rho(t) \cdot \left( G_\rho' \cdot P'(t) \cdot G_\rho'^T + R_\rho(t) \right)^{-1} \cdot R_\rho(t)$$

represents the first Doppler residual covariance $$\left( R_\rho(t) \cdot \left( G_\rho' \cdot P'(t) \cdot G_\rho'^T + R_\rho(t) \right)^{-1} \cdot R_\rho(t) \right)_{ii}$$

represents an element in an $i^{th}$ row and an $i^{th}$ column of the first Doppler residual covariance matrix.

For example, a test result corresponding to an element meeting the test condition means that the test result for the element is less than a corresponding threshold. For example, the test results respectively corresponding to the elements in the first observation residual matrix meeting the test condition means that test results respectively corresponding to elements in the first pseudorange observation residual matrix are less than the first target threshold and test results respectively corresponding to elements in the first Doppler observation residual matrix are less than the second target threshold. The first target threshold and the second target threshold are set based on experience or flexibly adjusted based on an application scenario. The first target threshold and the second target threshold may be the same or different.

In the case of determining that the test results respectively corresponding to the elements in the first observation residual matrix meet the test condition, it is determined that the updated first state parameter meets the first reference condition.

In an exemplary embodiment, in a case that a test result corresponding to an element does not meet the test condition, it is determined that the updated first state parameter does not meet the first reference condition. Observation subdata associated with the element may be eliminated from the first observation data to obtain filtered observation data, and then a subsequent operation is performed on the basis of the filtered observation data, to be specific, the first positioning result is modified on the basis of the filtered observation data.

The foregoing manner of determining whether the updated first state parameter meets the first reference condition is only an example, and embodiments of this disclosure are not limited thereto. In some embodiments, alternatively, in a case that the modification amount detection succeeds, it may be considered that the updated first state parameter meets the first reference condition. In some embodiments, modification amount detection may alternatively not be performed, and only the test results respectively corresponding to the elements in the first observation residual matrix are obtained. In a case that the test results respectively corresponding to the elements in the first observation residual matrix meet the test condition, it is determined that the updated first state parameter meets the first reference condition.

For example, a related processing process of the first filter may be shown in FIG. 6. The first filter is initialized. A time update is performed on an initialized first filter. A measurement update is performed on a time-updated first filter. During the measurement update on the time-updated first filter, clock error jump and clock drift jump detection and restoration are first performed on the first filter. Then gross error detection is performed based on a normal distribution test, and model verification and restoration are performed on the first filter based on observation data from which a gross error is eliminated. After the model verification and restoration, update resolution verification and restoration on the first filter are completed through modification amount detection and testing on the post-test observation residual matrix.

In step 502, the first modified result is modified by using the double-difference observation data to obtain a second modified result, and the second modified result is used as the target positioning result.

The second modified result is a result obtained by modifying the first modified result by using the double-difference observation data. The second modified result is more reliable than the first modified result. After the second modified result is obtained, the second modified result is used as the target positioning result for the mobile device. This helps ensure reliability of the target positioning result and improve positioning accuracy and positioning robustness of the target positioning result.

In an example implementation, a process of modifying the first modified result by using the double-difference observation data to obtain the second modified result may be implemented by a second filter. As shown in FIG. 5, the process of modifying the first modified result by using the double-difference observation data to obtain the second modified result includes the following step 5021 to step 5024.

Step 5021: Determine a second state parameter of the second filter based on the first modified result, and obtain a second state covariance matrix corresponding to the second state parameter.

The second filter is a filter based on which the first modified result is modified by using the double-difference observation data. A type of the second filter may include but is not limited to a Kalman filter, an extended Kalman filter, an unscented Kalman filter, a robust Kalman filter, and the like. This is not limited in embodiments of this disclosure.

The second state parameter is a to-be-updated state parameter of the second filter. For example, a type of a parameter in the state parameter of the second filter includes a type, for example, a location type, of a parameter in a positioning result for the mobile device. For example, the double-difference observation data includes carrier phase observation data, and the type of the parameter in the state parameter of the second filter further includes a whole-cycle ambiguity type. The whole-cycle ambiguity, also referred to as a whole-cycle unknown number, is a whole-cycle unknown number corresponding to the first observation value of a phase difference between a carrier phase and a reference phase during carrier phase measurement by using a global positioning system technology.

In an exemplary embodiment, a manner of obtaining the second state parameter of the second filter based on the first modified result may be: using a state parameter including a location in the first positioning result and an initial value of the whole-cycle ambiguity as the second state parameter. In an exemplary embodiment, a manner of obtaining the second state parameter of the second filter based on the first modified result may alternatively be: using a state parameter including a location in the first positioning result and an initial value of the whole-cycle ambiguity as a second initial state parameter, and performing a time update on the second initial state parameter to obtain the second state parameter.

The second state covariance matrix may be used for representing a correlation between second state parameters. The second state covariance matrix is a diagonal matrix and also a symmetric matrix. For example, the second state covariance matrix may be set based on experience in the case of using the state parameter including the location in the first positioning result and the initial value of the whole-cycle ambiguity as the second state parameter. For example, in the case of using the state parameter including the location in the first positioning result and the initial value of the whole-cycle ambiguity as the second initial state parameter and performing the time update on the second initial state parameter to obtain the second state parameter, a manner of obtaining the second state covariance matrix corresponding to the second state parameter may be: obtaining a second initial state covariance matrix corresponding to the second initial state parameter, performing a time update on the second initial state covariance matrix, and using a covariance matrix obtained through the time update as the second state covariance matrix corresponding to the second state parameter.

Step 5022: Obtain a double-difference observation residual matrix based on the double-difference observation data and the second state parameter in response to that the double-difference observation data meets a second screening condition, and determine a double-difference measurement update matrix and a double-difference measurement variance matrix that correspond to the double-difference observation residual matrix.

The double-difference observation data meeting the second screening condition indicates that the double-difference observation data has high reliability and can be directly used for updating the second state parameters. In a process of updating the second state parameter by using the double-difference observation data, the double-difference observation residual matrix needs to be first obtained based on the double-difference observation data and the second state parameter, and the double-difference measurement update matrix and the double-difference measurement variance matrix that correspond to the double-difference observation residual matrix are determined. The double-difference measurement variance matrix, the double-difference measurement update matrix, and the double-difference observation residual matrix are matrices that are required for updating the second state parameter of the second filter and that are determined based on the double-difference observation data and the second state parameter.

In an example implementation, a process of obtaining the double-difference observation residual matrix based on the double-difference observation data and the second state parameter includes: obtaining double-difference estimation data based on the second state parameter; and constructing the double-difference observation residual matrix based on the double-difference observation data and the double-difference estimation data.

For example, in a case that the double-difference observation data includes pseudorange double-difference observation data and carrier phase double-difference observation data, the double-difference estimation data includes pseudorange double-difference estimation data and carrier phase double-difference estimation data. Certainly, the double-difference observation data may alternatively be in other cases. A case of the double-difference estimation data varies with a case of the double-difference observation data. For example, in a case that the double-difference observation data includes only the pseudorange double-difference observation data, the double-difference estimation data includes only the pseudorange double-difference estimation data; or in a case that the double-difference observation data includes only the carrier phase double-difference observation data, the double-difference estimation data includes only the carrier phase double-difference estimation data.

For example, the pseudorange double-difference estimation data includes pseudorange double-difference estimation values respectively corresponding to satellites included in the first satellite other than a reference satellite, and the carrier phase double-difference estimation data includes carrier phase double-difference estimation values respectively corresponding to the satellites. A pseudorange double-difference estimation value corresponding to any other satellite and a carrier phase double-difference estimation value corresponding to the any other satellite are obtained based on a difference between a first distance difference and a second distance difference that correspond to the any other satellite.

The first distance difference corresponding to the any other satellite is a difference between a geometric distance from the reference satellite to the mobile device and a geometric distance from the any other satellite to the mobile device. The second distance difference corresponding to the any other satellite is a difference between a geometric distance from the reference satellite to a reference station and a geometric distance from the any other satellite to the reference station. The geometric distance from the satellite to the mobile device may be calculated based on a location in state information of the satellite and a location in the second state parameter. The geometric distance from the satellite to the reference station may be calculated based on the location in the state information of the satellite and a location of the reference station.

After the double-difference observation data and the double-difference estimation data are obtained, the double-difference observation residual matrix is constructed based on the double-difference observation data and the double-difference estimation data. For example, the double-difference observation data includes the pseudorange double-difference observation data and the carrier phase double-difference observation data, and the double-difference estimation data includes the pseudorange double-difference estimation data and the carrier phase double-difference estimation data. In this case, a process of constructing the double-difference observation residual matrix based on the double-difference observation data and the double-difference estimation data includes: constructing a pseudorange double-difference observation residual matrix based on the pseudorange double-difference observation data and the pseudorange double-difference estimation data; constructing a carrier phase double-difference observation residual matrix based on the carrier phase double-difference observation data and the carrier phase double-difference estimation data; and using a matrix constituted by the pseudorange double-difference observation residual matrix and the carrier phase double-difference observation residual matrix as the double-difference observation residual matrix.

For example, formulas for constructing the pseudorange double-difference observation residual matrix and the carrier phase double-difference observation residual matrix are shown in a formula 21 and a formula 22 respectively:

$$z_\rho = \begin{bmatrix} \rho_{rb}^{12} \\ \rho_{rb}^{13} \\ \vdots \\ \rho_{rb}^{1n} \end{bmatrix} - \begin{bmatrix} r_r^1 - r_r^2 - \left(r_b^1 - r_b^2\right) + I_{rb}^{12} + T_{rb}^{12} \\ r_r^1 - r_r^3 - \left(r_b^1 - r_b^3\right) + I_{rb}^{13} + T_{rb}^{13} \\ \vdots \\ r_r^1 - r_r^n - \left(r_b^1 - r_b^n\right) + I_{rb}^{1n} + T_{rb}^{1n} \end{bmatrix} \qquad \text{(Formula 21)}$$

$$z_\varphi = \begin{bmatrix} \varphi_{rb}^{12} \\ \varphi_{rb}^{13} \\ \vdots \\ \varphi_{rb}^{1n} \end{bmatrix} - \begin{bmatrix} r_r^1 - r_r^2 - \left(r_b^1 - r_b^2\right) + I_{rb}^{12} + T_{rb}^{12} + \lambda B_{rb}^{12} \\ r_r^1 - r_r^3 - \left(r_b^1 - r_b^3\right) + I_{rb}^{13} + T_{rb}^{13} + \lambda B_{rb}^{13} \\ \vdots \\ r_r^1 - r_r^n - \left(r_b^1 - r_b^n\right) + I_{rb}^{1n} + T_{rb}^{1n} + \lambda B_{rb}^{1n} \end{bmatrix} \qquad \text{(Formula 22)}$$

$z_\rho$ represents the pseudorange double-difference residual matrix. $z_\varphi$ represents the carrier phase double-difference residual matrix.

$$r_r^j$$

represents a geometric distance between a first satellite i (i=1, 2, . . . , n) and the mobile device, where n (an integer not less than 2) is the number of first satellites.

$$r_b^i$$

represents a geometric distance between the first satellite i and the reference station. A first satellite 1 is a reference satellite.

$$\rho_{rb}^{12} = \rho_r^1 - \rho_r^2 - \left(\rho_b^1 - \rho_b^2\right)$$

represents a pseudorange double-difference observation value corresponding to the first satellite, $$\varphi_{rb}^{12} = \varphi_r^1 - \varphi_r^2 - \left(\varphi_b^1 - \varphi_b^2\right)$$

represents a carrier phase double-difference observation value corresponding to a first satellite 2, and so on.

$$I_{rb}^{12}, I_{rb}^{13}, \ldots, I_{rb}^{1n}$$

represent double-difference ionospheric delays.

$$T_{rb}^{12}, T_{rb}^{13}, \ldots, T_{rb}^{1n}$$

represent double-difference tropospheric delays.

$$B_{rb}^{12}, B_{rb}^{13}, \ldots, B_{rb}^{1n}$$

represent whole-cycle ambiguity, and the whole-cycle ambiguity is an integer. $\lambda$ represents a carrier wavelength. The double-difference ionospheric delay and the double-difference tropospheric delay may be set based on experience. This is not limited in embodiments of this disclosure. During construction of the double-difference observation residual matrix, the whole-cycle ambiguity may be initialized based on experience.

After the pseudorange double-difference observation residual matrix and the carrier phase double-difference observation residual matrix are obtained, the pseudorange double-difference observation residual matrix and the carrier phase double-difference observation residual matrix are combined to obtain the double-difference observation residual matrix $$\begin{bmatrix} Z_\rho \\ Z_\varphi \end{bmatrix}.$$

After the double-difference observation residual matrix is obtained, the double-difference measurement update matrix and the double-difference measurement variance matrix that correspond to the double-difference observation residual matrix are determined. For example, the double-difference measurement variance matrix may be constructed based on experience, or may be constructed based on a signal-to-noise ratio of the double-difference observation data and state information of a satellite related to the double-difference observation data. For example, the double-difference measurement update matrix may be a coefficient in a differential constraint equation. The differential constraint equation is constructed based on the double-difference observation residual matrix. For example, the differential constraint equation is a differential constraint equation between the double-difference observation residual matrix $$\begin{bmatrix} Z_\rho \\ Z_\varphi \end{bmatrix}$$

and a preset increment matrix $\delta x$. For example, the differential constraint equation may also be referred to as a Kalman modification equation or an RTK differential constraint modification equation. For example, the differential constraint equation is shown in a formula 23:

$$\begin{bmatrix} Z_\rho \\ Z_\varphi \end{bmatrix} = H \cdot \delta x \qquad \text{(Formula 23)}$$

H is a coefficient (namely, the double-difference measurement update matrix) in the differential constraint equation, and H is a Jacobian matrix of the double-difference observation residual matrix with respect to the second state parameter. For example, an expression for H is shown in a formula 24:

$$H = \begin{bmatrix} -(e_i^1 - e_i^2) & 0 & 0 & 0 & 0 & 0 & 0 & 0 & 0 \\ -(e_i^1 - e_i^3) & 0 & 0 & 0 & 0 & 0 & 0 & 0 & 0 \\ & \vdots & & 0 & 0 & 0 & 0 & 0 & 0 & 0 \\ -(e_i^1 - e_i^n) & 0 & 0 & 0 & 0 & 0 & 0 & 0 & 0 \\ -(e_i^1 - e_i^2) & 0 & 0 & 0 & 0 & \lambda & 0 & 0 & 0 \\ -(e_i^1 - e_i^3) & 0 & 0 & 0 & 0 & 0 & \lambda & 0 & 0 \\ & \vdots & & 0 & 0 & 0 & 0 & 0 & \lambda & 0 \\ -(e_i^1 - e_i^n) & 0 & 0 & 0 & 0 & 0 & 0 & 0 & \lambda \end{bmatrix} \qquad \text{(Formula 24)}$$

$$e_i^s$$

represents a unit observation vector from the mobile device to a first satellite s (s=1, 2, . . . , n), and $\lambda$ represents a carrier wavelength.

In an exemplary embodiment, a manner of determining whether the double-difference observation data meets the second screening condition may be performing gross error detection on the double-difference observation residual matrix, and in a case that a detection result indicates that no data needs to be eliminated from the double-difference observation data, determining that the double-difference observation data meets the second screening condition. For example, a manner of performing gross error detection on the double-difference observation residual matrix may be: performing gross error detection on the double-difference observation residual matrix based on a quartile, or perform-ing gross error detection on the double-difference observation residual matrix based on an absolute median deviation. This is not limited in embodiments of this disclosure.

Step 5023: Determine a second parameter increment based on the double-difference observation residual matrix, the double-difference measurement update matrix, the double-difference measurement variance matrix, and the second state covariance matrix, and use a sum of the second parameter increment and the second state parameter as an updated second state parameter of the second filter.

The second parameter increment is an increment used for updating the second state parameter. For example, a process of determining the second parameter increment based on the double-difference observation residual matrix, the double-difference measurement update matrix, the double-difference measurement variance matrix, and the second state covariance matrix is implemented based on a formula 25:

$$\underbrace{\delta \tilde{x}(t_k) = P^-(t_k) \cdot H^T \left(H \cdot P^-(t_k) \cdot H^T + R_{RTK}(t_k)\right)^{-1}}_{\tilde{K}(t_k)} \cdot \begin{bmatrix} Z_\rho \\ Z_\varphi \end{bmatrix} \quad \text{(Formula 25)}$$

$\delta \tilde{x}(t_k)$ represents the second parameter increment. $P^-(t_k)$ represents the second state covariance matrix, which is used for representing a relationship between parameters in the second state parameter, and may be set based on experience. $\tilde{K}(t_k)$ represents a Kalman gain. $R_{RTK}(t_k)$ represents the double-difference measurement variance matrix. H represents the double-difference measurement update matrix. $H^T$ represents a transposed matrix of the double-difference measurement update matrix.

$$\begin{bmatrix} Z_\rho \\ Z_\varphi \end{bmatrix}$$

represents the double-difference observation residual matrix.

In an exemplary embodiment, the second state covariance matrix may be updated based on the Kalman gain and the double-difference measurement update matrix. An update formula is shown in a formula 26:

$$P^+(t_k) = \left(I - \tilde{K}(t_k)H\right) \cdot P^-(t_k) \quad \text{(Formula 26)}$$

$P^+(t_k)$ represents an updated second state covariance matrix. For meanings of other parameters, refer to the formula 25.

In an exemplary embodiment, a process of determining whether a modified parameter matrix meets a specified condition may be: in a case that the modified parameter matrix converges, determining that the modified parameter matrix meets the specified condition.

Step 5024: Obtain the second modified result based on the updated second state parameter in response to that the updated second state parameter meets a second reference condition.

In an exemplary embodiment, a process of determining whether the updated second state parameter meets the second reference condition may be: performing modification amount detection on a post-test double-difference observation residual matrix; in a case that the modification amount detection succeeds, performing a normal distribution test on a post-test pseudorange double-difference observation residual matrix and a normal distribution test on a post-test carrier phase double-difference observation residual matrix; and in a case that the normal distribution test on the post-test pseudorange double-difference observation residual matrix and the normal distribution test on the post-test carrier phase double-difference observation residual matrix both succeed, determining that the updated second state parameter meets the second reference condition. For example, in a case that the normal distribution test on the post-test pseudorange double-difference observation residual matrix and/or the normal distribution test on the post-test carrier phase double-difference observation residual matrix fail, it is determined that the updated second state parameter does not meet the second reference condition, and data associated with a pseudorange observation value and/or a carrier phase observation value that fail the normal distribution test needs to be eliminated from the double-difference observation data.

For example, the post-test double-difference observation residual matrix is a double-difference observation residual matrix obtained based on the updated second state parameter and the double-difference observation data. A pseudorange double-difference observation residual matrix included in the post-test double-difference observation residual matrix is referred to as the post-test pseudorange double-difference observation residual matrix. A carrier phase double-difference observation residual matrix included in the post-test double-difference observation residual matrix is referred to as the post-test carrier phase double-difference observation residual matrix.

In an exemplary embodiment, a manner of obtaining the second modified result based on the updated second state parameter includes: extracting a parameter whose type is a type of a parameter that needs to be included in a positioning result for the mobile device from the updated second state parameter to constitute the second modified result. For example, a parameter of a location type is extracted from the updated second state parameter to constitute the second modified result.

In an exemplary embodiment, the updated second state parameter includes a floating-point solution of a location and a floating-point solution of whole-cycle ambiguity, and accuracy of the floating-point solution is poor. In this case, the obtaining the second modified result based on the updated second state parameter includes: fixing the floating-point solution of the whole-cycle ambiguity; and in response to that the floating-point solution of the whole-cycle ambiguity is successfully fixed, calculating a fixed solution of the location by using a fixed solution of the whole-cycle ambiguity, and using a result including the fixed solution of the location as the second modified result; or in response to that the floating-point solution of the whole-cycle ambiguity is not successfully fixed, using a result including the floating-point solution of the location as the second modified result.

For example, a manner of fixing the floating-point solution of the whole-cycle ambiguity may be implemented based on modified least-squares ambiguity decorrelation adjustment (MLAMBDA). For example, a process of fixing the floating-point solution of the whole-cycle ambiguity based on MLAMBDA may be implemented based on a carrier phase double-difference parameter value and a carrier phase double-difference covariance matrix. The carrier phase double-difference parameter value and the carrier phase double-difference covariance matrix may be extracted from a state parameter and a state covariance matrix of the second filter. In a case that the fixing succeeds, a location included in the second modified result is a fixed solution calculated based on the fixed solution of the whole-cycle ambiguity, and has high accuracy.

In this positioning method, after the first positioning result is obtained, the first positioning result is first modified by using the first observation data, and then a modified result is modified again by using the double-difference observation data to obtain the target positioning result. Point cloud data, the first observation data, and the double-difference observation data are comprehensively considered in the process of obtaining the target positioning result. Abundant information is considered, and accuracy of the target positioning result is high. In this positioning manner, dependency on any type of data is weak, so that positioning robustness can be improved.

Embodiments of this disclosure further provide an implementation process of obtaining a target positioning result on the basis of a first positioning result based on target data. The implementation process is another specific implementation process in a case that the target data includes first observation data and double-difference observation data. For example, the method is applied to the mobile device 110. As shown in FIG. 7, the method provided in embodiments of this disclosure may include the following step 701 to step 703.

In a step 701, the mobile device is positioned by using the first observation data to obtain a second positioning result.

In an exemplary embodiment, no point cloud data needs to be considered in a process of positioning the mobile device by using the first observation data. To be specific, step 701 may be performed independently of a process of positioning the mobile device by using point cloud data to obtain the first positioning result. An execution order of step 701 and the process of positioning the mobile device by using the point cloud data to obtain the first positioning result is not limited in embodiments of this disclosure.

For example, the process of positioning the mobile device by using the first observation data may be implemented based on a first filter. A principle of positioning the mobile device by using the first observation data based on the first filter is the same as a principle of modifying the first positioning result by using the first observation data based on the first filter. A difference lies in that a first state parameter of the first filter is determined based on the first positioning result in the process of modifying the first positioning result by using the first observation data based on the first filter, but a first state parameter of the first filter is obtained through initialization in the process of positioning the mobile device by using the first observation data based on the first filter, where the first positioning result is not considered during the initialization.

For example, in the process of positioning the mobile device by using the first observation data based on the first filter, a manner of obtaining the first state parameter of the first filter through initialization includes but is not limited to: setting the first state parameter of the first filter based on experience; determining the first state parameter of the first filter based on a historical positioning result; and resolving a state parameter of the mobile device based on the first observation data, and determining the first state parameter of the first filter based on a state parameter obtained through resolution. For details about a process of resolving the state parameter of the mobile device based on the first observation data, refer to the embodiment shown in FIG. 8. Details are not described herein.

In an exemplary embodiment, the process of positioning the mobile device by using the first observation data may alternatively be implemented without relying on the first filter. For example, a state parameter of the mobile device may be resolved based on the first observation data, and a result including a state parameter obtained through resolution may be used as the second positioning result.

In other words, the second positioning result may be obtained based on the state parameter obtained through resolution. For example, the result including the state parameter obtained through resolution is used as the second positioning result; or the first state parameter of the first filter is determined based on the state parameter obtained through resolution, and the second positioning result is obtained through filtering by the first filter. Accuracy of the state parameter obtained through resolution is high. The second positioning result is obtained based on the state parameter obtained through resolution, so that positioning accuracy of the second positioning result can be improved.

For example, a process of determining the first state parameter of the first filter based on the state parameter obtained through resolution and obtaining the second positioning result through filtering by the first filter includes: determining the first state parameter of the first filter based on the state parameter obtained through resolution, and obtaining a first state covariance matrix corresponding to the first state parameter; obtaining a first observation residual matrix based on the first observation data and the first state parameter in response to that the first observation data meets a first screening condition; determining a first measurement update matrix and a first measurement variance matrix that correspond to the first observation residual matrix; determining a first parameter increment based on the first observation residual matrix, the first measurement update matrix, the first measurement variance matrix, and the first state covariance matrix, and using a sum of the first parameter increment and the first state parameter as an updated first state parameter of the first filter; and obtaining the second positioning result based on the updated first state parameter in response to that the updated first state parameter meets a first reference condition. An implementation principle of this process is the same as that of step 501 in the embodiment shown in FIG. 5. Details are not described herein again.

In step 702, the mobile device is positioned by using the double-difference observation data to obtain a third positioning result.

In an exemplary embodiment, no point cloud data needs to be considered in a process of positioning the mobile device by using the double-difference observation data. To be specific, step 702 may be performed independently of a process of positioning the mobile device by using point cloud data to obtain a first positioning result. An execution order of step 702 and the process of positioning the mobile device by using the point cloud data to obtain the first positioning result is not limited in embodiments of this disclosure. Alternatively, step 702 and step 701 may be performed separately.

For example, the process of positioning the mobile device by using the double-difference observation data may be implemented based on a second filter. A principle of positioning the mobile device by using the double-difference observation data based on the second filter is the same as a principle of modifying a first modified result by using the double-difference observation data based on the second filter. A difference lies in that a second state parameter of the second filter is determined based on the first modified result in the process of modifying the first modified result by using the double-difference observation data based on the second filter, but a second state parameter of the second filter is obtained through initialization in the process of positioning the mobile device by using the double-difference observation data based on the second filter, where the first positioning result or the first modified result is not considered during the initialization.

For example, in the process of positioning the mobile device by using the double-difference observation data based on the second filter, a manner of obtaining the second state parameter of the second filter through initialization includes but is not limited to: setting the second state parameter of the second filter based on experience; determining the second state parameter of the second filter based on a historical positioning result; and resolving a state parameter of the mobile device based on the first observation data, and determining the second state parameter of the second filter based on a state parameter obtained through resolution.

In step 703, fusion is performed on the first positioning result, the second positioning result, and the third positioning result, and a fusion result is used as the target positioning result.

The first positioning result, the second positioning result, and the third positioning result are positioning results of the mobile device that are predicted at a current positioning moment. The target positioning result obtained by comprehensively considering the point cloud data, the first observation data, and the double-difference observation data can be obtained through fusion of the first positioning result, the second positioning result, and the third positioning result. The target positioning result is less dependent on any type of data, so that accuracy and robustness of the target positioning result can be improved.

For example, the first positioning result, the second positioning result, and the third positioning result include a same type of parameter to facilitate fusion. For example, the first positioning result, the second positioning result, and the third positioning result all include a location, or the first positioning result, the second positioning result, and the third positioning result all include a location and a speed.

In an example implementation, an implementation process of performing fusion on the first positioning result, the second positioning result, and the third positioning result, and using the fusion result as the target positioning result includes: obtaining a first weight corresponding to the first positioning result, a second weight corresponding to the second positioning result, and a third weight corresponding to the third positioning result; and performing fusion on the first positioning result, the second positioning result, and the third positioning result based on the first weight, the second weight, and the third weight, and using a fusion result as the target positioning result for the mobile device. The first weight, the second weight, and the third weight are set based on experience or flexibly adjusted based on an application scenario. This is not limited in embodiments of this disclosure. For example, for a positioning result obtained based on a filter, a weight corresponding to the positioning result may be determined based on a state covariance matrix based on which the positioning result is obtained.

In another possible implementation, an implementation process of performing fusion on the first positioning result, the second positioning result, and the third positioning result, and using the fusion result as the target positioning result for the mobile device may alternatively include: performing fusion on any two of the first positioning result, the second positioning result, and the third positioning result to obtain a fusion result; and performing fusion on the fusion result and an unfused positioning result, and using a fusion result as the target positioning result for the mobile device.

For example, a process of performing fusion on two positioning results may be implemented based on weights respectively corresponding to the two positioning results. The weights respectively corresponding to the two positioning results may be set based on experience or flexibly adjusted based on an application scenario. This is not limited in embodiments of this disclosure.

In this positioning manner, the mobile device is positioned separately by using the point cloud data, the first observation data, and the double-difference observation data. After the three positioning results are obtained, fusion is performed on the three positioning results to obtain the target positioning result. The point cloud data, the first observation data, and the double-difference observation data are comprehensively considered in the process of obtaining the target positioning result. Abundant information is considered, and accuracy of the target positioning result is high. In this positioning manner, dependency on any type of data is weak, so that positioning robustness can be improved.

In an exemplary embodiment, as shown in FIG. 8, the process of resolving the state parameter of the mobile device based on the first observation data includes the following step 801 to step 803.

In step 801, an initial observation residual matrix is obtained based on the first observation data and an initial positioning result, and an initial Jacobian matrix and an initial measurement variance matrix that correspond to the initial observation residual matrix are determined.

For example, the initial observation residual matrix is constructed based on the first observation data, the initial positioning result for the mobile device, and state information of a first satellite, the initial Jacobian matrix is a Jacobian matrix of the initial observation residual matrix with respect to the initial positioning result, and the initial measurement variance matrix is constructed based on a signal-to-noise ratio of the first observation data and an elevation of the first satellite. For example, the initial Jacobian matrix may also be referred to as an initial measurement update matrix.

The state information of the first satellite includes at least one of a location, a clock error, a speed, and a clock drift of the first satellite. The state information of the first satellite may be obtained by the mobile device based on the first observation data and a navigation ephemeris of the first satellite. The initial positioning result may be randomly set based on experience. For example, the initial positioning result includes at least one of an initial pseudorange positioning result and an initial Doppler positioning result. The initial pseudorange positioning result includes an initial location and an initial clock error of the mobile device. The initial Doppler positioning result includes an initial speed and an initial clock drift of the mobile device.

In a case that the initial positioning result includes the initial pseudorange positioning result, the first observation data includes first pseudorange observation data, the first pseudorange observation data includes pseudorange observation subdata corresponding to the first satellite, and the state information of the first satellite includes pseudorange state information of the first satellite (to be specific, the location and the clock error of the first satellite). In a case that the initial positioning result includes the initial Doppler positioning result, the first observation data includes first Doppler observation data, the first Doppler observation data includes Doppler observation subdata corresponding to the first satellite, and the state information of the first satellite includes Doppler state information of the first satellite (to be specific, the speed and the clock drift of the first satellite).

For example, in a case that the initial positioning result includes the initial pseudorange positioning result and the initial Doppler positioning result, the process of resolving the state parameter of the mobile device based on the first observation data is implemented based on a pseudorange observation equation and a Doppler observation equation.

For example, the number of first satellites is n. In this case, the pseudorange observation equation is an equation shown in a formula 27:

$$
\begin{bmatrix} \tilde{\rho}_1 \\ \tilde{\rho}_2 \\ \vdots \\ \tilde{\rho}_n \end{bmatrix} = \begin{bmatrix} \|r_u - r^1\| + c \cdot dt_r - c \cdot dt^1 + \zeta^1 \\ \|r_u - r^2\| + c \cdot dt_r - c \cdot dt^2 + \zeta^2 \\ \vdots \\ \|r_u - r^n\| + c \cdot dt_r - c \cdot dt^n + \zeta^n \end{bmatrix}
\quad \text{(Formula 27)}
$$

$\tilde{\rho}_i$ represents pseudorange observation subdata that is received by the mobile device and that corresponds to a first satellite i (i=1, 2, ..., n). $r_u$ represents the location of the mobile device. $r^i$ represents a location of the first satellite i. $dt_r$ represents the clock error of the mobile device. $dt^i$ represents a clock error of the first satellite i. c is a value of a speed of light in vacuum. $\zeta^i$ represents an error correction (which includes ionospheric, tropospheric, and Earth's rotation correction, and may be calculated by using an empirical model) corresponding to the first satellite i. $\|r_u - r^i\|$ represents a Euclidean distance (geometric distance) between the location $r_u$ of the mobile device and the location $r^i$ of the first satellite i. In the formula 27, all parameters other than the location $r_u$ of the mobile device and the clock error $dt_r$ of the mobile device are known. The location and the clock error of the mobile device may be estimated based on the pseudorange observation equation shown in the formula 27.

For example, the number of first satellites is n. In this case, the Doppler observation equation is an equation shown in a formula 28:

$$
\begin{bmatrix} \lambda \tilde{D}_u^1 \\ \lambda \tilde{D}_u^2 \\ \vdots \\ \lambda \tilde{D}_u^n \end{bmatrix} = \begin{bmatrix} (v^1 - v_u) \cdot \dfrac{r_u - r^1}{\|r_u - r^1\|} + c \cdot \dot{d}t_r - c\dot{d}t^1 \\ (v^2 - v_u) \cdot \dfrac{r_u - r^1}{\|r_u - r^1\|} + c \cdot \dot{d}t_r - c\dot{d}t^2 \\ \vdots \\ (v^n - v_u) \cdot \dfrac{r_u - r^1}{\|r_u - r^1\|} + c \cdot \dot{d}t_r - c\dot{d}t^n \end{bmatrix}
\quad \text{(Formula 28)}
$$

$\lambda$ represents a wavelength of a signal broadcast by a satellite.

$$\tilde{D}_u^i$$

represents Doppler observation subdata that is received by the mobile device and that corresponds to the first satellite i (i=1, 2, ..., n). $v^i$ represents a speed of the first satellite i. $v_u$ represents the speed of the mobile device. $\dot{d}t_r$ represents the clock drift of the mobile device. $\dot{d}t^i$ represents a clock drift of the first satellite i. For meanings of other parameters, refer to the descriptions of the formula 27. The speed and the clock drift of the mobile device may be estimated based on the Doppler observation equation shown in the formula 28. During resolution of the speed and the clock drift of the mobile device, the location of the mobile device and a location of each first satellite need to be provided. For example, the pseudorange observation equation shown in the formula 27 and the Doppler observation equation shown in the formula 28 may be collectively referred to as a satellite observation equation.

For example, the location and the clock error of the mobile device can be estimated by using the pseudorange observation equation. For example, the location and the clock error of the mobile device are expressed by using the following estimated parameter: $x_u=$ $$\begin{bmatrix} r_u \\ dt_r \end{bmatrix}.$$

An objective of estimating the location of the clock error of the mobile device is to iteratively update the estimated parameter $x_u$ to obtain estimated values of the location and the clock error of the mobile device. The speed and the clock drift of the mobile device can be estimated by using the Doppler observation equation. For example, the speed and the clock drift of the mobile device are expressed by using the following estimated parameter:

$$y_u = \begin{bmatrix} v_u \\ \dot{d}t_r \end{bmatrix}.$$

An objective of estimating the speed and the clock drift of the mobile device is to iteratively update the estimated parameter $y_u$ to obtain estimated values of the speed and the clock drift of the mobile device.

For example, a manner provided in embodiments of this disclosure for resolving the state parameter of the mobile device may be referred to as a robust weighted least square method. The robust weighted least square method combines a robust estimation principle with a least-square form by using an equivalent weight. Subjects of measurement values usually conform to normal distribution. The least square method is a mathematical optimization method. The robust weighted least square method is only an example provided in embodiments of this disclosure for description. Mathematical optimization methods other than the robust weighted least square method, such as a Newton's method and a stochastic gradient descent method, are also applicable. This is not limited in embodiments of this disclosure.

In a process of estimating the location and the clock error of the mobile device by using the robust weighted least square method, an initial value of the estimated parameter $x_u$ is first set. The initial value indicates an initial location and an initial clock error of the mobile device, and is denoted as $$x_{u,0} = \begin{bmatrix} r_{u,0} \\ dt_{r,0} \end{bmatrix}.$$

In a process of estimating the speed and the clock drift of the mobile device by using the robust weighted least square method, an initial value of the estimated parameter $y_u$ is first set. The initial value indicates an initial speed and an initial clock drift of the mobile device, and is denoted as $$y_{u,0} = \begin{bmatrix} v_{u,0} \\ \dot{d}t_{r,0} \end{bmatrix}.$$

In a case that the initial positioning result includes the initial pseudorange positioning result (to be specific, the initial location and the initial clock error of the mobile device), the first observation data includes the first pseudorange observation data (to be specific, the pseudorange observation subdata corresponding to the first satellite), the state information of the first satellite includes the location and the clock error of the first satellite, and the initial observation residual matrix includes an initial pseudorange observation residual matrix. In a case that the initial positioning result includes the initial Doppler positioning result (to be specific, the initial speed and the initial clock drift of the mobile device), the first observation data includes the first Doppler observation data (to be specific, the Doppler observation subdata corresponding to the first satellite), the state information of the first satellite includes the speed and the clock drift of the first satellite, and the initial observation residual matrix includes an initial Doppler observation residual matrix.

The initial pseudorange observation residual matrix is obtained based on the initial location and the initial clock error of the mobile device, the pseudorange observation subdata corresponding to the first satellite, and the location and the clock error of the first satellite. The initial Doppler observation residual matrix is obtained based on the initial speed and the initial clock drift of the mobile device, the Doppler observation subdata corresponding to the first satellite, and the speed and the clock drift of the first satellite.

For example, a geometric distance, for example, $\|r_{u,0}-r^i\|$, between the initial location and the location of the first satellite i is obtained; and a clock error difference, for example, $dt_{r,0}-dt^i$, between the initial clock error and the clock error of the first satellite i is obtained. A first estimated value, for example, $\|r_{u,0}-r^i\|+c\cdot dt_{r,0}-c\cdot dt^i+\zeta^i$, between the mobile device and the first satellite i may be determined based on the geometric distance and the clock error difference. A pseudorange observation equation between the mobile device and the first satellite is constructed by using the first estimated value and pseudorange observation subdata corresponding to the first satellite i. A form of the pseudorange observation equation is shown in the formula 27, except that $r_u$ in the formula 27 is replaced with $r_{u,0}$ and $dt_r$ is replaced with $dt_{r,0}$. Then subtraction may be performed between two sides of the pseudorange observation equation to obtain the initial pseudorange observation residual matrix. An element in the initial pseudorange observation residual matrix may be expressed as a residual value between pseudorange observation subdata corresponding to each first satellite and an estimated value obtained based on the initial location, a location of the first satellite, the initial clock error, and a clock error of the first satellite.

For example, a speed difference between the initial speed and the speed of the first satellite i is obtained, and a unit observation value, for example $$\frac{r_{u,0}-r^i}{\|r_{u,0}-r^i\|},$$

between the mobile device and the first satellite i is obtained; a clock drift difference between the initial clock drift and the clock drift of the first satellite i is obtained; and a second estimated value, for example, $$(v^i-v_{u,0})\cdot\frac{r_{u,0}-r^i}{\|r_{u,0}-r^i\|}+c\cdot \dot{dt}_{r,0}-c\dot{dt}^i,$$

between the mobile device and the first satellite i is determined based on the clock drift difference and a product of the speed difference and the unit observation value. The Doppler observation equation between the mobile device and the first satellite is constructed by using the second estimated value and a product of the wavelength of the signal broadcast by the satellite and the Doppler observation subdata corresponding to the first satellite. A form of the Doppler observation equation is shown in the formula 28, except that $v_u$ in the formula 28 is replaced with $v_{u,0}$, $\dot{dt}_r$ is replaced with $\dot{dt}_{r,0}$, and $r_u$ is replaced with $r_{u,0}$. Then subtraction may be performed between both sides of the Doppler observation equation to obtain a Doppler observation residual matrix.

After the initial observation residual matrix is constructed, the Jacobian matrix of the initial observation residual matrix with respect to the initial positioning result is used as the initial Jacobian matrix, and the initial measurement variance matrix is constructed based on the signal-to-noise ratio of the first observation data and the elevation of the first satellite.

For example, in a case that the initial observation residual matrix includes the initial pseudorange observation residual matrix, the initial Jacobian matrix includes an initial pseudorange Jacobian matrix, and the initial measurement variance matrix includes an initial pseudorange measurement variance matrix. The initial pseudorange Jacobian matrix is a Jacobian matrix of the initial pseudorange observation residual matrix with respect to the initial pseudorange positioning result. The initial pseudorange measurement variance matrix is constructed based on a signal-to-noise ratio of the pseudorange observation subdata corresponding to the first satellite and the elevation of the first satellite.

For example, assuming that an estimated parameter in a $k^{th}$ (k is an integer) iteration is $$x_{u,k}=\begin{bmatrix} r_{u,k} \\ dt_{r,k} \end{bmatrix},$$

in a case that k is 0, the estimated parameter in the $k^{th}$ iteration includes the initial location and the initial clock error. A satellite observation equation in each iteration is constructed based on an estimated parameter in the iteration. To be specific, in a pseudorange observation equation in the $k^{th}$ iteration, the location and the clock error of the mobile device in the formula 27 need to be replaced with a location $r_{u,k}$ and a clock error $dt_{r,k}$ in $x_{u,k}$. A partial derivative of the pseudorange observation equation in the $k^{th}$ iteration with respect to the estimated parameter in the $k^{th}$ iteration is determined as a pseudorange Jacobian matrix in the $k^{th}$ iteration. The pseudorange Jacobian matrix in the $k^{th}$ iteration is denoted as $G_{\rho k}$. The Jacobian matrix $G_{\rho k}$ may be shown in the following formula 29:

$$G_{\rho k}=\frac{\partial\begin{bmatrix} \rho_1 \\ \rho_2 \\ \vdots \\ \rho_n \end{bmatrix}}{\partial\begin{bmatrix} r_{u,k} \\ dt_{r,k} \end{bmatrix}}=\begin{bmatrix} -e^{1T} & c \\ -e^{2T} & c \\ \vdots \\ -e^{nT} & c \end{bmatrix} \quad \text{(Formula 29)}$$

$$e^i = \frac{r^i - r_{u,k}}{\|r^i - r_{u,k}\|}$$

represents a unit observation vector from the mobile device to a satellite i (i=1, 2, . . . , n) in the $k^{th}$ iteration. $e^{iT}$ represents a transposed vector of the unit observation vector from the mobile device to the satellite i in the $k^{th}$ iteration. The initial pseudorange Jacobian matrix is a pseudorange Jacobian matrix in the case of k=0, that is, $G_{\rho 0}$.

For example, pseudorange observation errors respectively corresponding to n first satellites are determined based on signal-to-noise ratios of pseudorange observation subdata respectively corresponding to the n first satellites and elevations respectively corresponding to the n first satellites, and the initial pseudorange measurement variance matrix is constructed by using the pseudorange observation errors respectively corresponding to the n first satellites as diagonal elements of the matrix.

For example, the number of pieces of pseudorange observation subdata (namely, the number of first satellites) is n, a pseudorange measurement variance matrix may be shown in the following formula 30:

$$W_{\rho k} = \begin{bmatrix} \sigma_{\rho 1} & \cdots & 0 \\ \vdots & \ddots & \vdots \\ 0 & \cdots & \sigma_{\rho n} \end{bmatrix} \qquad \text{(Formula 30)}$$

$W_{\rho k}$ represents a pseudorange measurement variance matrix in the $k^{th}$ iteration. $\sigma_{\rho i}$ represents a pseudorange observation error corresponding to the first satellite i. $\sigma_{\rho i}$ may be calculated based on the following formula 31:

$$\sigma_{\rho i} = \delta_\rho \cdot \frac{10^{\frac{53 - CNo^i}{10}}}{\sin^2 el^i} \qquad \text{(Formula 31)}$$

$CN0^i$ represents a signal-to-noise ratio corresponding to the pseudorange observation subdata of the first satellite i. el' represents an elevation of the first satellite i. $\delta_\rho$ represents a pseudorange observation error parameter. The parameter may be set based on experience or flexibly adjusted based on an actual case. This is not limited in embodiments of this disclosure. For example, $\delta_\rho$ may be set to $3^2$.

For example, the pseudorange measurement variance matrix is a matrix with a fixed value. During iterative updating of the estimated parameter $x_u$, in a case that used pseudorange observation data does not change, the pseudorange measurement variance matrix remains unchanged. To be specific, the pseudorange measurement variance matrix in the $k^{th}$ iteration is the same as a pseudorange measurement variance matrix in a $0^{th}$ iteration (the initial pseudorange measurement variance matrix), in other words, $W_{\rho k}$ is the initial pseudorange measurement variance matrix.

For example, a process of obtaining the initial pseudorange Jacobian matrix of the initial pseudorange observation residual matrix with respect to the initial pseudorange positioning result is performed in the case of determining that the initial pseudorange observation residual matrix meets a gross error filtering condition, to improve reliability of a positioning result resolution process. The initial pseudorange observation residual matrix meeting the gross error filtering condition indicates that reliability of pseudorange observation subdata corresponding to the initial pseudorange observation residual matrix is high. For example, a process of determining whether the initial pseudorange observation residual matrix meets the gross error filtering condition includes: performing gross error detection on the initial pseudorange observation residual matrix based on a quartile, and in a case that no pseudorange observation subdata needs to be eliminated, determining that the initial pseudorange observation residual matrix meets the gross error filtering condition.

For example, in specific implementation process, many different solutions may be derived from a process of performing gross error detection on the initial pseudorange observation residual matrix based on the quartile. For example, for same data, an obtained result may vary based on different gross error detection conditions, and gross error detection solutions leading to different results may be different. A quartile-based gross error detection solution is used as an example to describe the gross error detection process in embodiments of this disclosure, but embodiments of this disclosure are not limited thereto.

Elements in the initial pseudorange observation residual matrix are sorted in ascending order to obtain a sorted pseudorange observation residual sequence. The sorted pseudorange observation residual sequence may be referred to as a first sequence. Gross error detection may be performed on the first sequence based on an upper quartile and a lower quartile of the first sequence. For example, gross error detection is performed on the first sequence by determining whether each element in the first sequence is less than $M_{1/4} - 1.5 \times (M_{3/4} - M_{1/4})$ or greater than $M_{3/4} + 1.5 \times (M_{3/4} - M_{1/4})$. In a case that none of elements in the first sequence is less than $M_{1/4} - 1.5 \times (M_{3/4} - M_{1/4})$ or greater than $M_{3/4} + 1.5 \times (M_{3/4} - M_{1/4})$, it is considered that no pseudorange observation subdata needs to be eliminated, in other words, it is determined that the initial pseudorange observation residual matrix meets the gross error filtering condition. $M_{1/4}$ is the lower quartile of the first sequence, and $M_{3/4}$ is the upper quartile of the first sequence.

For example, the initial pseudorange observation residual matrix may alternatively not meet the gross error filtering condition. In a case that the initial pseudorange observation residual matrix does not meet the gross error filtering condition, pseudorange observation subdata that fails gross error detection is eliminated from the first initial pseudorange observation data, and then a subsequent step is performed based on remaining pseudorange observation data, to be specific, the initial pseudorange Jacobian matrix and the initial pseudorange measurement variance matrix are obtained based on the remaining pseudorange observation data.

For example, in a case that the initial observation residual matrix includes the initial Doppler observation residual matrix, the initial Jacobian matrix includes an initial Doppler Jacobian matrix, and the initial measurement variance matrix includes an initial Doppler measurement variance matrix. The initial Doppler Jacobian matrix is a Jacobian matrix of the initial Doppler observation residual matrix with respect to the initial Doppler positioning result. The initial Doppler measurement variance matrix is constructed based on a signal-to-noise ratio of the Doppler observation subdata corresponding to the first satellite and the elevation of the first satellite.

A principle of obtaining the initial Doppler Jacobian matrix is the same as that of obtaining the pseudorange Jacobian matrix, and a principle of constructing the initial Doppler measurement variance matrix is the same as that of constructing the initial pseudorange measurement variance matrix. Details are not described herein again. For example, a Doppler observation error parameter $\delta_\rho'$ based on which the initial Doppler measurement variance matrix is constructed may be set based on experience or flexibly adjusted based on an actual case. This is not limited in embodiments of this disclosure. For example, $\delta_\rho = 0.03^2$.

In step 802, a positioning result modification amount is obtained based on the initial observation residual matrix, the initial Jacobian matrix, and the initial measurement variance matrix, and a sum of the positioning result modification amount and the initial positioning result is used as an intermediate positioning result.

For example, the initial Jacobian matrix includes the initial pseudorange Jacobian matrix, the initial measurement variance matrix includes the initial pseudorange measurement variance matrix, the initial observation residual matrix includes the initial pseudorange observation residual matrix, the positioning result modification amount includes a pseudorange positioning result modification amount, the initial positioning result includes the initial pseudorange positioning result, and the intermediate positioning result includes an intermediate pseudorange positioning result. In this case, an implementation process of step 802 includes: obtaining the pseudorange positioning result modification amount based on the initial pseudorange Jacobian matrix, the initial pseudorange measurement variance matrix, and the initial pseudorange observation residual matrix, and using a sum of the pseudorange positioning result modification amount and the initial pseudorange positioning result as the intermediate pseudorange positioning result.

For example, a pseudorange positioning result modification amount in the $k^{th}$ iteration is obtained based on the pseudorange Jacobian matrix $G_{\rho k}$ in the $k^{th}$ iteration, a pseudorange observation residual matrix $V_k$ in the $k^{th}$ iteration, and the pseudorange measurement variance matrix $W_{\rho k}$ in the $k^{th}$ iteration. The pseudorange positioning result modification amount in the $k^{th}$ iteration may be shown in the following formula 32:

$$\Delta x_{\rho,k} = -\left(G_{\rho k}^T W_{\rho k} G_{\rho k}\right)^{-1} G_{\rho k}^T W_{\rho k} V_k \qquad \text{(Formula 32)}$$

$\Delta x_{\rho,k}$ represents the pseudorange positioning result modification amount in the $k^{th}$ iteration.

$$G_{\rho k}^T$$

represents a transposed matrix of the pseudorange Jacobian matrix in the $k^{th}$ iteration. $V_k$ represents the pseudorange observation residual matrix in the $k^{th}$ iteration. $V_k$ is shown in the following formula 33:

$$V_k = \begin{bmatrix} \tilde{\rho}_1 - (\|r_{u,k} - r^1\| + c \cdot dt_{r,k} - c \cdot dt^1 + \zeta^1) \\ \tilde{\rho}_2 - (\|r_{u,k} - r^2\| + c \cdot dt_{r,k} - c \cdot dt^2 + \zeta^2) \\ \vdots \\ \tilde{\rho}_n - (\|r_{u,k} - r^n\| + c \cdot dt_{r,k} - c \cdot dt^n + \zeta^n) \end{bmatrix} \qquad \text{(Formula 33)}$$

$r_{u,k}$ and $dt_{r,k}$ are estimated values of the location and the clock error of the mobile device in the $k^{th}$ iteration. For meanings of other parameters, refer to the formula 27.

The estimated parameter $x_u$ of the pseudorange positioning result may be updated based on the pseudorange positioning result modification amount in the $k^{th}$ iteration. An update process is shown in the following formula 34:

$$x_{u,k+1} = x_{u,k} + \Delta x_{\rho,k} \qquad \text{(Formula 34)}$$

$x_{u,k+1}$ represents an estimated parameter of a pseudorange positioning result in a $(k+1)^{th}$ iteration. $x_{u,k}$ represents an estimated parameter of a pseudorange positioning result in the $k^{th}$ (k is an integer not less than 0) iteration. $\Delta x_{\rho,k}$ represents the pseudorange positioning result modification amount in the $k^{th}$ iteration.

For example, because a current iteration is the $0^{th}$ iteration, the pseudorange positioning result modification amount may be expressed as $\Delta x_{\rho,0}$, the initial pseudorange positioning result may be expressed as $x_{u,0}$, and the intermediate pseudorange positioning result may be expressed as $x_{u,1}$. A process of using the sum of the pseudorange positioning result modification amount and the initial pseudorange positioning result as the intermediate pseudorange positioning result may be expressed as follows: $x_{u,1} = x_{u,0} + \Delta x_{\rho,0}$.

For example, the initial Jacobian matrix includes the initial Doppler Jacobian matrix, the initial measurement variance matrix includes the initial Doppler measurement variance matrix, the initial observation residual matrix includes the initial Doppler observation residual matrix, the positioning result modification amount includes a Doppler positioning result modification amount, the initial positioning result includes the initial Doppler positioning result, and the intermediate positioning result includes an intermediate Doppler positioning result. In this case, an implementation process of step 802 includes: obtaining the Doppler positioning result modification amount based on the initial Doppler Jacobian matrix, the initial Doppler measurement variance matrix, and the initial Doppler observation residual matrix, and using a sum of the Doppler positioning result modification amount and the initial Doppler positioning result as the intermediate Doppler positioning result. A principle of obtaining the intermediate Doppler positioning result is the same as that of obtaining the intermediate pseudorange positioning result. Details are not described herein again.

In step 803, in response to that the intermediate positioning result meets a first selection condition, the state parameter obtained through resolution is obtained based on the intermediate positioning result.

For example, the intermediate positioning result includes at least one of the intermediate pseudorange positioning result and the intermediate Doppler positioning result. In a case that the intermediate positioning result includes the intermediate pseudorange positioning result and the intermediate Doppler positioning result, the intermediate positioning result meeting the first selection condition means that the intermediate pseudorange positioning result meets a first pseudorange selection condition and the intermediate Doppler positioning result meets a first Doppler selection condition. In a case that the intermediate positioning result includes only the intermediate pseudorange positioning result, the intermediate positioning result meeting the first selection condition means that the intermediate pseudorange positioning result meets the first pseudorange selection condition. In a case that the intermediate positioning result includes only the intermediate Doppler positioning result, the intermediate positioning result meeting the first selection condition means that the intermediate Doppler positioning result meets the first Doppler selection condition. In embodiments of this disclosure, an example in which the intermediate positioning result includes the intermediate pseudorange positioning result and the intermediate Doppler positioning result is used for description.

For example, a process of determining whether the intermediate pseudorange positioning result meets the first pseudorange selection condition includes: in response to that the pseudorange positioning result modification amount is less than a pseudorange modification amount threshold, constructing an intermediate pseudorange observation residual matrix based on the intermediate pseudorange positioning result, first pseudorange observation subdata corresponding to the first satellite, and the location and the clock error of the first satellite; using a product of a transposed matrix of the intermediate pseudorange observation residual matrix, an inverse matrix of the initial pseudorange measurement variance matrix, and the intermediate pseudorange observation residual matrix as a pseudorange test statistic; and in response to that the pseudorange test statistic is less than a pseudorange statistic threshold, determining that the intermediate pseudorange positioning result meets the first pseudorange selection condition.

The pseudorange modification amount threshold is set based on experience or flexibly adjusted based on an application scenario. This is not limited in embodiments of this disclosure. For example, the pseudorange modification amount threshold is $10^{-4}$, and the pseudorange positioning result modification amount being less than the pseudorange modification amount threshold may be expressed as $\|\Delta x_{\rho,k}\| < 10^{-4}$. For example, the pseudorange positioning result modification amount being less than the pseudorange modification amount threshold may be referred to as that the pseudorange positioning result modification amount converges. For example, in a case that the pseudorange positioning result modification amount is not less than the pseudorange modification amount threshold, the intermediate pseudorange positioning result is used as an initial pseudorange positioning value for a next iteration, and step 801 and step 802 are repeated.

A principle of constructing the intermediate pseudorange observation residual matrix is the same as that of constructing the initial pseudorange observation residual matrix. Details are not described herein again. For example, a process of using the product of the transposed matrix of the intermediate pseudorange observation residual matrix, the inverse matrix of the initial pseudorange measurement variance matrix, and the intermediate pseudorange observation residual matrix as the pseudorange test statistic may be implemented based on a formula 35:

$$s = V^T W_{\rho k}^{-1} V \qquad \text{(Formula 35)}$$

s represents the pseudorange test statistic. $W_{\rho k}$ represents the initial pseudorange measurement variance matrix.

$$W_{\rho k}^{-1}$$

represents the inverse matrix of the initial pseudorange measurement variance matrix. V represents the intermediate pseudorange observation residual matrix. An expression of V is shown in a formula 36 (V calculated in a case that k in the formula 36 is 0 is an intermediate pseudorange observation residual matrix in this case). $V^T$ represents the transposed matrix of the intermediate pseudorange observation residual matrix. In some embodiments, V may also be referred to as a post-test pseudorange observation residual matrix. For example, a process of determining whether the pseudorange test statistic is less than the pseudorange statistic threshold may also be referred to as a process of performing a chi-square test on the intermediate pseudorange positioning result.

$$V = \begin{bmatrix} \tilde{p}_1 - (\|r_{u,k+1} - r^1\| + c \cdot dt_{r,k+1} - c \cdot dt^1 + \zeta^1) \\ \tilde{p}_2 - (\|r_{u,k+1} - r^2\| + c \cdot dt_{r,k+1} - c \cdot dt^2 + \zeta^2) \\ \vdots \\ \tilde{p}_n - (\|r_{u,k+1} - r^n\| + c \cdot dt_{r,k+1} - c \cdot dt^n + \zeta^n) \end{bmatrix} \qquad \text{(Formula 36)}$$

$r_{u,k+1}$ represents a location in the intermediate pseudorange positioning result, and $dt_{r,k+1}$ represents a clock error in the intermediate pseudorange positioning result. For meanings of other parameters, refer to the formula 27.

In a case that the pseudorange test statistic is less than the pseudorange statistic threshold, it is determined that the intermediate pseudorange positioning result meets the first pseudorange selection condition. The pseudorange statistic threshold is set based on experience or flexibly adjusted based on an application scenario. This is not limited in embodiments of this application.

For example, in a case that the pseudorange test statistic is not less than the pseudorange statistic threshold, it is determined that the intermediate pseudorange positioning result does not meet the first pseudorange selection condition. In this case, an initial pseudorange residual covariance matrix may be constructed based on the initial pseudorange Jacobian matrix and the initial pseudorange measurement variance matrix; the intermediate pseudorange observation residual matrix is tested based on the initial pseudorange residual covariance matrix to obtain a test result corresponding to each element in the intermediate pseudorange observation residual matrix, and pseudorange observation subdata associated with an element whose test result is greater than a test threshold is eliminated from the first pseudorange observation data; and a new intermediate pseudorange positioning result is obtained based on remaining pseudorange observation data and the intermediate pseudorange positioning results, and so on, until a new intermediate pseudorange positioning result meets the first pseudorange selection condition. The test threshold is set based on experience or flexibly adjusted based on an application scenario.

For example, a process of constructing the initial pseudorange residual covariance matrix based on the initial pseudorange Jacobian matrix and the initial pseudorange measurement variance matrix may be implemented based on a formula 37:

$$C_V = W_{\rho k} - G_{\rho k} \left( G_{\rho k}^T W_{\rho k} G_{\rho k} \right)^{-1} G_{\rho k}^T \qquad \text{(Formula 37)}$$

$C_V$ represents the initial pseudorange residual covariance matrix, which may also be referred to as a post-test pseudorange residual covariance matrix. $W_{\rho k}$ represents the initial pseudorange measurement variance matrix. $G_{\rho k}$ represents the initial pseudorange Jacobian matrix.

$$G_{\rho k}^T$$

represents a transposed matrix of the initial pseudorange Jacobian matrix.

For example, a normal distribution test is performed on a pseudorange observation residual matrix in the $(k+1)^{th}$ iteration (a post-test pseudorange observation residual matrix, to be specific, a pseudorange observation residual matrix V that has undergone a chi-square test) by using the post-test residual covariance matrix to obtain a test result corresponding to each element in the pseudorange observation residual matrix in the $(k+1)^{th}$ iteration.

For example, the testing the intermediate pseudorange observation residual matrix based on the initial pseudorange residual covariance matrix may mean performing a normal distribution test on the intermediate pseudorange observation residual matrix based on the initial pseudorange residual covariance matrix.

For example, a process of testing the intermediate pseudorange observation residual matrix based on the initial pseudorange residual covariance matrix to obtain the test result corresponding to each element in the intermediate pseudorange observation residual matrix, and eliminating the pseudorange observation subdata associated with the element whose test result is greater than the test threshold from the first pseudorange observation data is implemented based on a formula 38:

$$\frac{|V_i|}{\sqrt{C_{V,ii}}} > N(\alpha) \Rightarrow \text{Eliminate pseudorange observation} \qquad \text{(Formula 38)}$$

subdata of the first satellite $i$, $i = 1, 2, \ldots, n$ $V_i$ represents a residual value corresponding to the first satellite i in the intermediate pseudorange observation residual matrix V, namely, an $i^{th}$ element in the intermediate pseudorange observation residual matrix V. $C_{V,ii}$ represents a covariance between first satellites i in the initial pseudorange residual covariance matrix.

$$\frac{|V_i|}{\sqrt{C_{V,ii}}}$$

represents a test result corresponding to the $i^{th}$ element in the intermediate pseudorange observation residual matrix V. $N(\alpha)$ represents a normal distribution upper-quantile with a confidence of $\alpha$, and also represents the test threshold.

For example, a process of determining whether the intermediate Doppler positioning result meets the first Doppler selection condition includes: in response to that the Doppler positioning result modification amount is less than a Doppler modification amount threshold, constructing an intermediate Doppler observation residual matrix based on the intermediate Doppler positioning result, first Doppler observation subdata corresponding to the first satellite, and the speed and the clock drift of the first satellite; using a product of a transposed matrix of the intermediate Doppler observation residual matrix, an inverse matrix of the initial Doppler measurement variance matrix, and the intermediate Doppler observation residual matrix as a Doppler test statistic; and in response to that the Doppler test statistic is less than a Doppler statistic threshold, determining that the intermediate Doppler positioning result meets the first Doppler selection condition. For example, a principle of determining whether the intermediate Doppler positioning result meets the first Doppler selection condition is the same as that of determining whether the intermediate pseudorange positioning result meets the first pseudorange selection condition. Details are not described herein again.

In the case of determining that the intermediate pseudorange positioning result meets the first pseudorange selection condition and the intermediate Doppler positioning result meets the first Doppler selection condition, it is determined that the intermediate positioning result meets the first selection condition, and then the state parameter obtained through resolution is obtained based on the intermediate positioning result. For example, the intermediate positioning result includes the intermediate pseudorange positioning result and the intermediate Doppler positioning result, the intermediate pseudorange positioning result includes the location and the clock error, and the intermediate Doppler positioning result includes the speed and the clock drift. The location and the clock error included in the intermediate pseudorange positioning result and the speed and the clock drift included in the intermediate Doppler positioning result are used as the state parameter obtained through resolution.

In an exemplary embodiment, after it is determined that the intermediate pseudorange positioning result meets the first pseudorange selection condition, a pseudorange observation random-error model factor may be further adaptively estimated based on the following formula 39:

$$S_\rho = \frac{V^T W_{\rho k}^{-1} V}{n - 4} \qquad \text{(Formula 39)}$$

$\zeta_\rho$ represents the pseudorange observation random-error model factor. V represents the intermediate pseudorange observation residual matrix. $V^T$ represents the transposed matrix of the intermediate pseudorange observation residual matrix. $W_{\rho k}$ represents the initial pseudorange measurement variance matrix.

$$W_{\rho k}^{-1}$$

represents the inverse matrix of the initial pseudorange measurement variance matrix. n represents the number of pieces of pseudorange observation subdata included in the intermediate pseudorange observation residual matrix, namely, the number of first satellites.

In an exemplary embodiment, information about the intermediate pseudorange positioning result (the location and the clock error), the pseudorange observation random-error model factor, and pseudorange observation subdata that remains in the case of obtaining the intermediate pseudorange positioning result may be further output for subsequent use.

In an exemplary embodiment, after it is determined that the intermediate Doppler positioning result meets the first Doppler selection condition, a Doppler observation random-error model factor may be further adaptively estimated. In an exemplary embodiment, information about the intermediate Doppler positioning result (the speed and the clock drift), the Doppler observation random-error model factor, and Doppler observation subdata that remains in the case of obtaining the intermediate Doppler positioning result may be further output for subsequent use.

For example, the process of estimating the location and the clock error of the mobile device by using the robust weighted least square method may be shown in FIG. 9. An initial value, to be specific, an initial location and an initial clock error, of an estimated parameter is set. A pseudorange observation residual matrix is constructed. Gross error detection is performed on the pseudorange observation residual matrix based on a quartile. A Jacobian matrix of the pseudorange observation residual matrix with respect to the estimated parameter is calculated. A pseudorange measurement variance matrix is constructed. A parameter modification amount is calculated, and the estimated parameter is updated. In a case that the parameter modification amount does not converge, the step of constructing a pseudorange observation residual matrix is performed. In a case that the parameter modification amount converges, a chi-square test statistic is calculated. In a case that the chi-square test statistic is greater than a threshold, a post-test pseudorange residual covariance matrix is calculated, a normal distribution test is performed on a post-test pseudorange observation residual matrix based on the post-test pseudorange residual covariance matrix, pseudorange observation subdata that fails the normal distribution test is eliminated, and the step of constructing a pseudorange observation residual matrix is performed. In a case that the chi-square test statistic is not greater than the threshold, a pseudorange observation random-error model factor is adaptively estimated, and the location and the clock error of the mobile device, the pseudorange observation random-error model factor, and information that remains after the pseudorange observation subdata is eliminated are output.

Figure 10:
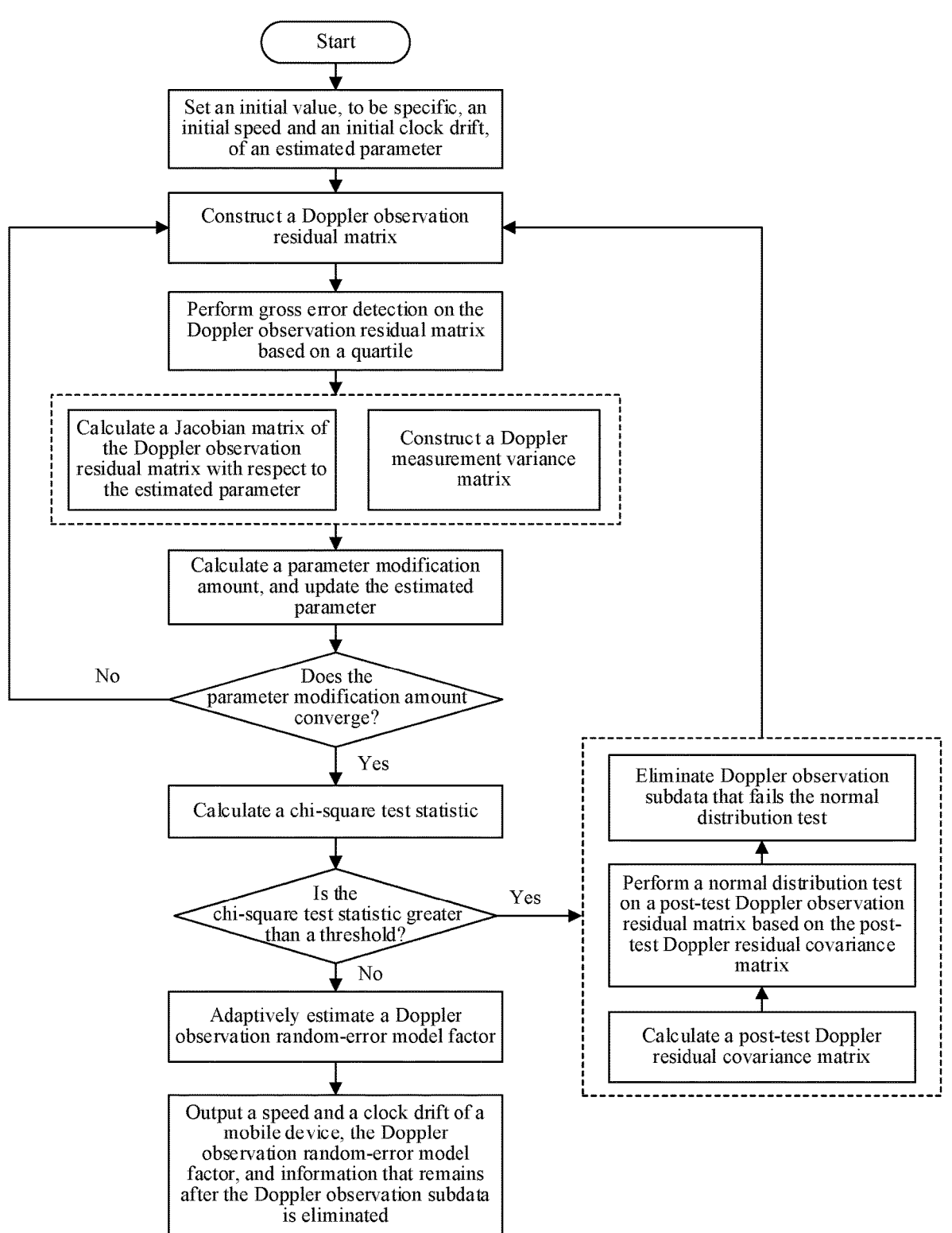
FIG. 10 is a schematic diagram of a process of estimating a speed and a clock drift of a mobile device by using a robust weighted least square method according to an embodiment of this disclosure.

For example, the process of estimating the speed and the clock drift of the mobile device by using the robust weighted least square method may be shown in FIG. 10. An initial value, to be specific, an initial speed and an initial clock drift, of an estimated parameter is set. A Doppler observation residual matrix is constructed. Gross error detection is performed on the Doppler observation residual matrix based on a quartile. A Jacobian matrix of the Doppler observation residual matrix with respect to the estimated parameter is calculated. A Doppler measurement variance matrix is constructed. A parameter modification amount is calculated, and the estimated parameter is updated. In a case that the parameter modification amount does not converge, the step of constructing a Doppler observation residual matrix is performed. In a case that the parameter modification amount converges, a chi-square test statistic is calculated. In a case that the chi-square test statistic is greater than a threshold, a post-test Doppler residual covariance matrix is calculated, a normal distribution test is performed on a post-test Doppler observation residual matrix based on the post-test Doppler residual covariance matrix, Doppler observation subdata that fails the normal distribution test is eliminated, and the step of constructing a Doppler observation residual matrix is performed. In a case that the chi-square test statistic is not greater than the threshold, a Doppler observation random-error model factor is adaptively estimated, and the speed and the clock drift of the mobile device, the Doppler observation random-error model factor, and information that remains after the Doppler observation subdata is eliminated are output.

Only two exemplary specific implementation processes of obtaining the target positioning result on the basis of the first positioning result based on the target data in a case that the target data includes the first observation data and the double-difference observation data are described in the embodiments shown in FIG. 5 and FIG. 7, but embodiments of this disclosure are not limited thereto. In some embodiments, a specific implementation process of obtaining the target positioning result on the basis of the first positioning result based on the target data in a case that the target data includes the first observation data and the double-difference observation data may alternatively include any one of the following implementation processes:

Implementation process 1: The first positioning result is modified by using the double-difference observation data to obtain a third modified result. The third modified result is modified by using the first observation data to obtain a fourth modified result, and the fourth modified result is used as the target positioning result.

The third modified result is a result obtained by modifying the first positioning result by using the double-difference observation data. A type of a parameter included in the third modified result is the same as a type of a parameter included in the first positioning result. For example, a process of modifying the first positioning result by using the double-difference observation data to obtain the third modified result may be implemented by the second filter, and the implementation principle is the same as that of step 502 in the embodiment shown in FIG. 5.

The fourth modified result is a result obtained by modifying the third modified result by using the first observation data. The fourth modified result is more reliable than the third modified result. After the fourth modified result is obtained, the fourth modified result is used as the target positioning result for the mobile device. This helps ensure reliability of the target positioning result and improve positioning accuracy and positioning robustness of the target positioning result. For example, a process of modifying the third modified result by using the first observation data to obtain the fourth modified result may be implemented by the first filter, and the implementation principle is the same as that of Step 501 in the embodiment shown in FIG. 5.

Implementation process 2: The first positioning result is modified by using the first observation data to obtain a first modified result. The mobile device is positioned by using the double-difference observation data to obtain a third positioning result. Fusion is performed on the first modified result and the third positioning result, and a fusion result is used as the target positioning result.

For an implementation process of modifying the first positioning result by using the first observation data to obtain the first modified result, and an implementation process of positioning the mobile device by using the double-difference observation data to obtain the third positioning result, refer to the foregoing related descriptions. Details are not described herein again. After the first modified result and the third positioning result are obtained, fusion is performed on the first modified result and the third positioning result, and the fusion result is used as the target positioning result. For example, an implementation process of performing fusion on the first modified result and the third positioning result includes: obtaining weights respectively corresponding to the first modified result and the third positioning result, and performing fusion on the first modified result and the third positioning result based on the weights respectively corresponding to the first modified result and the third positioning result.

Implementation process 3: The first positioning result is modified by using the double-difference observation data to obtain a third modified result. The mobile device is positioned by using the first observation data to obtain a second positioning result. Fusion is performed on the third modified result and the second positioning result, and a fusion result is used as the target positioning result.

For an implementation process of modifying the first positioning result by using the double-difference observation data to obtain the third modified result, and an implementation process of positioning the mobile device by using the first observation data to obtain the second positioning result, refer to the foregoing related descriptions. Details are not described herein again. After the third modified result and the second positioning result are obtained, fusion is performed on the third modified result and the second positioning result, and the fusion result is used as the target positioning result. For example, an implementation process of performing fusion on the third modified result and the second positioning result includes: obtaining weights respectively corresponding to the third modified result and the second positioning result, and performing fusion on the third modified result and the second positioning result based on the weights respectively corresponding to the third modified result and the second positioning result.

Implementation process 4: The first positioning result is modified by using the first observation data to obtain a first modified result. The first positioning result is modified by using the double-difference observation data to obtain a third modified result. Fusion is performed on the third modified result and the first modified result, and a fusion result is used as the target positioning result.

For an implementation process of modifying the first positioning result by using the first observation data to obtain the first modified result, and an implementation process of modifying the first positioning result by using the double-difference observation data to obtain the third modified result, refer to the foregoing related descriptions. Details are not described herein again. After the first modified result and the third modified result are obtained, fusion is performed on the first modified result and the third modified result, and the fusion result is used as the target positioning result. For example, an implementation process of performing fusion on the first modified result and the third modified result includes: obtaining weights respectively corresponding to the first modified result and the third modified result, and performing fusion on the first modified result and the third modified result based on the weights respectively corresponding to the first modified result and the third modified result.

Implementation process 5: The mobile device is positioned by using the first observation data to obtain a second positioning result. The second positioning result is modified by using the double-difference observation data to obtain a fifth modified result. Fusion is performed on the fifth modified result and the first positioning result, and a fusion result is used as the target positioning result.

For an implementation process of positioning the mobile device by using the first observation data to obtain the second positioning result, refer to the foregoing related descriptions. Details are not described herein again. An implementation principle of modifying the second positioning result by using the double-difference observation data is the same as that of modifying the first modified result by using the double-difference observation data. A result obtained by modifying the second positioning result by using the double-difference observation data is used as the fifth modified result.

For example, an implementation process of performing fusion on the fifth modified result and the first positioning result includes: obtaining weights respectively corresponding to the fifth modified result and the first positioning result, and performing fusion on the fifth modified result and the first positioning result based on the weights respectively corresponding to the fifth modified result and the first positioning result.

Implementation process 6: The mobile device is positioned by using the double-difference observation data to obtain a third positioning result. The third positioning result is modified by using the first observation data to obtain a sixth modified result. Fusion is performed on the sixth modified result and the first positioning result, and a fusion result is used as the target positioning result.

For an implementation process of positioning the mobile device by using the double-difference observation data to obtain the third positioning result, refer to the foregoing related descriptions. Details are not described herein again. An implementation principle of modifying the third positioning result by using the first observation data is the same as that of modifying the first positioning result by using the first observation data. A result obtained by modifying the third positioning result by using the first observation data is used as the sixth modified result.

For example, an implementation process of performing fusion on the sixth modified result and the first positioning result includes: obtaining weights respectively corresponding to the sixth modified result and the first positioning result, and performing fusion on the sixth modified result and the first positioning result based on the weights respectively corresponding to the sixth modified result and the first positioning result.

Implementation process 7: The mobile device is positioned by using the first observation data to obtain a second positioning result. Fusion is performed on the first positioning result and the second positioning result to obtain a first fusion result. The first fusion result is modified by using the double-difference observation data, and a modified result is used as the target positioning result.

For an implementation process of positioning the mobile device by using the first observation data to obtain the second positioning result, refer to the foregoing related descriptions. Details are not described herein again. For example, an implementation process of performing fusion on the first positioning result and the second positioning result to obtain the first fusion result includes: obtaining weights respectively corresponding to the first positioning result and the second positioning result, and performing fusion on the first positioning result and the second positioning result based on the weights respectively corresponding to the first positioning result and the second positioning result to obtain the first fusion result.

An implementation principle of modifying the first fusion result by using the double-difference observation data is the same as that of modifying the first modified result by using the double-difference observation data. A result obtained by modifying the first fusion result by using the double-difference observation data is used as the target positioning result for the mobile device.

Implementation process 8: The mobile device is positioned by using the double-difference observation data to obtain a third positioning result. Fusion is performed on the first positioning result and the third positioning result to obtain a second fusion result. The second fusion result is modified by using the first observation data, and a modified result is used as the target positioning result.

For an implementation process of positioning the mobile device by using the double-difference observation data to obtain the third positioning result, refer to the foregoing related descriptions. Details are not described herein again. For example, an implementation process of performing fusion on the first positioning result and the third positioning result to obtain the second fusion result includes: obtaining weights respectively corresponding to the first positioning result and the third positioning result, and performing fusion on the first positioning result and the third positioning result based on the weights respectively corresponding to the first positioning result and the third positioning result to obtain the second fusion result.

An implementation principle of modifying the second fusion result by using the first observation data is the same as that of modifying the first positioning result by using the first observation data. A result obtained by modifying the second fusion result by using the first observation data is used as the target positioning result for the mobile device.

In an exemplary embodiment, the target data required for obtaining the target positioning result on the basis of the first positioning result may alternatively include only the first observation data. In this case, a specific implementation process of obtaining the target positioning result on the basis of the first positioning result based on the target data may include the following implementation process 1 and implementation process 2:

Implementation process 1: The first positioning result is modified by using the first observation data to obtain a first modified result, and the first modified result is used as the target positioning result.

For an implementation process of modifying the first positioning result by using the first observation data to obtain the first modified result, refer to the foregoing related descriptions. Details are not described herein again. After the first modified result is obtained, the first modified result is directly used as the target positioning result for the mobile device.

Implementation process 2: The mobile device is positioned by using the first observation data to obtain a second positioning result, fusion is performed on the first positioning result and the second positioning result, and a fusion result is used as the target positioning result.

For an implementation process of positioning the mobile device by using the first observation data to obtain the second positioning result, refer to the foregoing related descriptions. Details are not described herein again.

For example, an implementation process of performing fusion on the first positioning result and the second positioning result includes: obtaining weights respectively corresponding to the first positioning result and the second positioning result, and performing fusion on the first positioning result and the second positioning result based on the weights respectively corresponding to the first positioning result and the second positioning result. After the fusion, a fusion result is used as the target positioning result for the mobile device.

In an exemplary embodiment, the target data required for obtaining the target positioning result on the basis of the first positioning result may alternatively include only the double-difference observation data. In this case, a specific implementation process of obtaining the target positioning result on the basis of the first positioning result based on the target data includes the following implementation process A and implementation process B:

Implementation process A: The first positioning result is modified by using the double-difference observation data to obtain a third modified result, and the third modified result is used as the target positioning result.

For an implementation process of modifying the first positioning result by using the double-difference observation data to obtain the third modified result, refer to the foregoing related descriptions. Details are not described herein again. After the third modified result is obtained, the third modified result is directly used as the target positioning result for the mobile device.

Implementation process B: The mobile device is positioned by using the double-difference observation data to obtain a third positioning result, fusion is performed on the first positioning result and the third positioning result, and a fusion result is used as the target positioning result.

For an implementation process of positioning the mobile device by using the double-difference observation data to obtain the third positioning result, refer to the foregoing related descriptions. Details are not described herein again.

For example, an implementation process of performing fusion on the first positioning result and the third positioning result includes: obtaining weights respectively corresponding to the first positioning result and the third positioning result, and performing fusion on the first positioning result and the third positioning result based on the weights respectively corresponding to the first positioning result and the third positioning result. After the fusion, a fusion result is used as the target positioning result for the mobile device.

Figure 11:
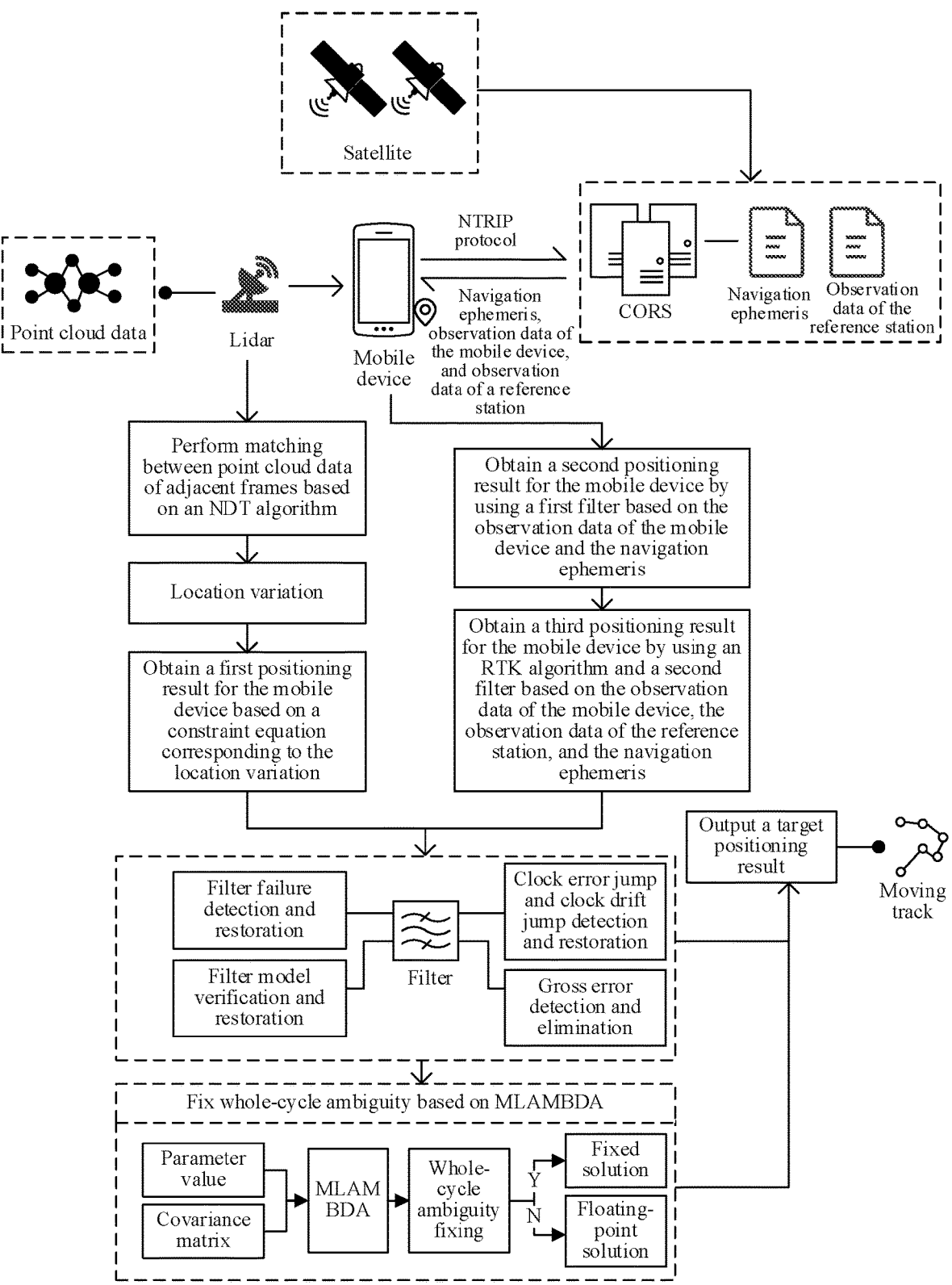
FIG. 11 is a schematic block diagram of a positioning method according to an embodiment of this disclosure.

For example, a framework of the positioning method may be shown in FIG. 11. A mobile device obtains observation data of the mobile device, a navigation ephemeris, and observation data of a reference station from a CORS system based on the NTRIP protocol. The CORS system has established a communication connection to a satellite. A second positioning result for the mobile device is obtained by using a first filter based on the observation data of the mobile device and the navigation ephemeris. A third positioning result for the mobile device is obtained by using an RTK algorithm and a second filter based on the observation data of the mobile device, the observation data of the reference station, and the navigation ephemeris. Point cloud data scanned by a lidar installed on the mobile device is obtained, and matching is performed between point cloud data of adjacent frames based on an NDT algorithm to obtain a location variation. A first positioning result for the mobile device is obtained based on a constraint equation corresponding to the location variation. Fusion is performed on the first positioning result, the second positioning result, and the third positioning result to obtain a target positioning result, and the target positioning result is output. A moving track of the mobile device may be generated through constant output of the latest target positioning result.

A process of obtaining a positioning result based on a filter includes filter failure detection and restoration, clock error jump and clock drift jump detection and restoration, filter model verification and restoration, gross error detection and elimination, and the like. A process of obtaining the third positioning result includes a process of fixing whole-cycle ambiguity based on MLAMBDA. In a case that the fixing succeeds, a fixed solution of a location is obtained. In a case that the fixing fails, a floating-point solution of a location is obtained.

Figure 12:
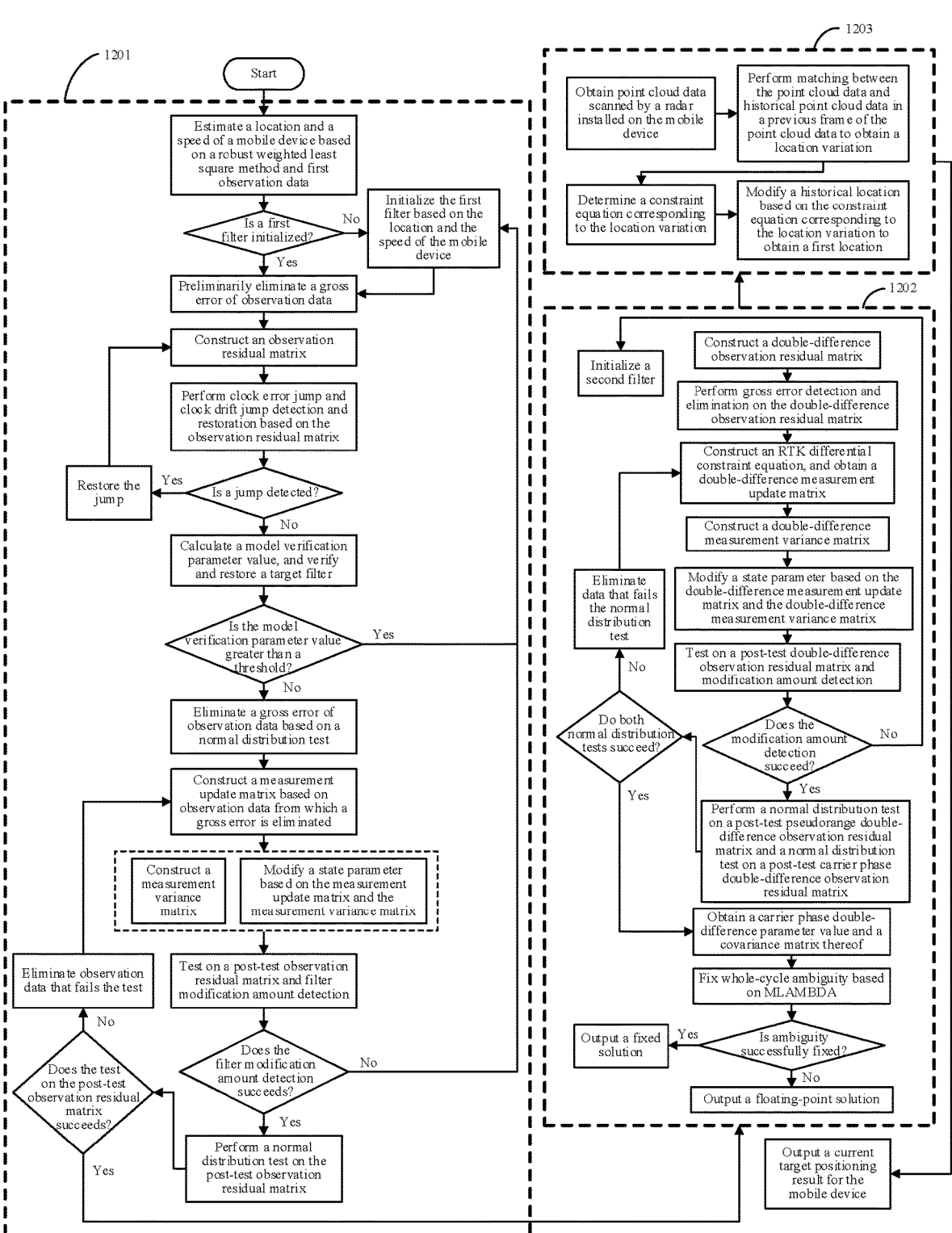
FIG. 12 is a schematic diagram of a detailed process of a positioning method according to an embodiment of this disclosure.

For example, a detailed process of the positioning method may be shown in FIG. 12. According to a step in a dashed-line box 1201, a process of obtaining a second positioning result for a mobile device by using a first filter based on observation data of the mobile device and a navigation ephemeris is implemented. For the step in the dashed-line box 1201, refer to step 501 in FIG. 5 and the embodiment shown in FIG. 8. A difference from step 501 in FIG. 5 lies in that, in the dashed-line box 1201, the first filter is initialized (to be specific, a first state parameter of the first filter is determined) by using a state parameter of the mobile device that is resolved based on a robust weighted least square method and first observation data, instead of determining the first state parameter of the first filter based on a first positioning result.

According to a step in a dashed-line box 1202, a process of obtaining a third positioning result for the mobile device by using an RTK algorithm and a second filter based on the observation data of the mobile device, observation data of a reference station, and the navigation ephemeris is implemented. For the step in the dashed-line box 1202, refer to step 502 in FIG. 5. A difference from step 502 in FIG. 5 lies in that, in the dashed-line box 1202, the second filter is initialized (to be specific, a second state parameter of the second filter is determined) by using the state parameter of the mobile device that is resolved based on the robust weighted least square method and the first observation data, instead of determining the second state parameter of the second filter based on a first modified result.

Fusion is performed on the second positioning result and the third positioning result to obtain a fusion result. According to a step in a dashed-line box 1203, a process of obtaining the first positioning result for the mobile device based on point cloud data is implemented. For the step in the dashed-line box 1203, refer to step 301 in the embodiment shown in FIG. 3. Fusion is performed on the fusion result and the first positioning result to obtain a target positioning result, and a current target positioning result for the mobile device is output.

For example, the positioning method provided in embodiments of this disclosure may be applied to a mobile terminal positioning and navigation application scenario (for example, an electronic map application), and may also be applied to a lane-level navigation application scenario, to implement submeter-level or lane-level positioning and assist in lane-level positioning and navigation. The submeter-level positioning means that precision of a positioning result can reach decimeters, centimeters, or even millimeters.

Figure 13:
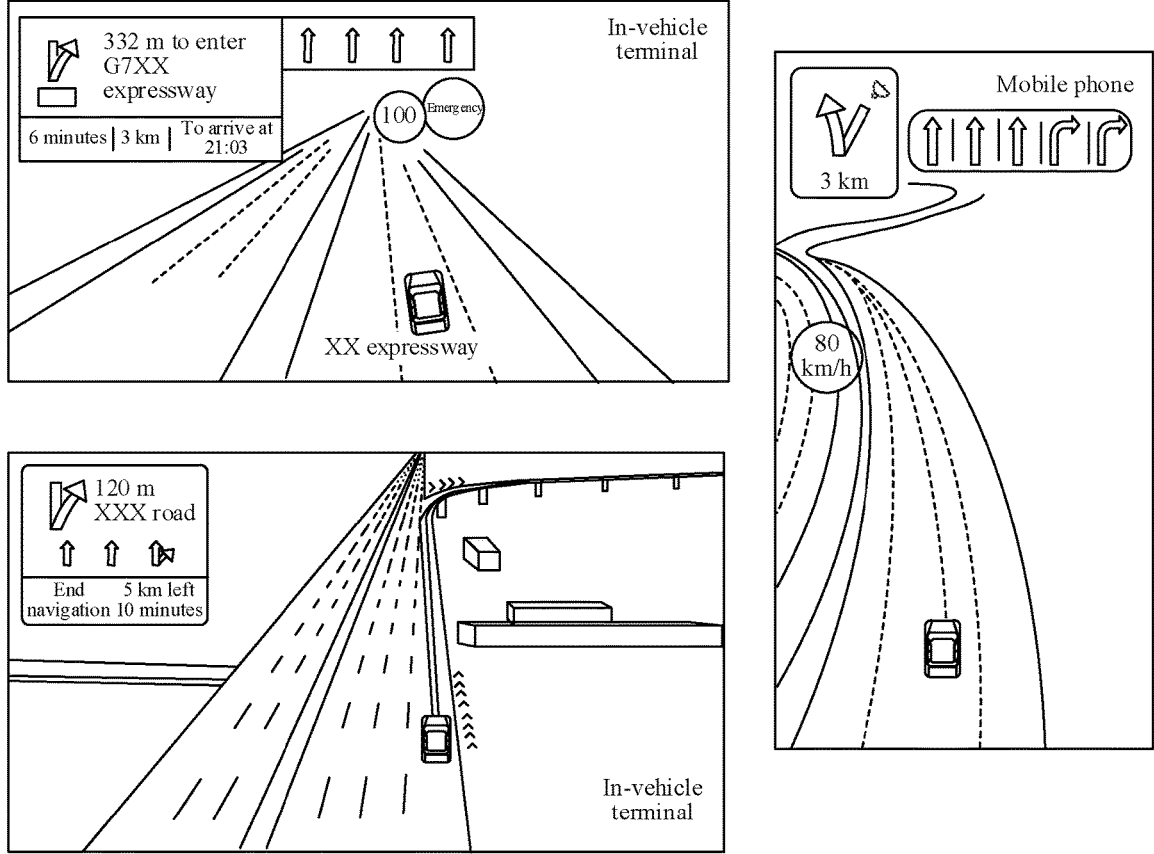
FIG. 13 is a schematic diagram of an application scenario of a positioning method according to an embodiment of this disclosure.

For example, embodiments of this disclosure provide a positioning method in which a location variation constraint equation is constructed based on point cloud matching information of a lidar, and RTK and the lidar are combined based on a Kalman filter. This weakens dependency on a satellite signal, and can resolve the following problems: Positioning accuracy is poor in a complex scenario in which a satellite signal is seriously blocked, significant multi-path effect occurs, or the like; vehicle positioning is discontinuous and a location jump occurs in a complex scenario with high buildings, an urban canyon, or the like; and vehicle positioning is inaccurate and a location drift occurs in a complex urban scenario, for example, a scenario with a weak satellite signal, to improve availability and reliability of satellite positioning in the scenario with a weak satellite signal, and assist in lane-level positioning and navigation for mobile phones and in-vehicle terminals in road scenarios such as expressways and elevated highways (as shown in FIG. 13).

Figure 14:
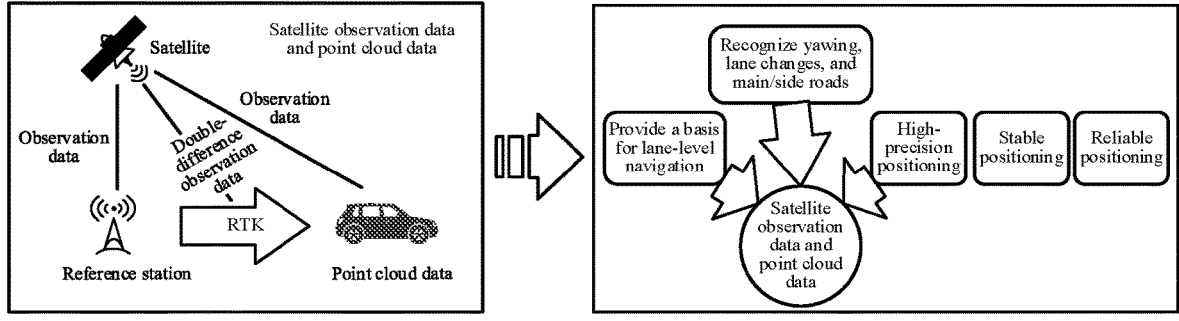
FIG. 14 is a schematic diagram of an application scenario of a positioning method according to an embodiment of this disclosure.

For example, an application scenario of the positioning method provided in embodiments of this disclosure may alternatively be shown in FIG. 14. A target positioning result for a mobile device is obtained by comprehensively considering satellite observation data (for example, observation data of the mobile device and double-difference observation data between the observation data of the mobile device and observation data of a reference station) and point cloud data. Based on this positioning method, functions of providing a basis for lane-level navigation, recognizing yawing, lane changes, and main/side roads, high-precision positioning, stable positioning, reliable positioning, and the like can be implemented.

Figures 15, 16:
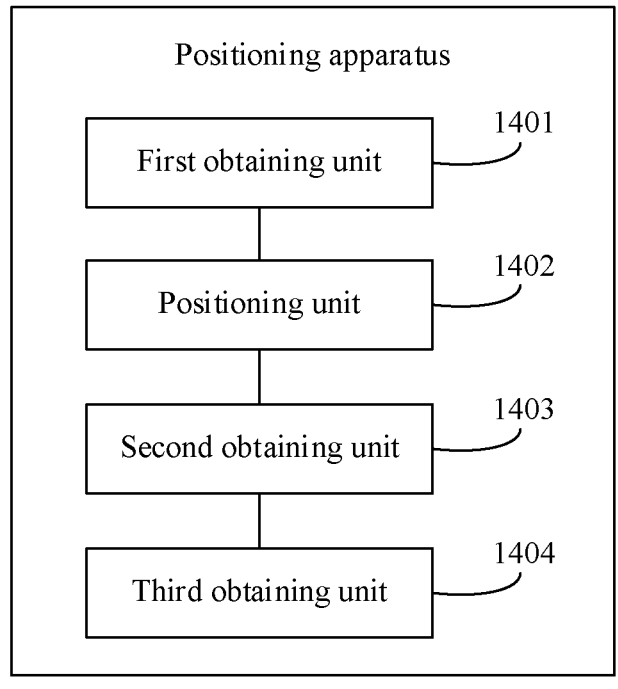
FIG. 15 is a schematic diagram of a positioning apparatus according to an embodiment of this disclosure.
FIG. 16 is a schematic structural diagram of a mobile device according to an embodiment of this disclosure.

As shown in FIG. 15, embodiments of this disclosure provide a positioning apparatus, and the apparatus includes a first obtaining unit 1401, a positioning unit 1402, a second obtaining unit 1403 and a third obtaining unit 1404. The first obtaining unit 1401 is configured to obtain point cloud data scanned by a radar installed on a mobile device. The positioning unit 1402 is configured to position the mobile device by using the point cloud data to obtain a first positioning result. The second obtaining unit 1403 is configured to obtain first observation data received by a satellite positioning device installed on the mobile device. The third obtaining unit 1404 is configured to obtain a target positioning result for the mobile device based on the first observation data and the first positioning result.

In an example implementation, the third obtaining unit 1404 is configured to: obtain target data based on the first observation data, the target data including at least one of the first observation data and double-difference observation data, and the double-difference observation data being calculated based on the first observation data and reference observation data received by a satellite positioning device installed on a reference station; and obtain the target positioning result on the basis of the first positioning result based on the target data.

In an example implementation, the target data includes the first observation data and the double-difference observation data, and the third obtaining unit 1404 is configured to: modify the first positioning result by using the first observation data to obtain a first modified result; and modify the first modified result by using the double-difference observation data to obtain a second modified result, and use the second modified result as the target positioning result.

In an example implementation, the third obtaining unit 1404 is configured to: obtain a first state parameter of a first filter based on the first positioning result, and obtain a first state covariance matrix corresponding to the first state parameter; obtain a first observation residual matrix based on the first observation data and the first state parameter in response to that the first observation data meets a first screening condition; determine a first measurement update matrix and a first measurement variance matrix that correspond to the first observation residual matrix; determine a first parameter increment based on the first observation residual matrix, the first measurement update matrix, the first measurement variance matrix, and the first state covariance matrix, and use a sum of the first parameter increment and the first state parameter as an updated first state parameter of the first filter; and obtain the first modified result based on the updated first state parameter in response to that the updated first state parameter meets a first reference condition.

In an example implementation, the apparatus further includes:

a determining unit, configured to: determine a covariance increment based on the first measurement update matrix, the first measurement variance matrix, and the first state covariance matrix, and use a product of the covariance increment and the first state covariance matrix as an updated first state covariance matrix; perform modification amount detection on the first parameter increment based on the updated first state covariance matrix; test the first observation residual matrix based on a first residual covariance matrix in response to that the modification amount detection succeeds, to obtain test results respectively corresponding to elements in the first observation residual matrix, the first residual covariance matrix being constructed based on the updated first state covariance matrix, the first measurement variance matrix, and the first measurement update matrix; and in response to that the test results respectively corresponding to the elements in the first observation residual matrix meet a test condition, determine that the updated first state parameter meets the first reference condition.

In an example implementation, the determining unit is further configured to: determine a model verification parameter value corresponding to the first filter based on the first observation data, the first state parameter, and the first state covariance matrix; and in response to that the model verification parameter value is less than a first threshold, obtain a test result for observation subdata in the first observation data, and in response to that test results for all observation subdata in the first observation data meet a retention condition, determine that the first observation data meets the first screening condition.

In an example implementation, the determining unit is further configured to: normalize the first observation residual matrix based on the first measurement update matrix, the first measurement variance matrix, and the first state covariance matrix to obtain a normalized residual matrix; test the normalized residual matrix based on a second residual covariance matrix to obtain test results respectively corresponding to elements in the normalized residual matrix, the second residual covariance matrix being constructed based on the first measurement update matrix, the first measurement variance matrix, and the first state covariance matrix, and any element in the normalized residual matrix being associated with a piece of observation subdata in the first observation data; and use the test results respectively corresponding to the elements in the normalized residual matrix as test results for corresponding observation subdata in the first observation data.

In an example implementation, the third obtaining unit 1404 is configured to: determine a second state parameter of the second filter based on the first modified result, and obtain a second state covariance matrix corresponding to the second state parameter; obtain a double-difference observation residual matrix based on the double-difference observation data and the second state parameter in response to that the double-difference observation data meets a second screening condition; determine a double-difference measurement update matrix and a double-difference measurement variance matrix that correspond to the double-difference observation residual matrix; determine a second parameter increment based on the double-difference observation residual matrix, the double-difference measurement update matrix, the double-difference measurement variance matrix, and the second state covariance matrix, and use a sum of the second parameter increment and the second state parameter as an updated second state parameter of the second filter; and obtain the second modified result based on the updated second state parameter in response to that the updated second state parameter meets a second reference condition.

In an example implementation, the third obtaining unit 1404 is configured to: obtain double-difference estimation data based on the second state parameter; and construct the double-difference observation residual matrix based on the double-difference observation data and the double-difference estimation data.

In an example implementation, the updated second state parameter includes a floating-point solution of a location and a floating-point solution of whole-cycle ambiguity, and the third obtaining unit 1404 is configured to: fix the floating-point solution of the whole-cycle ambiguity; and in response to that the floating-point solution of the whole-cycle ambiguity is successfully fixed, calculate a fixed solution of the location by using a fixed solution of the whole-cycle ambiguity, and use a result including the fixed solution of the location as the second modified result; or in response to that the floating-point solution of the whole-cycle ambiguity is not successfully fixed, use a result including the floating-point solution of the location as the second modified result.

In an example implementation, the target data includes the first observation data and the double-difference observation data, and the third obtaining unit 1404 is configured to: position the mobile device by using the first observation data to obtain a second positioning result; position the mobile device by using the double-difference observation data to obtain a third positioning result; and perform fusion on the first positioning result, the second positioning result, and the third positioning result, and use a fusion result as the target positioning result.

In an example implementation, the third obtaining unit 1404 is configured to: resolve a state parameter of the mobile device based on the first observation data, and obtain the second positioning result based on a state parameter obtained through resolution.

In an example implementation, the third obtaining unit 1404 is configured to: obtain an initial observation residual matrix based on the first observation data and an initial positioning result; determining an initial Jacobian matrix and an initial measurement variance matrix that correspond to the initial observation residual matrix; obtain a positioning result modification amount based on the initial observation residual matrix, the initial Jacobian matrix, and the initial measurement variance matrix, and use a sum of the positioning result modification amount and the initial positioning result as an intermediate positioning result; and in response to that the intermediate positioning result meets a first selection condition, obtain, based on the intermediate positioning result, the state parameter obtained through resolution.

In an example implementation, the third obtaining unit 1404 is configured to: obtain a first weight corresponding to the first positioning result, a second weight corresponding to the second positioning result, and a third weight corresponding to the third positioning result; and perform fusion on the first positioning result, the second positioning result, and the third positioning result based on the first weight, the second weight, and the third weight, and use a fusion result as the target positioning result.

In an example implementation, the third obtaining unit 1404 is configured to: perform fusion on any two of the first positioning result, the second positioning result, and the third positioning result to obtain a fusion result; and perform fusion on the fusion result and an unfused positioning result, and use a fusion result as the target positioning result.

In an example implementation, the positioning unit 1402 is configured to: perform matching between the point cloud data and historical point cloud data in a previous frame of the point cloud data to obtain point cloud matching information; determine a location variation based on the point cloud matching information; and modify a historical location of the mobile device based on the location variation to obtain a first location, and use a positioning result including the first location as the first positioning result.

In an example implementation, the target data includes the first observation data and the double-difference observation data, and the third obtaining unit 1404 is configured to: modify the first positioning result by using the double-difference observation data to obtain a third modified result; and modify the third modified result by using the first observation data to obtain a fourth modified result, and use the fourth modified result as the target positioning result.

In an example implementation, the target data includes the first observation data and the double-difference observation data, and the third obtaining unit 1404 is configured to: modify the first positioning result by using the first observation data to obtain a first modified result; position the mobile device by using the double-difference observation data to obtain a third positioning result; and perform fusion on the first modified result and the third positioning result, and use a fusion result as the target positioning result.

In an example implementation, the target data includes the first observation data and the double-difference observation data, and the third obtaining unit 1404 is configured to: modify the first positioning result by using the double-difference observation data to obtain a third modified result; position the mobile device by using the first observation data to obtain a second positioning result; and perform fusion on the third modified result and the second positioning result, and use a fusion result as the target positioning result.

In an example implementation, the target data includes the first observation data and the double-difference observation data, and the third obtaining unit 1404 is configured to: modify the first positioning result by using the first observation data to obtain a first modified result; modify the first positioning result by using the double-difference observation data to obtain a third modified result; and perform fusion on the third modified result and the first modified result, and use a fusion result as the target positioning result.

In an example implementation, the target data includes the first observation data and the double-difference observation data, and the third obtaining unit 1404 is configured to: position the mobile device by using the first observation data to obtain a second positioning result; modify the second positioning result by using the double-difference observation data to obtain a fifth modified result; and perform fusion on the fifth modified result and the first positioning result, and use a fusion result as the target positioning result.

In an example implementation, the target data includes the first observation data and the double-difference observation data, and the third obtaining unit 1404 is configured to: position the mobile device by using the double-difference observation data to obtain a third positioning result; modify the third positioning result by using the first observation data to obtain a sixth modified result; and perform fusion on the sixth modified result and the first positioning result, and use a fusion result as the target positioning result.

In an example implementation, the target data includes the first observation data and the double-difference observation data, and the third obtaining unit 1404 is configured to: position the mobile device by using the first observation data to obtain a second positioning result; perform fusion on the first positioning result and the second positioning result to obtain a first fusion result; and modify the first fusion result by using the double-difference observation data, and use a modified result as the target positioning result.

In an example implementation, the target data includes the first observation data and the double-difference observation data, and the third obtaining unit 1404 is configured to: position the mobile device by using the double-difference observation data to obtain a third positioning result; perform fusion on the first positioning result and the third positioning result to obtain a second fusion result; and modify the second fusion result by using the first observation data, and use a modified result as the target positioning result.

In an example implementation, the target data includes the first observation data, and the third obtaining unit 1404 is configured to: modify the first positioning result by using the first observation data to obtain a first modified result, and use the first modified result as the target positioning result; or position the mobile device by using the first observation data to obtain a second positioning result, perform fusion on the first positioning result and the second positioning result, and use a fusion result as the target positioning result.

In an example implementation, the target data includes the double-difference observation data, and the third obtaining unit 1404 is configured to: modify the first positioning result by using the double-difference observation data to obtain a third modified result, and use the third modified result as the target positioning result; or position the mobile device by using the double-difference observation data to obtain a third positioning result, perform fusion on the first positioning result and the third positioning result, and use a fusion result as the target positioning result.

According to the positioning apparatus provided in embodiments of this disclosure, the final target positioning result for the mobile device is obtained by comprehensively considering the point cloud data scanned by the radar installed on the mobile device and the first observation data received by the satellite positioning device. The point cloud data and the first observation data can complement each other. In this positioning manner, dependency on either of the point cloud data and the first observation data can be weakened. Even if quality of the point cloud data or the first observation data is poor, an accurate target positioning result can be obtained based on the other type of data. Therefore, positioning robustness is good, so that an actual positioning requirement can be met.

In a case that the apparatus provided in the foregoing embodiment implements functions of the apparatus, the division of the foregoing functional units is merely used as an example for description. In practical application, the functions may be allocated to and completed by different functional units according to requirements. That is, an internal structure of a device is divided into different functional units to complete all or some of the functions described above. In addition, the apparatus provided in the foregoing embodiment and the method embodiments belong to a same concept. For details about a specific implementation process of the apparatus, refer to the method embodiments. Details are not described herein again.

FIG. 16 is a schematic structural diagram of a mobile device according to an embodiment of this disclosure. The mobile device may be a mobile phone, a computer, a smart voice interaction device, a smart home appliance, an in-vehicle terminal, an aircraft, or the like. The mobile device may also be referred to as another name such as user equipment, a portable terminal, a laptop terminal, or a desktop terminal.

Usually, the mobile device includes a processor 1501 and a memory 1502.

The processor 1501 may include one or more processing cores, for example, a 4-core processor or an 8-core processor. The processor 1501 may be implemented in at least one hardware form of a digital signal processor (DSP), a field-programmable gate array (FPGA), and a programmable logic array (PLA). The processor 1501 may also include a main processor and a coprocessor. The main processor is a processor configured to process data in an awake state, and is also referred to as a central processing unit (CPU). The coprocessor is a low-power processor configured to process data in a standby state. In some embodiments, the processor 1501 may be integrated with a graphics processing unit (GPU). The GPU is configured to render and draw content that needs to be displayed on a display screen. In some embodiments, the processor 1501 may further include an artificial intelligence (AI) processor. The AI processor is configured to process computing operations related to machine learning.

The memory 1502 may include one or more computer-readable storage media. The computer-readable storage medium may be non-transient. The memory 1502 may further include a high-speed random access memory and a non-volatile memory, for example, one or more disk storage devices or flash storage devices. In some embodiments, the non-transient computer-readable storage medium in the memory 1502 is configured to store at least one instruction, and the at least one instruction is executed by the processor 1501, so that the mobile device implements the positioning method provided in the method embodiments of this disclosure.

In some embodiments, the mobile device further includes a radar 1515 and a satellite positioning device 1516. The radar 1515 is configured to scan point cloud data around the mobile device. The satellite positioning device 1516 is configure to receive first observation data corresponding to the mobile device, so that the mobile device can position the mobile device by comprehensively considering the point cloud data and the first observation data, to improve positioning accuracy and robustness.

It is noted that the structure shown in FIG. 16 constitutes no limitation on the mobile device, and the mobile device may include more or fewer components than those shown in the figure, or some components may be combined, or a different component layout may be used.

Figure 17:
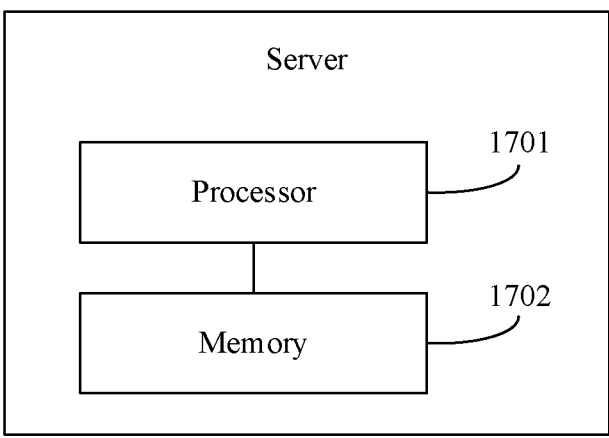
FIG. 17 is a schematic structural diagram of a server according to an embodiment of this disclosure.

FIG. 17 is a schematic structural diagram of a server according to an embodiment of this disclosure. The server may vary greatly due to different configurations or performance, and may include one or more central processing units (CPUs) 1701 and one or more memories 1702. The one or more memories 1702 store at least one computer program, and the at least one computer program is loaded and executed by the one or more CPUs 1701, so that the server implements the positioning method provided in the foregoing method embodiments. Certainly, the server may further include components such as a wired or wireless network interface, a keyboard, and an input/output interface, to facilitate input and output. The server may further include another component configured to implement a function of a device. Details are not described herein.

In an exemplary embodiment, a computer device is further provided. The computer device includes a processor and a memory. The memory stores at least one computer program. The at least one computer program is loaded and executed by one or more processors, so that the computer device implements any one of the foregoing positioning methods.

In an exemplary embodiment, a non-volatile computer-readable storage medium is further provided. The non-volatile computer-readable storage medium stores at least one computer program. The at least one computer program is loaded and executed by a processor of a computer device, so that the computer implements any one of the foregoing positioning methods.

In an example implementation, the non-volatile computer-readable storage medium may be a read-only memory (ROM), a random access memory (RAM), a compact disc read-only memory (CD-ROM), a magnetic tape, a floppy disk, an optical data storage device, or the like.

In an exemplary embodiment, a computer program product is further provided. The computer program product includes a computer program or computer instructions. The computer program or the computer instructions are loaded and executed by a processor, so that a computer implements any one of the foregoing positioning methods.

In an exemplary embodiment, a computer program is further provided. The computer program includes computer instructions. The computer instructions are loaded and executed by a processor, so that a computer implements any one of the foregoing positioning methods.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The terms "first", "second", and the like in this disclosure are intended to distinguish between similar objects but do not necessarily indicate a specific order or sequence. It is to be understood that such used data is interchangeable where appropriate so that embodiments of this disclosure described herein can be implemented in an order other than those illustrated or described herein. The implementations described in the foregoing exemplary embodiments do not represent all implementations consistent with this disclosure. On the contrary, the implementations are merely examples of apparatuses and methods that are described in detail in the appended claims and that are consistent with some aspects of this disclosure.

It is to be understood that "plurality" mentioned in this specification means two or more. "And/or" describes an association relationship between associated objects and indicates that three relationships may exist. For example, A and/or B may indicate the following three cases: Only A exists, both A and B exist, and only B exists. The character "/" usually indicates an "or" relationship between the associated objects.

The foregoing descriptions are merely exemplary embodiments of this disclosure, but are not intended to limit this disclosure. Any modification, equivalent replacement, or improvement made within the principle of this disclosure shall fall within the protection scope of this disclosure.

What is claimed is:

1. A method of positioning a mobile device, the method comprising:

obtaining point cloud data that is scanned by a radar that is positionally associated with the mobile device;

determining a first positioning result of the mobile device according to the point cloud data;

obtaining first observation data that is received by a first satellite positioning device that is positionally associated with the mobile device;

obtaining a first modified result of the first positioning result based on a first filter that is configured according to the first positioning result and the first observation data;

determining target data based on the first observation data and reference observation data that is received by a second satellite positioning device at a reference station; and determining a target positioning result for the mobile device based on the target data and the first modified result.

2. The method according to claim 1, wherein the determining the target positioning result for the mobile device based on the target data and the first modified result comprises:

calculating double-difference observation data based on the first observation data and the reference observation data; and determining the target data based on at least one of the first observation data or the double-difference observation data.

3. The method according to claim 2, wherein the target data includes the double-difference observation data, and the determining the target positioning result includes:

modifying the first modified result according to the double-difference observation data to obtain a second modified result, the second modified result being used as the target positioning result.

4. The method according to claim 3, wherein the modifying the first modified result according to the double-difference observation data to obtain the second modified result comprises:

determining a second state parameter of a second filter based on the first modified result;

obtaining a second state covariance matrix corresponding to the second state parameter;

obtaining a double-difference observation residual matrix based on the double-difference observation data and the second state parameter when the double-difference observation data meets a second screening condition;

determining a double-difference measurement update matrix and a double-difference measurement variance matrix that correspond to the double-difference observation residual matrix;

determining a second parameter increment based on the double-difference observation residual matrix, the double-difference measurement update matrix, the double-difference measurement variance matrix, and the second state covariance matrix;

determining an updated second state parameter of the second filter based on a sum of the second parameter increment and the second state parameter; and obtaining the second modified result based on the updated second state parameter when the updated second state parameter meets a second reference condition.

5. The method according to claim 4, wherein the obtaining the double-difference observation residual matrix comprises:

obtaining double-difference estimation data based on the second state parameter; and constructing the double-difference observation residual matrix based on the double-difference observation data and the double-difference estimation data.

6. The method according to claim 4, wherein the updated second state parameter comprises a first floating-point solution of a location and a second floating-point solution of whole-cycle ambiguity, and the obtaining the second modified result comprises:

fixing the second floating-point solution of the whole-cycle ambiguity;

when the second floating-point solution of the whole-cycle ambiguity is successfully fixed, calculating a fixed solution of the location according to the second floating-point solution of the whole-cycle ambiguity that is fixed, the fixed solution of the location being used as the second modified result; and when the second floating-point solution of the whole-cycle ambiguity is not successfully fixed, using the first floating-point solution of the location as the second modified result.

7. The method according to claim 1, wherein the obtaining the first modified result comprises:

determining a first state parameter of the first filter based on the first positioning result;

obtaining a first state covariance matrix corresponding to the first state parameter;

obtaining a first observation residual matrix based on the first observation data and the first state parameter when the first observation data meets a first screening condition;

determining a first measurement update matrix and a first measurement variance matrix that correspond to the first observation residual matrix;

determining a first parameter increment based on the first observation residual matrix, the first measurement update matrix, the first measurement variance matrix, and the first state covariance matrix;

determining an updated first state parameter of the first filter based on a sum of the first parameter increment and the first state parameter; and obtaining the first modified result based on the updated first state parameter when the updated first state parameter meets a first reference condition.

8. The method according to claim 7, wherein the method further comprises:

determining a covariance increment based on the first measurement update matrix, the first measurement variance matrix, and the first state covariance matrix;

determining an updated first state covariance matrix according to a product of the covariance increment and the first state covariance matrix;

performing modification amount detection on the first parameter increment based on the updated first state covariance matrix;

when the modification amount detection succeeds, testing the first observation residual matrix based on a first residual covariance matrix to obtain test results respectively corresponding to elements in the first observation residual matrix, the first residual covariance matrix being constructed based on the updated first state covariance matrix, the first measurement variance matrix, and the first measurement update matrix; and when the test results respectively corresponding to the elements in the first observation residual matrix meet a test condition, determining that the updated first state parameter meets the first reference condition.

9. The method according to claim 7, wherein the method further comprises:

determining a model verification parameter value corresponding to the first filter based on the first observation data, the first state parameter, and the first state covariance matrix;

when the model verification parameter value is less than a first threshold, obtaining first test results respectively for sub-pieces in the first observation data; and when the first test results for the sub-pieces in the first observation data respectively meet a retention condition, determining that the first observation data meets the first screening condition.

10. The method according to claim 9, wherein the obtaining the first test results for the sub-pieces in the first observation data comprises:

normalizing the first observation residual matrix based on the first measurement update matrix, the first measurement variance matrix, and the first state covariance matrix to obtain a normalized residual matrix;

testing the normalized residual matrix based on a second residual covariance matrix to obtain second test results respectively corresponding to elements in the normalized residual matrix, the second residual covariance matrix being constructed based on the first measurement update matrix, the first measurement variance matrix, and the first state covariance matrix, and elements in the normalized residual matrix being associated with the sub-pieces in the first observation data; and using the second test results of the elements in the normalized residual matrix as the first test results for the sub-pieces in the first observation data.

11. The method according to claim 1, wherein the point cloud data is of a current frame, the determining the first positioning result comprises:

performing a matching between the point cloud data in the current frame and historical point cloud data in a previous frame to obtain point cloud matching information;

determining a location variation based on the point cloud matching information; and modifying a historical location of the mobile device based on the location variation to obtain a first location as the first positioning result.

12. A method of positioning a mobile device, comprising:

obtaining point cloud data that is scanned by a radar that is positionally associated with the mobile device;

determining a first positioning result of the mobile device according to the point cloud data;

obtaining first observation data that is received by a first satellite positioning device that is positionally associated with the mobile device;

determining a second positioning result of the mobile device according to the first observation data;

calculating double-difference observation data based on the first observation data and reference observation data that is received by a second satellite positioning device at a reference station;

determining a third positioning result of the mobile device according to the double-difference observation data;

performing a fusion on the second positioning result and the third positioning result to generate a fusion result; and obtaining a target positioning result for the mobile device based on modification of the fusion result according to the first positioning result.

13. The method according to claim 12, wherein the determining the second positioning result comprises:

determining a state parameter of the mobile device based on the first observation data; and obtaining the second positioning result based on the state parameter.

14. The method according to claim 13, wherein the determining the state parameter of the mobile device based on the first observation data comprises:

obtaining an initial observation residual matrix based on the first observation data and an initial positioning result;

determining an initial Jacobian matrix and an initial measurement variance matrix that correspond to the initial observation residual matrix;

obtaining a positioning result modification amount based on the initial observation residual matrix, the initial Jacobian matrix, and the initial measurement variance matrix;

calculating a sum of the positioning result modification amount and the initial positioning result as an intermediate positioning result; and when the intermediate positioning result meets a first selection condition, determining the state parameter based on the intermediate positioning result.

15. The method according to claim 12, wherein the point cloud data corresponds to a current frame, and the determining the first positioning result includes:

performing a matching between the point cloud data in the current frame and historical point cloud data in a previous frame to obtain point cloud matching information;

determining a location variation based on the point cloud matching information; and modifying a historical location of the mobile device based on the location variation to obtain a first location as the first positioning result.

16. An apparatus, comprising:

processing circuitry configured to:

obtain point cloud data that is scanned by a radar that is positionally associated with a device;

determine a first positioning result for the device according to the point cloud data;

obtain first observation data that is received by a first satellite positioning device that is positionally associated with the device;

obtain a first modified result of the first positioning result based on a first filter that is configured according to the first positioning result and the first observation data;

determine target data based on the first observation data and reference observation data that is received by a second satellite positioning device at a reference station; and determine a target positioning result of the device based on the target data and the first modified result.

17. The apparatus according to claim 16, wherein, to determine the target positioning result, the processing circuitry is configured to:

calculate double-difference observation data based on the first observation data and the reference observation data; and determine the target data based on at least one of the first observation data or the double-difference observation data.

18. The apparatus according to claim 17, wherein the target data includes the double-difference observation data, and to determine the target positioning result, the processing circuitry is configured to:

modify the first modified result according to the double-difference observation data to obtain a second modified result, the second modified result being used as the target positioning result.

19. The apparatus according to claim 16, wherein, to obtain the first modified result, the processing circuitry is configured to:

determine a first state parameter of the first filter based on the first positioning result;

obtain a first state covariance matrix corresponding to the first state parameter;

obtain a first observation residual matrix based on the first observation data and the first state parameter when the first observation data meets a first screening condition;

determine a first measurement update matrix and a first measurement variance matrix that correspond to the first observation residual matrix;

determine a first parameter increment based on the first observation residual matrix, the first measurement update matrix, the first measurement variance matrix, and the first state covariance matrix;

determine an updated first state parameter of the first filter based on a sum of the first parameter increment and the first state parameter; and obtain the first modified result based on the updated first state parameter when the updated first state parameter meets a first reference condition.

20. The apparatus according to claim 16, wherein the point cloud data corresponds to a current frame, and to determine the first positioning result, the processing circuitry is configured to:

perform a matching between the point cloud data in the current frame and historical point cloud data in a previous frame to obtain point cloud matching information;

determine a location variation based on the point cloud matching information; and modify a historical location of the device based on the location variation to obtain a first location as the first positioning result.

* * * * *